US008791589B2

(12) United States Patent
Colello et al.

(10) Patent No.: US 8,791,589 B2
(45) Date of Patent: Jul. 29, 2014

(54) SYSTEM AND METHOD FOR TRANSPORTING ENERGY

(75) Inventors: Gary M. Colello, North Andover, MA (US); Dennis M. Darcy, Tyngsboro, MA (US); George B. Stevens, Cambridge, MA (US)

(73) Assignee: Premium Power Corporation, North Reading, MA (US)

( * ) Notice: Subject to any disclaimer, the term of this patent is extended or adjusted under 35 U.S.C. 154(b) by 346 days.

(21) Appl. No.: 13/082,320

(22) Filed: Apr. 7, 2011

(65) Prior Publication Data

US 2011/0282807 A1 Nov. 17, 2011

Related U.S. Application Data

(63) Continuation of application No. PCT/US2009/059898, filed on Oct. 7, 2009.

(60) Provisional application No. 61/103,527, filed on Oct. 7, 2008, provisional application No. 61/233,104, filed on Aug. 11, 2009.

(51) Int. Cl.
H02J 7/00 (2006.01)
(52) U.S. Cl.
USPC .......................................... 307/9.1; 307/150
(58) Field of Classification Search
USPC .......................................... 307/9.1, 10.1, 150
See application file for complete search history.

(56) References Cited

U.S. PATENT DOCUMENTS

| 3,264,403 | A | 8/1966 | Erdle |
| 4,462,211 | A | 7/1984 | Linderfelt |
| 4,485,629 | A | 12/1984 | Le Goff |
| 4,558,270 | A | 12/1985 | Liautaud et al. |
| 5,274,571 | A | 12/1993 | Hesse et al. |
| 5,375,294 | A | * | 12/1994 | Garrett .............................. 16/34 |
| 5,607,788 | A | | 3/1997 | Tomazic |

(Continued)

FOREIGN PATENT DOCUMENTS

| CN | 1313650 A | 9/2001 |
| CN | 1493475 A | 5/2004 |

(Continued)

OTHER PUBLICATIONS

International Search Report and Written Opinion from related application PCT/US09/59898, Feb. 12, 2010, 17 pages.
Invitation to Pay Additional Fees and, Where Applicable, Protest Fee from related application PCT/US09/59898, Nov. 25, 2009, 3 pages.

(Continued)

*Primary Examiner* — Fritz M Fleming
(74) *Attorney, Agent, or Firm* — Lathrop & Gage LLP

(57) ABSTRACT

A method for shifting energy in space and time includes charging an energy store from an energy source at a first location, transporting the energy store to a second location, and discharging the energy store at the second location to deliver energy to an energy consumer. A method for providing energy security to an energy consumer includes charging an energy store from an energy source at a first location, transporting the energy store to a second location, and when a primary energy source at the second location is unavailable, discharging the energy store at the second location to deliver energy to the energy consumer. A vehicle for wirelessly transmitting electric power from a first location to a second location includes a battery, at least one power converter, a controller, and power coupling electrically coupled to the at least one power converter.

8 Claims, 39 Drawing Sheets

(56) References Cited

U.S. PATENT DOCUMENTS

| | | | |
|---|---|---|---|
| 5,610,802 A * | 3/1997 | Eidler et al. | 361/831 |
| 5,642,270 A | 6/1997 | Green et al. | |
| 6,169,252 B1 | 1/2001 | Avellanet | |
| 6,261,714 B1 * | 7/2001 | Eidler et al. | 429/70 |
| 6,673,479 B2 | 1/2004 | McArthur et al. | |
| 6,900,556 B2 * | 5/2005 | Provanzana et al. | 307/9.1 |
| 2005/0084745 A1 | 4/2005 | Colello et al. | |
| 2005/0158573 A1 | 7/2005 | Elzey et al. | |
| 2006/0251957 A1 | 11/2006 | Darcy et al. | |
| 2007/0051925 A1 | 3/2007 | Martyak et al. | |
| 2008/0050646 A1 | 2/2008 | Winter | |

FOREIGN PATENT DOCUMENTS

| | | |
|---|---|---|
| CN | 1877952 A | 12/2006 |
| JP | 5583402 | 6/1980 |
| JP | 62281738 | 12/1987 |
| JP | 7231579 | 8/1995 |
| JP | 200186653 | 3/2001 |
| JP | 2005533470 | 11/2005 |
| JP | 2007531479 | 11/2007 |
| JP | 2008529241 | 7/2008 |

OTHER PUBLICATIONS

Inforse, "Sustainable Energy Solutions to Reduce Poverty in South Asia—Manual of Energy Solutions," Apr. 18, 2008, 11 pages.
"GE Introduces Hybrid Locomotive Prototype to Public," May 27, 2007, 2 pages.
"Duraline Rubber Molded High Power High Amperage Plugs and Receptacles," retrieved from the Internet on Sep. 23, 2008, 2 pages.
Adams, David, "Gulf Stream turbines might whirl out energy," Feb. 4, 2008, 3 pages.
U.S. Department of the Interior, "Technology White Paper on Ocean Current Energy Potential on the U.S. Outer Continental Shelf," May 2006, 7 pages.
Allen, Greg, "Harnessing the Power of the Gulf Stream," Sep. 23, 2008, 3 pages.
King, Robert D., "DOE Heavy Vehicle Systems Optimization peer review," Apr. 2006, 20 pages.
"ARB's Rail Symposium," Apr. 25, 2006, 16 pages.
Chinese Application 200980148758.7 Office Action with Applicant's Summary dated Jul. 12, 2013, 12 pages.
Machine Translation of CN1877952 dated Dec. 13, 2006.
Machine Translation of CN1493475 dated May 5, 2004.
Japanese Patent Application 201153115 Office Action dated Nov. 5, 2013, 9 pages.

* cited by examiner

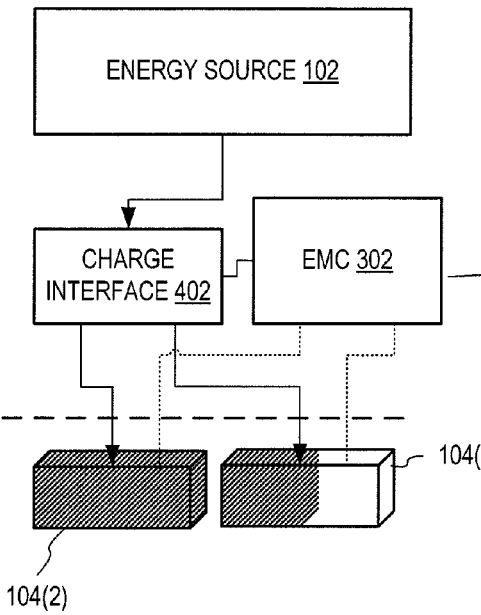
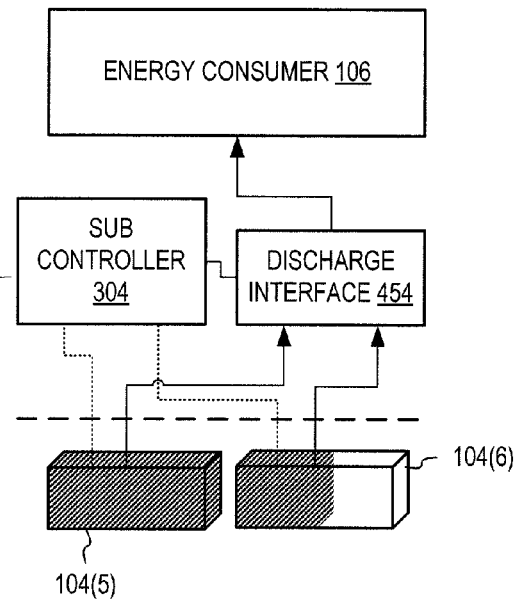
FIG. 4A    FIG. 4B
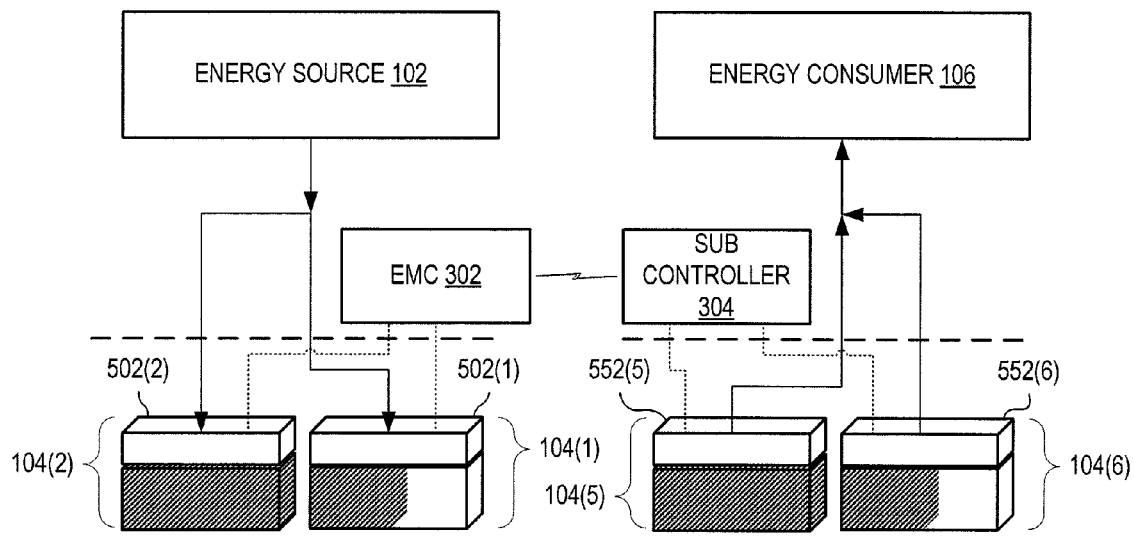
FIG. 5A    FIG. 5B

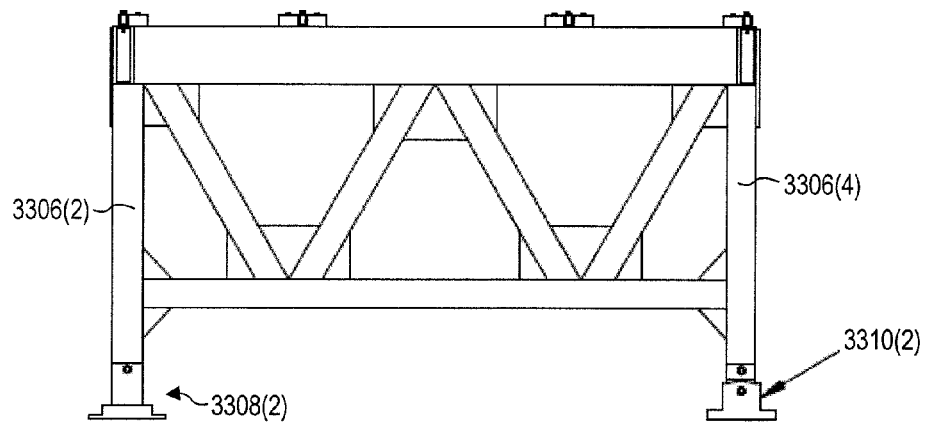
FIG. 35
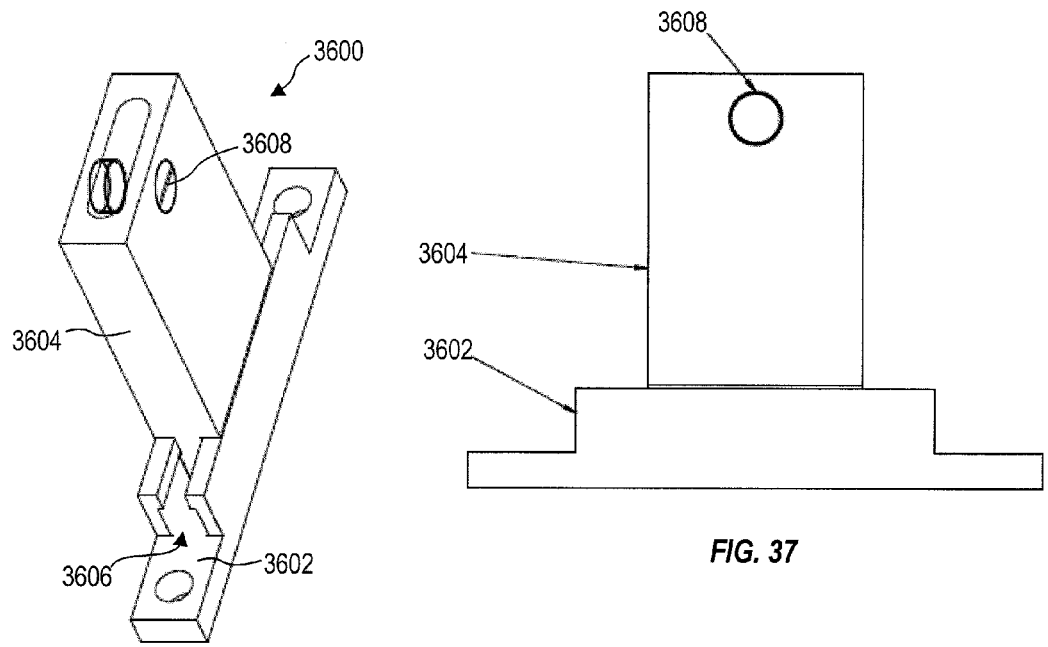
FIG. 37
FIG. 36
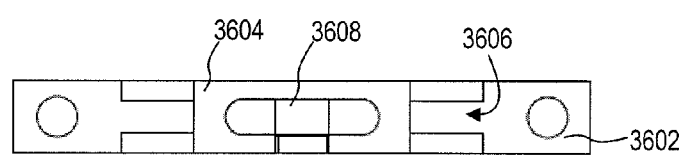
FIG. 39
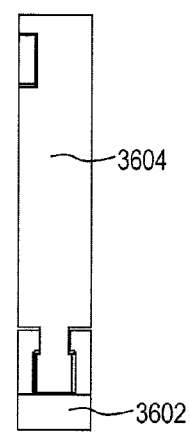
FIG. 38

SYSTEM AND METHOD FOR TRANSPORTING ENERGY

CROSS-REFERENCE TO RELATED APPLICATIONS

This application is a continuation of International Application No. PCT/US2009/059898, filed 7 Oct. 2009, which claims benefit of priority to U.S. Provisional Patent Application No. 61/103,527 filed 7 Oct. 2008 and to U.S. Provisional Patent Application No. 61/233,104 filed 11 Aug. 2009, each of which is incorporated herein by reference.

BACKGROUND

Mankind has evolved to require energy to be available in a convenient form for use. Typically, energy is converted from a first form into a usable form (e.g., electricity) that is distributed to consumers. Energy may be transported in a first form and converted into the usable form proximate to where it will be used. For example, diesel fuel may be transported to a location where it is used to run a generator to generate electricity. Alternatively, electrical energy may be generated at a large power station and transported over large distances through power conductors. However, where the use of power conductors is restricted (e.g., due to terrain), energy is typically converted less effectively from an available form into the usable form, often at a higher cost.

SUMMARY

In an embodiment, a method for shifting energy in space and time includes (1) at a first location, charging an energy store with energy from an electric power source, (2) transporting the energy store to a second location, and (3) at the second location, discharging the energy store to deliver energy to an energy consumer.

In an embodiment, a method for shifting energy in space and time includes (1) at a first location, charging an energy store with energy from a kinetic energy source, (2) transporting the energy store to a second location, and (3) at the second location, discharging the energy store to deliver energy to an energy consumer.

In an embodiment, a method for shifting energy in space and time includes (1) at a first location, charging an energy store with energy from a thermal energy source, (2) transporting the energy store to a second location, and (3) at the second location, discharging the energy store to deliver energy to an energy consumer.

In an embodiment, a vehicle for transmitting electric power from a first location to a second location includes (1) a battery integrated within the vehicle, (2) at least one power converter electrically coupled to the battery for controlling charging and discharging of the battery, (3) a controller coupled to the at least one power converter for controlling operation of the power converter, and (4) a power coupling electrically coupled to the at least one power converter. The power coupling is for electrically coupling the vehicle to a first power interface at the first location to receive electric power to charge the battery and for electrically coupling the vehicle to a second power interface at the second location to deliver electric power from the battery to a load at the second location.

In an embodiment, a rail car for transmitting electric power from a first location to a second location includes (1) a battery integrated within the rail car, (2) at least one power converter electrically coupled to the battery for controlling charging and discharging of the battery, (3) a controller coupled to the at least one power converter for controlling operation of the power converter, and (4) a power coupling electrically coupled to the at least one power converter. The power coupling is for electrically coupling the rail car to a first power interface at the first location to receive electric power to charge the battery and for electrically coupling the rail car to a second power interface at the second location to deliver electric power from the battery to a load at the second location.

In an embodiment, a watercraft for transmitting electric power from a first location to a second location includes (1) a battery integrated within the watercraft, (2) at least one power converter electrically coupled to the battery for controlling charging and discharging of the battery, (3) a controller coupled to the at least one power converter for controlling operation of the power converter, and (4) a power coupling electrically coupled to the at least one power converter. The power coupling is for electrically coupling the watercraft to a first power interface at the first location to receive electric power to charge the battery and for electrically coupling the watercraft to a second power interface at the second location to deliver electric power from the battery to a load at the second location.

In an embodiment, a road vehicle for transmitting electric power from a first location to a second location includes (1) a battery integrated within the road vehicle, (2) at least one power converter electrically coupled to the battery for controlling charging and discharging of the battery, (3) a controller coupled to the at least one power converter for controlling operation of the power converter, and (4) a power coupling electrically coupled to the at least one power converter. The power coupling is for electrically coupling the road vehicle to a first power interface at the first location to receive electric power to charge the battery and for electrically coupling the road vehicle to a second power interface at the second location to deliver electric power from the battery to a load at the second location.

In an embodiment, an aircraft for transmitting electric power from a first location to a second location includes (1) a battery integrated within the aircraft, (2) at least one power converter electrically coupled to the battery for controlling charging and discharging of the battery, (3) a controller coupled to the at least one power converter for controlling operation of the power converter, and (4) a power coupling electrically coupled to the at least one power converter. The power coupling is for electrically coupling the aircraft to a first power interface at the first location to receive electric power to charge the battery and for electrically coupling the aircraft to a second power interface at the second location to deliver electric power from the battery to a load at the second location.

In an embodiment, a spacecraft for transmitting electric power from a first location to a second location includes (1) a battery integrated within the spacecraft, (2) at least one power converter electrically coupled to the battery for controlling charging and discharging of the battery, (3) a controller coupled to the at least one power converter for controlling operation of the power converter, and (4) a power coupling electrically coupled to the at least one power converter. The power coupling is for electrically coupling the spacecraft to a first power interface at the first location to receive electric power to charge the battery and for coupling the spacecraft to a second power interface at the second location to deliver electric power from the battery to a load at the second location.

In an embodiment, a method for providing energy security to an energy consumer includes (1) at a first location, charging a first energy store with energy from an electric power source, (2) transporting the first energy store to a second location, and (3) when a primary energy source at the second location is unavailable, discharging the first energy store to deliver energy to the energy consumer at the second location.

In an embodiment, a method for providing energy security to an energy consumer includes (1) at a first location, charging a first energy store with energy from a kinetic energy source, (2) transporting the first energy store to a second location, and (3) when a primary energy source at the second location is unavailable, discharging the first energy store to deliver energy to the energy consumer at the second location.

In an embodiment, a method for providing energy security to an energy consumer includes (1) at a first location, charging a first energy store with energy from a thermal energy source, (2) transporting the first energy store to a second location, and (3) when a primary energy source at the second location is unavailable, discharging the first energy store to deliver energy to the energy consumer at the second location.

In an embodiment, a method for providing a clean energy source to an energy consumer at a second location includes (1) at a first location, charging a first energy store with energy from an electric power source, the first location being remote from the second location, (2) transporting the first energy store to the second location, and (3) at the second location, discharging the first energy store to deliver energy to the energy consumer.

In an embodiment, a method for providing a clean energy source to an energy consumer at a second location includes (1) at a first location, charging a first energy store with energy from a kinetic energy source, the first location being remote from the second location, (2) transporting the first energy store to the second location, and (3) at the second location, discharging the first energy store to deliver energy to the energy consumer.

In an embodiment, a method for providing a clean energy source to an energy consumer at a second location includes (1) at a first location, charging a first energy store with energy from a thermal energy source, the first location being remote from the second location, (2) transporting the first energy store to the second location, and (3) at the second location, discharging the first energy store to deliver energy to the energy consumer.

In an embodiment, a mobile energy storage system includes either a truck or trailer chassis and an AC/DC subsystem disposed on the chassis, where the AC/DC subsystem is for interfacing the mobile energy storage system with an external AC system. The system additionally includes a battery subsystem including a flowing electrolyte battery disposed on the chassis and a DC/DC subsystem disposed on the chassis. The DC/DC subsystem is electrically coupled to the AC/DC subsystem via a first DC bus, and the DC/DC subsystem is electrically coupled to the battery subsystem via a second DC bus. The DC/DC subsystem is configured and arranged to control charging and discharging of the battery subsystem. The mobile energy storage system is configured and arranged to receive energy in the form of electric power from the external AC system for storage in the battery subsystem, and the mobile energy storage system is configured and arranged to provide energy stored in the battery subsystem to the external AC system in the form of electric power.

In an embodiment, a table for supporting a battery includes a first and a second leg for supporting the table, a sliding support, and a pivot foot. The sliding support includes a base for fastening to a respective supporting surface, a track affixed to the base, and a slide mechanically coupled to the track. The slide is configured and arranged to slide within the track, and the slide is pivotally connected to the first leg. The pivot foot includes a base for fastening to a respective supporting surface, and an inner member pivotally connected to the base and pivotally connected to the second leg.

In an embodiment, a vehicle for transmitting electric power from a first location to a second location includes (1) a first battery integrated within the vehicle for storing energy for moving the vehicle, (2) a second battery integrated within the vehicle for storing energy for transmitting from the first location to the second location, (3) at least one power converter electrically coupled to the second battery for controlling charging and discharging of the second battery, (4) a controller coupled to the at least one power converter for controlling operation of the power converter, and (5) a power coupling electrically coupled to the at least one power converter. The power coupling is for electrically coupling the vehicle to a first power interface at the first location to receive electric power to charge the second battery and for electrically coupling the vehicle to a second power interface at the second location to deliver electric power from the second battery to a load at the second location. The vehicle is configured and arranged such that energy can be transferred from the second battery to the first battery so that the energy for moving the vehicle is at least partially provided by the second battery.

A method for transporting energy from a first location to a second location includes (1) determining a cost to provide energy from an electric power source at the first location to a consumer at the second location, (2) determining a market price for energy at the second location, and (3) if the market price exceeds the cost to provide energy, charging a battery of an energy store from the electric power source at the first location, transporting the energy store to the second location, and selling energy stored in the battery of the energy store to the consumer at the second location.

BRIEF DESCRIPTION OF THE FIGURES

FIG. 4A shows a location based charge interface charging energy stores from an energy source under control of the energy movement controller of FIG. 3, in an embodiment.

FIG. 4B shows a location based discharge interface discharging energy from energy stores to an energy consumer under control of the sub-controller of FIG. 3, in an embodiment.

FIG. 5A shows energy store based charge interfaces charging energy stores from an energy source under control of the energy movement controller of FIG. 3, in an embodiment.

FIG. 5B shows energy store based discharge interfaces discharging energy from energy stores to an energy consumer under control of the sub-controller of FIG. 3, in an embodiment.

FIGS. 34 and 35 are side plan views of the table of FIG. 33.

FIG. 36 is a top perspective view of a sliding support, in an embodiment.

FIGS. 37-39 respectively show a front plan view, a side plan view, and a top plan view of the sliding support of FIG. 36.

DETAILED DESCRIPTION OF THE EMBODIMENTS

Figure 1:
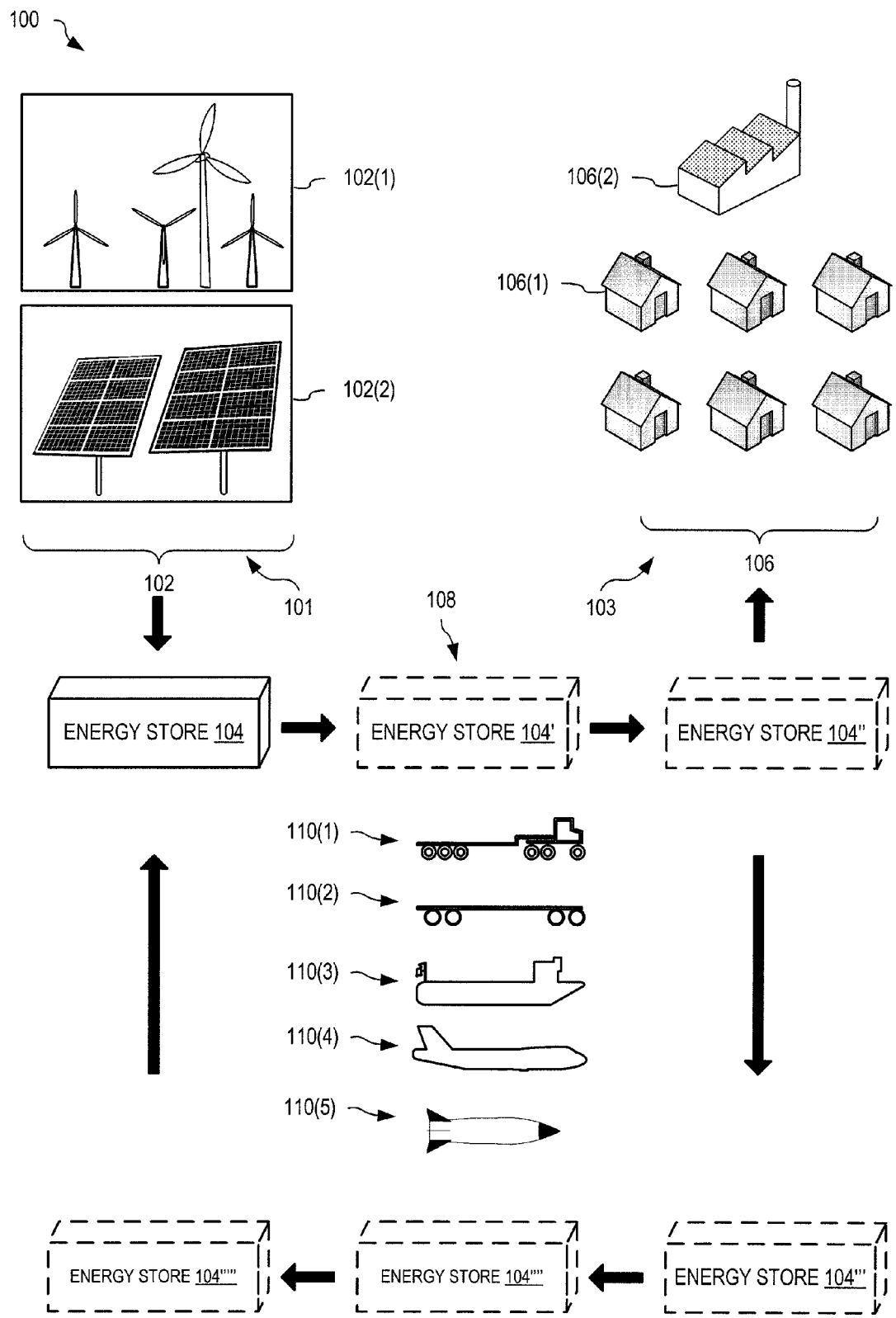
FIG. 1 shows one exemplary system for transporting energy from a first location to a second location, in an embodiment.

It is noted that, for purposes of illustrative clarity, certain elements in the drawings may not be drawn to scale. Specific instances of an item may be referred to by use of a numeral in parentheses (e.g., energy store 104(1)) while numerals without parentheses refer to any such item (e.g., energy stores 104).

Energy may be stored and transported in many forms, such as coal (open containers), natural gas (compressed gas cylinders), electrical energy (battery), kinetic energy (flywheel), and so on. Certain forms of stored energy are easier to transport than others; however, it is not always efficient to convert the easily transportable energy into alternate forms to make it readily available for use. For example, it is more efficient to convert coal into electrical energy at large purpose built power stations; smaller coal power stations are less efficient, and it is therefore impractical to convert coal into power in small quantities. Where a coal power station supplies electrical energy to, and is proximate to, many large towns, it is more convenient and efficient to supply energy in the form of coal to the power station. In another example, kinetic energy of underwater streams is converted into electrical energy using rotors and generators. However, unless the underwater current is close to land, it is often prohibitively expensive to run underwater power cables from the generators to consumers on the land. In another example, kinetic energy of wind is converted into electrical energy and used to supply electrical power to a power grid, which in turn supplies electrical energy to consumers.

Where it is not feasible to generate electrical energy effectively (e.g., by converting coal or natural gas into electricity using large turbines) at a location and not possible to provide electrical energy to that location via power conductors, an alternate form of energy is converted into electrical energy using less effective techniques.

Thus, in certain scenarios, it is desirable to convey energy from a first location to a second location, particularly where the energy is generated effectively and cheaply at the first location. Further, it is desirable to store the energy in a form whereby it is easily transported and readily usable at the destination.

FIG. 1 shows one exemplary system 100 for transporting energy from a first location 101 to a second location 103. Energy from a first source 102(1), 102(2) is stored within an energy store 104 at first location 101. For example, first energy source 102 may be any of: a coal/gas/nuclear power station, a wind farm, a solar array, an underwater turbine, a geothermal power generator, and so on. That is, any convenient energy source may be used to supply energy for storage into energy store 104. Energy store 104 includes, for example, a battery, a capacitor, a mechanical energy storage device (e.g., a flywheel or a compressed air storage tank), and/or a thermal energy storage device.

Energy store 104 is then transported 108 (shown as energy store 104') to second location 103, where the energy from energy store 104 (shown as energy store 104") is provided to consumers 106(1) and 106(2). As known in the art, energy may be converted from one form to another. For example, electrical energy may be converted into kinetic energy (e.g., using an electric motor) to pump water, electrical energy may be used to power a compressor to pressurize a gas, electrical energy may be converted into heat, electrical energy may be converted into light, and so on. Thus, energy of energy store 104 may be converted into a form desired by consumer 106.

Energy store 104 may be transported by any convenient means, such as one or more of road 110(1) (trucks), rail 110(2) (train), water 110(3) (watercraft such as a ship or barge), air 110(4) (plane), and space 110(5) (rocket). The type of transport used may depend upon the geographic terrain between the first and second locations. For example, where the second location is an island, water transport 110(3) may be favorable. In some embodiments, energy stored in energy store 104 is used to provide at least some of the energy required for transporting 108 energy store 104 from first location 101 to second location 103 and/or vice versa. In these embodiments, some energy is optionally retained in energy store 104 after delivery of energy to consumers 106 to allow for energy store 104 to at least partially provide energy for transporting energy store 104 from location 103 to location 101.

In certain situations, it is desirable that the value of energy sold to consumer 106 is greater than the cost of filling energy store 104 from energy source 102 at first location 101, transporting energy store from first location 101 to second location 103, and returning empty energy store 104 to first location 101. The cost of filling energy store 104 includes, for example, the cost to operate an electric power source or the cost to purchase energy from an electric power source. Further, where energy cost for consumer 106 are high (e.g., where cheap energy sources are impractical at second location 103), system 100 may reduce energy costs for consumer 106, or make energy available to consumer 106 where it may otherwise be unavailable.

System 100 may supply energy continuously to consumer 106 by ensuring the quantity and frequency of energy stores 104 transported to second location 103 meet energy demands of consumer 106. Energy may be supplied to the consumer in any desired form. For example, energy of energy store 104 may be converted into another form, such as compressed air, for supply to consumer 106.

Certain embodiments of system 100 may be used to provide energy security to consumer 106. Such embodiments, for example, may be used to provide energy to consumer 106 in the event a primary power source at location 103 fails, such as the result of failure of an electric power plant or transmission line.

Certain embodiments of system 100 may be used to provide clean energy at location 103. For example, if location 103 is particularly environmentally sensitive, system 100 may be used to shift energy conversion (e.g., electric power generation) from location 103 to location 101, thereby preventing environmental harm at location 103 due to energy conversion.

Figure 2:
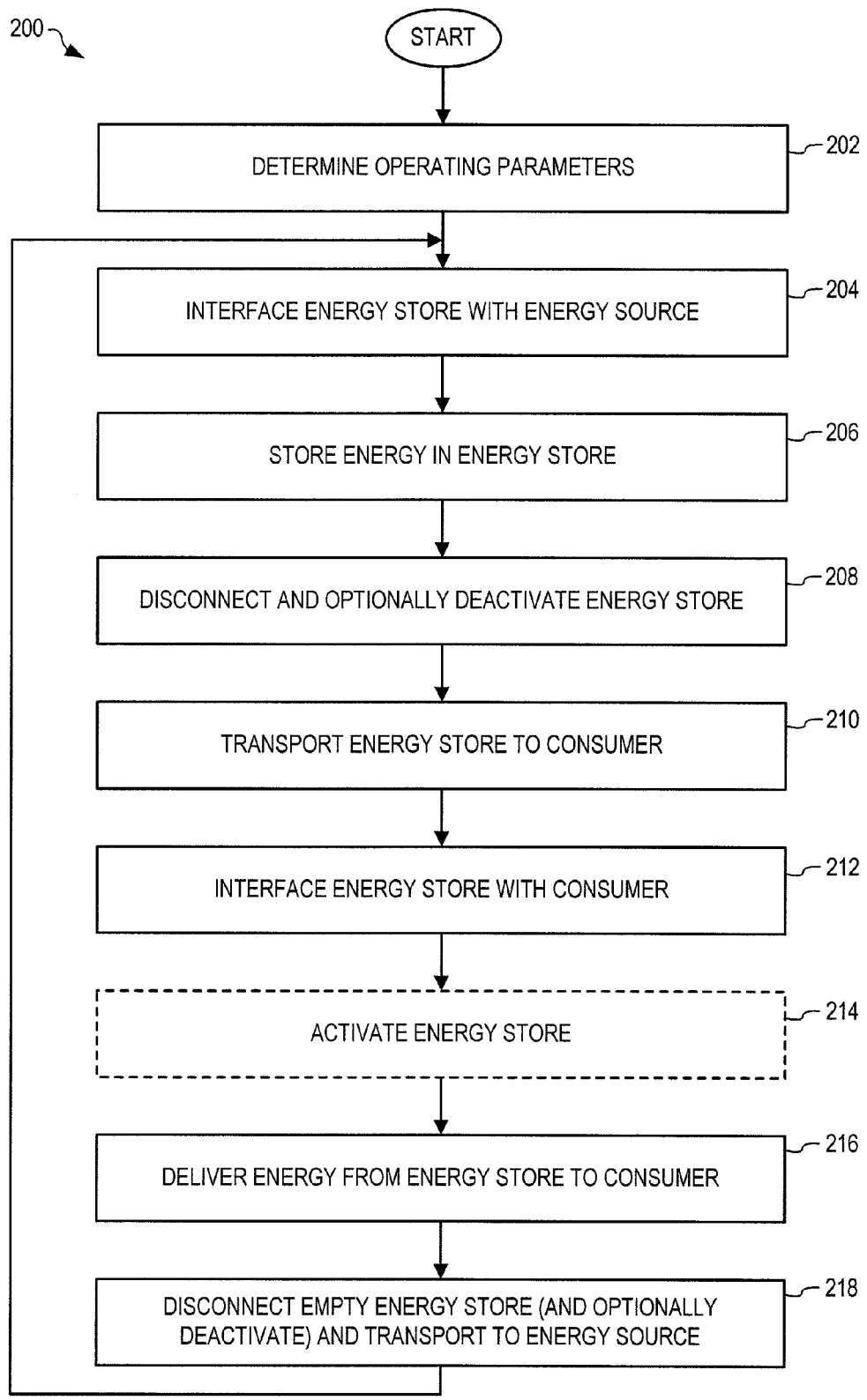
FIG. 2 is a flowchart illustrating one exemplary method for transporting energy from a first location to a second location, in an embodiment.
Figure 3:
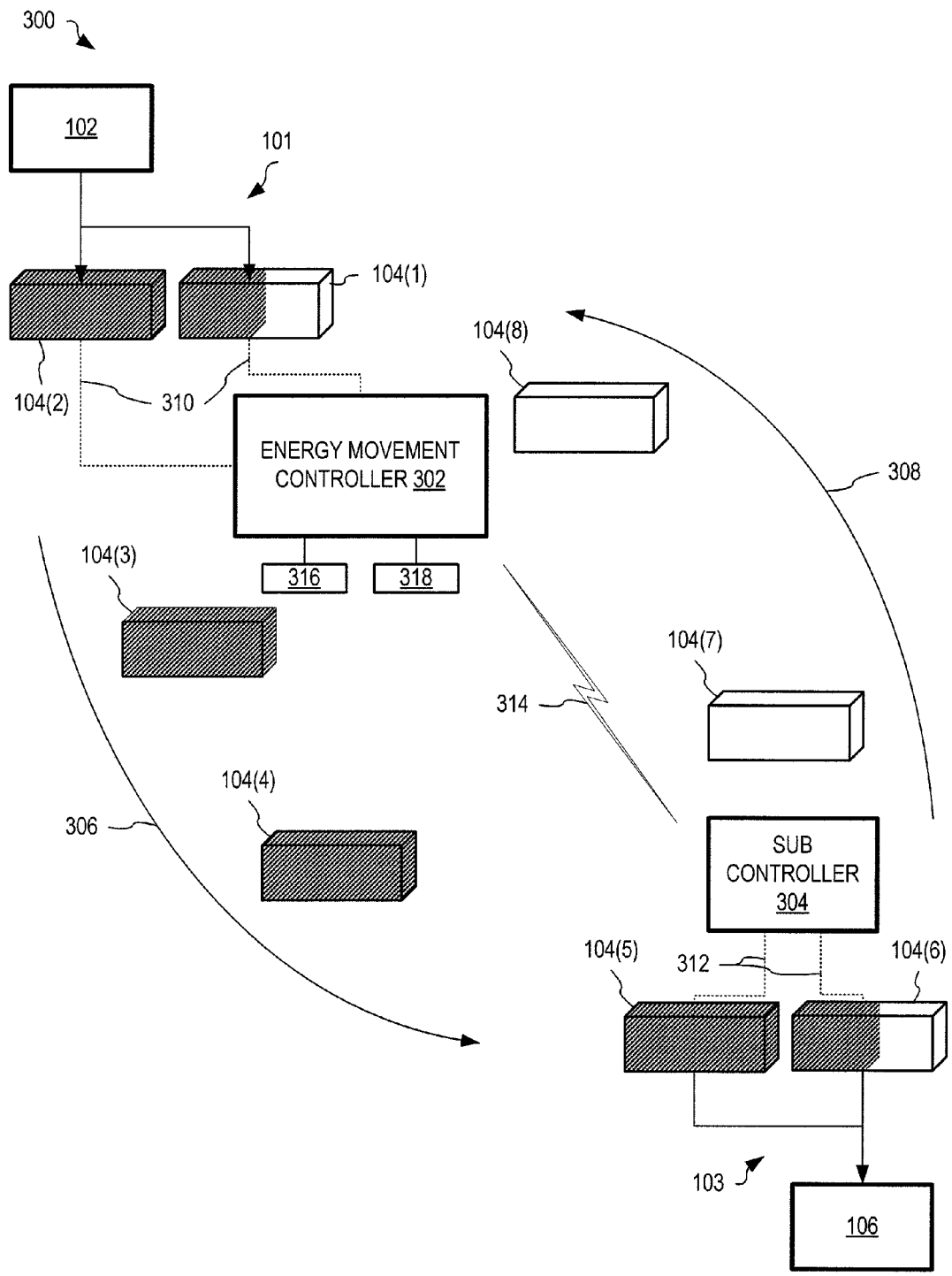
FIG. 3 shows exemplary movement of energy from a first location to a second location, in an embodiment.

FIG. 2 is a flowchart illustrating one exemplary method 200 for transporting energy from first location 101 to second location 103. FIG. 3 shows exemplary scenario 300 illustrating movement of energy from first location 101 to second location 103. FIGS. 2 and 3 are best viewed together with the following description.

An energy movement controller (EMC) 302 implements method 200 to control movement of energy stores 104 to maintain energy supply to customer 106 from energy source 102. EMC 302 determines operating parameters (step 202) such as (a) optimal size of energy store 104 based upon energy source 102, energy requirements of consumer 106 and time and cost of transporting energy stores 104 between first location 101 and second location 103, (b) number of energy stores 104 required to maintain energy supply to consumer 106, and (c) optimal transportation for energy stores 104. In one example, each energy store 104 is in the form of a ship (i.e., a ship configured as energy store 104) that self transports between first location 101 and second location 103, wherein EMC 302 determines the expected charge time of energy store 104 from energy source 102, the expected discharge time of energy store 104 to consumer 106, and the expected transport time of energy store 104 between first location 101 and second location 103, and from second location 103 to first location 101. EMC 302 then determines the number of energy stores 104 required to ensure that consumer 106 is never without power. EMC 302 also takes into account efficiency of energy stores 104 and may maintain statistical data for each energy store 104. In one embodiment, each energy store 104 includes wireless communication capability for communicating status information to EMC 302.

EMC 302 optionally interfaces with an energy source database 316 and an energy store tracking log 318 to assist in implementing method 200, as discussed below. Energy source database 316 includes information on availability and pricing of energy sources 102, and energy store tracking log 318 includes information on energy store 104 inventory.

EMC 302 interfaces an empty (or partially empty) energy store 104(1) with energy source 102 (step 204) such that energy is stored (step 206) in energy store 104(1). EMC 302 may maintain one or more energy stores 104 connected to energy source 102 such that energy from energy source 102 is stored continually within at least one energy store 104. Alternatively, EMC 302 may connect energy stores 104 to energy source 102 only until they are full, such that there are periods when no energy store 104 is being charged from energy source 102.

EMC 302 communicates 310 with each connected energy store 104(1), 104(2) to monitor charge. Once energy store 104(2) is full, EMC 302 disconnects (step 208) energy store 104(2) from energy source 102 and optionally deactivates energy store 104(2) for transport. For example, where a Zinc flow battery is used as energy store 104(2) to store electricity, the Zinc flow battery may be deactivated (i.e., made safe) for transport as described in U.S. Patent Application Publication No. 2006/0251957 to Darcy et al., incorporated herein by reference.

Energy store 104(3) is then ready for transport (step 210) to consumer 106 at second location 103. EMC 302 determines optimal grouping of energy stores 104 for transport to second location 103 based upon the required time for transporting energy stores 104 to second location 103, and the number of energy stores 104 that are transported together, and the energy requirements and usage of consumer 106. In particular, EMC 302 starts the transport of energy store 104(3) to second location 103 such that delivery of energy to consumer 106 is maintained. In the example of FIG. 3, two energy stores 104(3) and 104(4) are in transit from first location 101 to second location 103 as required by a duration 306 of such transit.

Upon arrival at second location 103, full energy store 104(5) is interfaced (step 212) to consumer 106, and optionally activated (step 214) and is ready for delivery (step 216) of energy to consumer 106. In one example of operation, EMC 302 ensures that at least one full energy store 104(5) is connected and activated at second location 103 such that no break in power results from the exhaustion of discharging energy store 104(6).

A sub-controller 304 at second location 103 communicates 312 with energy stores 104(5) and 104(6) to monitor discharge states of energy stores 104(5) and 104(6). Sub-controller 304 may communicate 314 with EMC 302 such that EMC 302 may monitor and predict energy usage by consumer 106 and thus adjust supply rate of energy stores 104 to second location 103.

Once sub-controller 304 determines that energy store 104(6) is empty, sub-controller 304 disconnects (step 218) energy store 104(6), optionally deactivates energy store 104(6), and transports energy store 104(6) back to first location 101. Depending upon the duration 308 of this transit, zero, one or more energy stores 104 may be in transit back to first location 101 at any one time. In the example of FIG. 3, empty energy stores 104(7) and 104(8) are shown in transit back to first location 101 from second location 103. In one embodiment, EMC 302 and/or sub-controller 304 optionally control discharging of energy stores 104(5) and 104(6) at second location 103 such that some energy remains in energy stores 104(5) and 104(6) for use in transporting energy stores 104(5) and 104(6) back to first location 101.

Thus, EMC 302 may maintain continuous energy movement by transporting energy stores between energy source 102 and consumer 106. Further, EMC 302 may operate to transport energy from energy source 102 to multiple consumers 106 and each consumer 106 may receive energy from multiple energy sources 102 without departing from the scope hereof. More particularly, EMC 302 and sub-controller 304 operate to transport power in both space and time. For example, EMC 302 may operate to charge energy stores 104 during of-peak hours (i.e., when energy demand and energy prices are lower) and then transport the energy stores for discharge to customer 106, thereby providing cheaper energy to consumer 106. Where energy source 102 is a wind farm, energy is typically generated whenever sufficient wind blows. Thus, the use of system 300 further improves the efficiency of energy harvesting by utilizing (i.e., charging energy stores 104) all available energy.

FIG. 4A shows a location based charge interface 402 charging energy stores 104 from energy source 102 under control of EMC 302. Charge interface 402 converts energy of energy source 102 into a suitable form for storage in energy stores 104. In particular, charge interface 402 remains located with energy source 102 to charge each energy store 104 at the first location. In an embodiment, energy source 102 provides electrical energy that is converted by charge interface 402 into a form suitable for storage in energy store 104. For example, where energy store 104 stores direct current (DC) electrical energy (e.g., energy store 104 is a Zinc flow or other type of battery) and energy source 102 provides alternating current (AC) electrical energy, charge interface 402 may include one or more transformers, and one or more AC/DC converters. EMC 302 communicates with charge interface 402 to control charge of energy stores 104 and to connect and disconnect energy source 102 from energy stores 104. For example, EMC 302 may control charge interface 402 to provide energy to each connected energy store 104 based upon determined energy store conditions. In another embodiment, energy source 102 supplies variable voltage DC electricity and charge interface 402 includes one or more DC/DC converters to control the voltage and current supplied to each energy store 104 based upon control from EMC 302.

FIG. 4B shows a location based discharge interface 454 discharging energy from energy stores 104 to energy consumer 106. Discharge interface 454 converts energy from connected energy stores 104 to a form suitable for use by energy consumer 106. In particular, discharge interface 454 remains located with energy consumer 106 to discharge each energy store 104 at second location 103. In an embodiment, energy store 104 provides DC electricity (e.g., energy store 104 is a Zinc flow or other type of battery) that is converted by discharge interface 454 into AC electrical energy at 120 volts, as required by consumer 106; discharge interface 454 may contain zero, one or more transformers, and one or more DC/AC converters. Sub-controller 304 communicates with discharge interface 454 to control discharge of energy stores 104 and to connect and disconnect energy stores 104 from energy consumer 106. For example, sub-controller 304 may control discharge interface 454 to provide energy from each connected energy store 104, based upon determined energy store conditions, to consumer 106.

FIG. 5A shows energy store based charge interfaces 502 charging energy stores 104 from energy source 102 under control of EMC 302. In particular, each energy store 104 has an integrated charge interface 502 (e.g., energy store 104(2) has an integrated charge interface 502(2)) that converts energy from energy source 102 into a form for storage within energy store 104. Charge interface 502 may be similar to charge interface 402 of FIG. 4A, but may be configured to charge a single energy store 104. For example, charge interface 502 may include zero, one or more of each of: a transformer, an AC/DC converter, and a DC/DC converter. EMC 302 communicates with charge interface 502 to control charge of energy store 104 and to connect and disconnect energy source 102 from energy stores 104. For example, EMC 302 may control charge interface 502 to provide energy to energy store 104 based upon determined energy store conditions.

FIG. 5B shows energy store based discharge interfaces 552 discharging energy from energy stores 104 to energy consumer 106. In particular, each energy store 104 has an integrated discharge interface 552 (e.g., energy store 104(5) has an integrated discharge interface 552(5)) that converts energy from energy store 104 into a form for delivery to consumer 106. Discharge interface 552 may be similar to discharge interface 454 of FIG. 4B, but may be configured to discharge a single energy store 104. For example, discharge interface 552 may include zero, one or more of each of: a transformer, a DC/AC converter, and a DC/DC converter. Sub-controller 304 communicates with discharge interface 552 to control discharge of energy store 104 and to connect and disconnect energy consumer 106 from energy store 104. For example, sub-controller 304 may control discharge interface 552 to provide energy to energy consumer 106 based upon determined energy store conditions.

Figure 6:
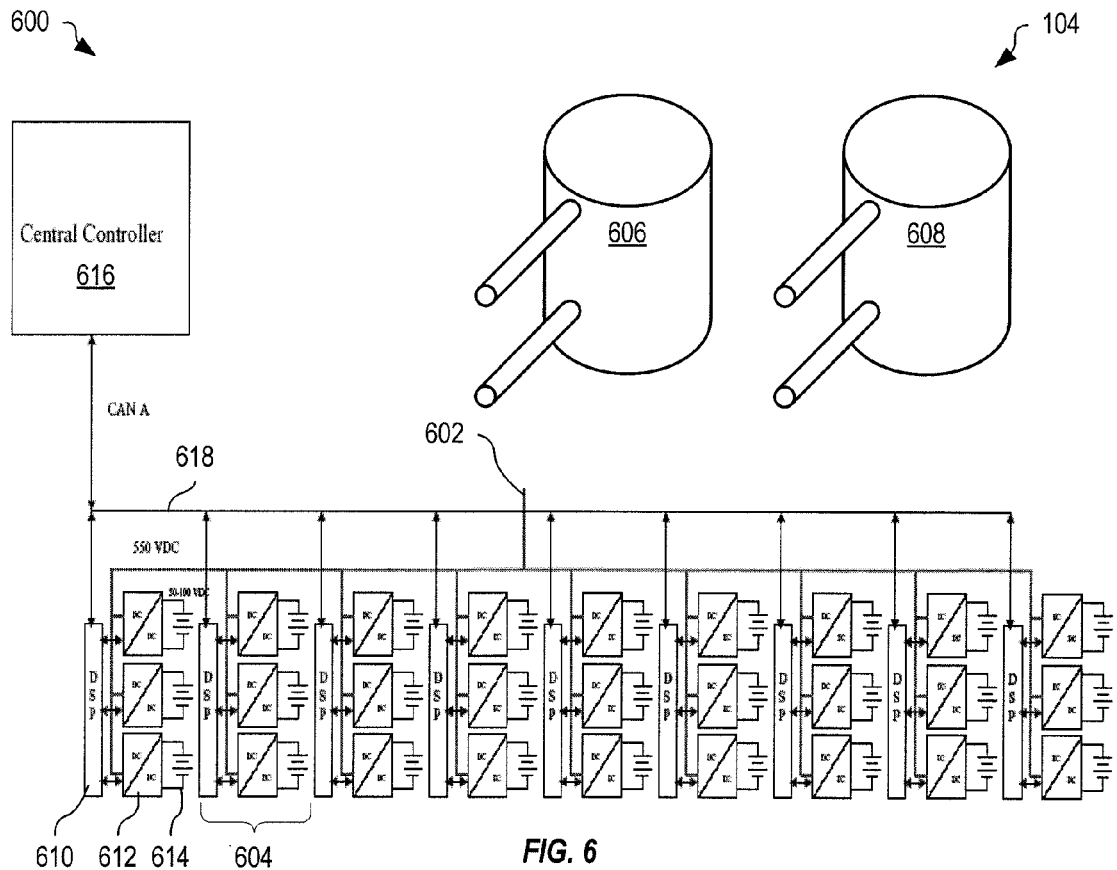
FIG. 6 is a schematic illustrating one exemplary energy store in the form of a Zinc flow battery, in an embodiment.

FIG. 6 is a schematic illustrating one exemplary energy store 104, FIG. 1, in the form of a Zinc flow battery 600. Battery 600 has a DC input/output bus 602 for charging and discharging electrical energy to and from battery 600, a plurality of stacks 604, at least one anolyte tank 606 and at least one catholyte tank 608. Each stack has a digital signal processor (DSP) 610 and a plurality of DC/DC converters 612 connected to a flow cell 614. Each DSP 610 communicates, via a bus 618, with a central controller 616 that monitors and controls charging and discharging of each individual cell 614. Anolyte tank 606 and catholyte tank 608 connect (not shown for clarity of illustration) to each cell 614. In particular, DSPs 610, under control of controller 616, and partially autonomously, control waveforms of DC/DC converters 612 to maintain even plating of plates within each cell 614. Central controller 616 also controls flow of anolyte from anolyte tank 606 and flow of catholyte from catholyte tank 608 though each cell 614 based upon determined charge and discharge conditions. In certain embodiments of battery 600, at least two stacks 604 are individually controlled, such as using systems and methods disclosed in U.S. Patent Application Publication No. 2005/0084745 to Colello et al., which is incorporated herein by reference. Furthermore, certain embodiments of battery 600 include a leak detection subsystem, such as disclosed in U.S. Patent Application Publication No. 2008/0050646 to Winter, which is incorporated herein by reference.

Figure 7:
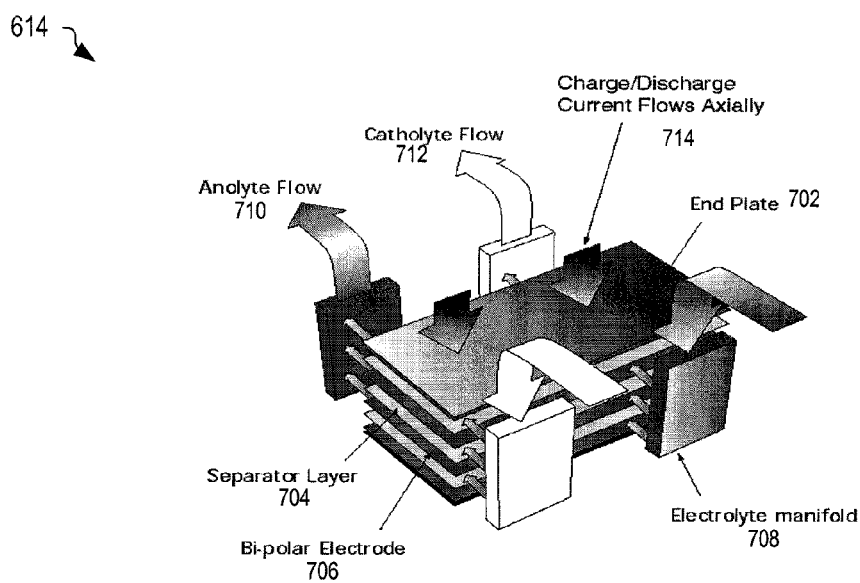
FIG. 7 shows one exemplary flow cell of the Zinc flow battery of FIG. 6, in further detail.

FIG. 7 shows one exemplary flow cell 614 in further detail. In particular, cell 614 is shown with an end plate 702, separation layers 704, bi-polar electrodes 706, and electrolyte manifolds 708. An anolyte flow 710 and a catholyte flow 712 through cell 614 from and to anolyte tank 606 and catholyte tank 608, respectively. Charge/discharge current flows axially 714 though cell 614. Further detail of an embodiment of cell 614 may be found in U.S. Pat. No. 5,607,788 to Tomazic, which is incorporated herein by reference.

Figure 8A:
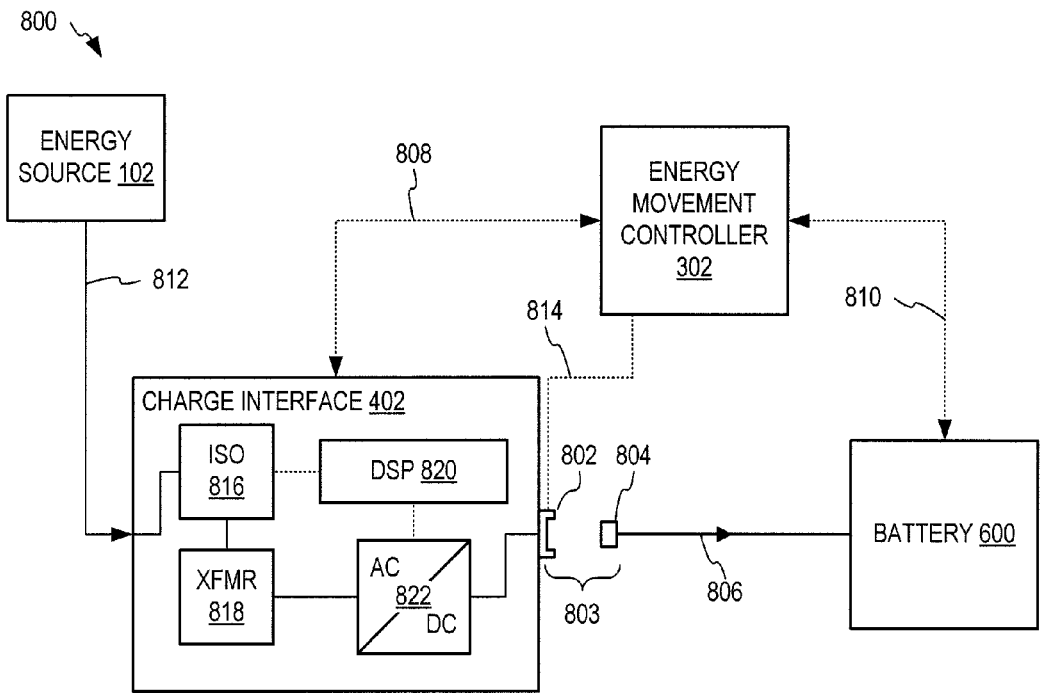
FIG. 8A shows exemplary connectivity between the energy source and the battery of FIG. 6 using the charge interface of FIG. 4 when located with the energy source, in an embodiment.

FIG. 8A shows exemplary connectivity 800 between energy source 102 and battery 600 using charge interface 402 based at the location of energy source 102 (i.e., charge interface 402 is located at first location 101). In particular, battery 600 represents transportable energy store 104 that is charged by connection, via charge interface 402, to energy source 102. Charge interface 402 is shown with an isolator 816 that connects and disconnects charge interface 402 to and from energy source 102 via a power conductor 812, an optional transformer 818 that is used to change voltage where energy source 102 provides AC electricity, an AC to DC converter 822 that converts the AC electricity into DC electricity, and a DSP 820 that monitors and controls isolator 816 and AC to DC converter 822. DSP 820 may also communicate with EMC 302 via communication path 808 to receive control instructions and provide EMC 302 with status information.

Charge interface 402 connects with battery 600 using a detachable coupler 803 shown as a socket 802 and a plug 804 in the example of FIG. 8A. Socket 802 is permanently attached to charge interface 402 and plug 804 couples therewith to electrically connect battery 600 to charge interface 402 via a power conductor 806. In one example, coupler 803 is a conventional contact connector. Coupler 803 may also include one or more sensors that may be monitored by EMC 302, via communication path 814, for purposes of safety. Coupler 803 may also include mechanical safety features, used in the art for safety of electrical coupling. Coupler 803 may represent one of many power connectors known in the art. See for example, Single and Multi-Gang High Amperage High Power Plugs, Connectors and Receptacles of Duraline®.

EMC 302 may communicate with battery 600 via a communication path 810 to receive status information of battery 600. Communication paths 808, 810 and 814 may be wired and/or wireless.

Figure 8B:
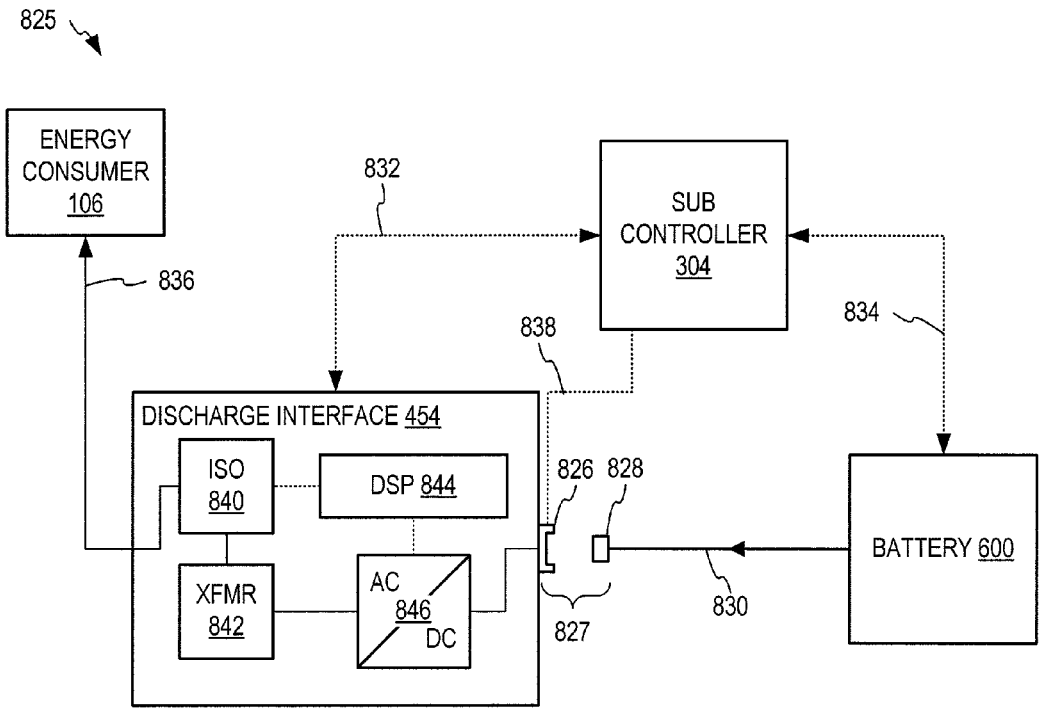
FIG. 8B shows exemplary connectivity between the energy consumer and the battery of FIG. 6 using the discharge interface of FIG. 4 located with the energy consumer, in an embodiment.

FIG. 8B shows exemplary connectivity 825 between energy consumer 106 and battery 600 using discharge interface 454 based at the location of energy consumer 106 (i.e., discharge interface 454 is located at second location 103). In particular, battery 600 represents transportable energy store 104 that is discharged through discharge interface 454 to provide electrical energy to energy consumer 106 via a power conductor 836. In particular, discharge interface 454 is shown with an isolator 840 that connects and disconnects discharge interface 454 to and from energy consumer 106, an optional transformer 842 that is used to change voltage of provided AC electricity to energy consumer 106, an DC to AC converter 846 that converts DC electricity from battery 600 into AC electricity, and a DSP 844 that monitors and controls isolator 840 and DC to AC converter 846. DSP 844 may also communicate with sub-controller 304 via a communication path 832 to receive control instructions and provide sub-controller 304 with status information.

Discharge interface 454 connects with battery 600 using a detachable coupler 827 shown as a socket 826 and a plug 828 in the example of FIG. 8B. Socket 826 is permanently attached to discharge interface 454 and plug 828 couples therewith to electrically connect battery 600 to discharge interface 454 via a power conductor 830. In one example, coupler 827 is a conventional contact connector. Coupler 827 may also include one or more sensors that may be monitored by sub-controller 304, via communication path 838, for purposes of safety. Coupler 827 may also include mechanical safety features, used in the art for safety of electrical coupling.

Sub-controller 304 may communicate with battery 600 via a communication path 834 to control power delivery and receive status information. Communication paths 832, 834 and 838 may be wired and/or wireless.

Figure 8C:
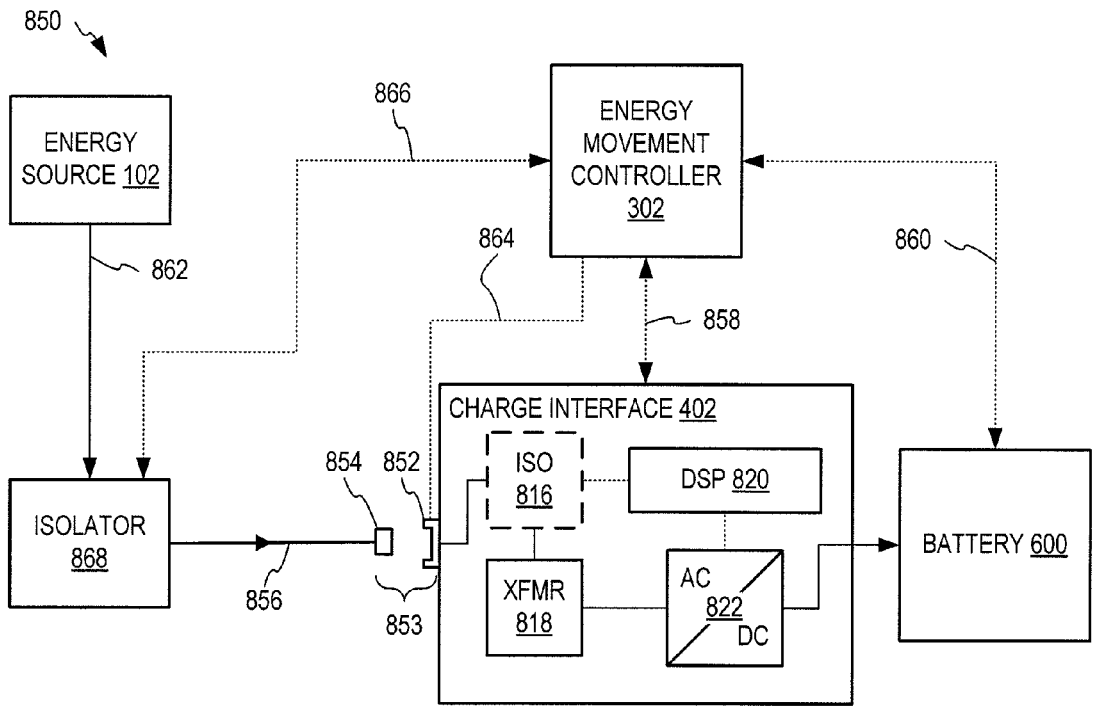
FIG. 8C shows exemplary connectivity between the energy source and the battery of FIG. 6 when the charge interface is integrated with the battery, in an embodiment.

FIG. 8C shows exemplary connectivity 850 between energy source 102 and battery 600 with charge interface 402 integrated with battery 600 (i.e., charge interface 402 is integrated within energy store 104, as depicted in FIG. 5A). In particular, charge interface 402 and battery 600, in combination, represent transportable energy store 104 that is charged by connection to energy source 102 via a power conductor 862 and an optional isolator 868. EMC 302 may monitor and/or control isolator 868 via a communication path 866. Charge interface 402 is shown with an isolator 816 that connects and disconnects charge interface 402 to and from energy source 102 via a power conductor 862, an optional transformer 818 that is used to change voltage where energy source 102 provides AC electricity, an AC to DC converter 822 that converts the AC electricity into DC electricity, and a DSP 820 that monitors and controls isolator 816 and AC to DC converter 822. DSP 820 may also communicate with EMC 302 via communication path 858 to receive control instructions and provide EMC 302 with status information.

Charge interface 402 is permanently connected to battery 600. A detachable coupler 853 is shown as a socket 852 and a plug 854 in the example of FIG. 8C. Socket 852 is permanently attached to charge interface 402 and plug 854 couples therewith to electrically connect charge interface 402 to energy source 102 via a power conductor 856 and optional isolator 868. In one example, coupler 853 is a conventional contact connector. In another example, coupler 853 is an inductive coupler. Coupler 853 may also include one or more sensors that may be monitored by EMC 302, via a communication path 864, for purposes of safety. Coupler 853 may also include mechanical safety features, used in the art for safety of electrical coupling. Isolator 868 may be used to disconnect plug 854 from energy source 102 for safety when connecting and disconnecting plug 854 from socket 852.

EMC 302 may communicate with battery 600 via a communication path 860 to receive status information of battery 600. Communication paths 858, 860, 864 and 866 may be wired and/or wireless.

Figure 8D:
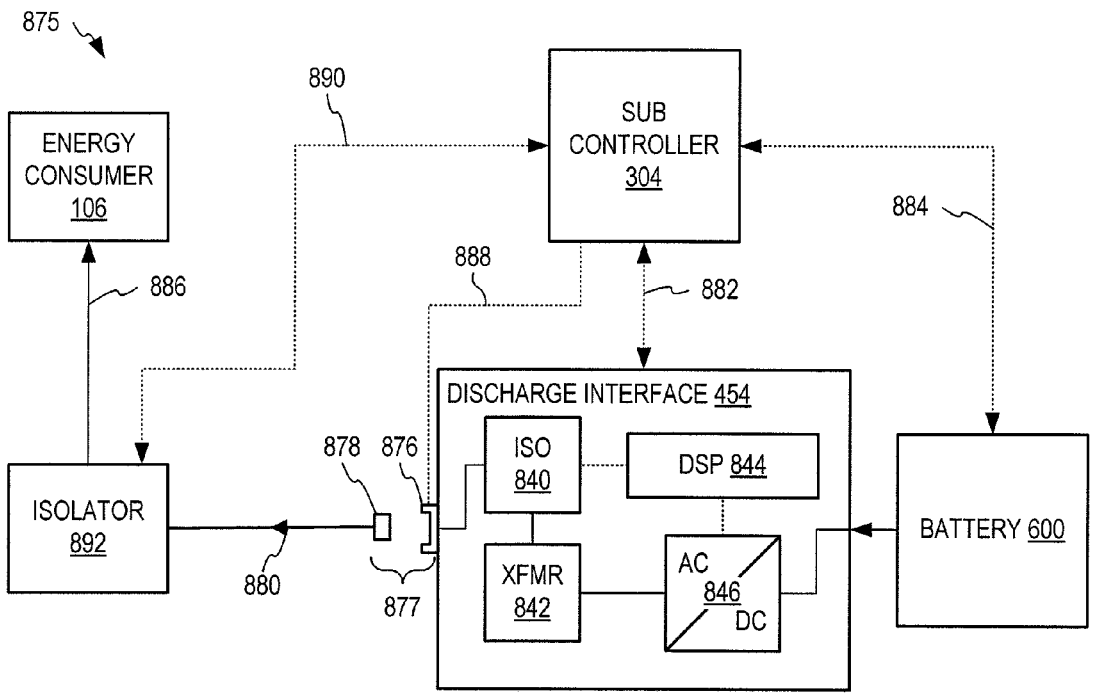
FIG. 8D shows exemplary connectivity between the energy consumer and the battery of FIG. 6 when the discharge interface is integrated with the battery, in an embodiment.

FIG. 8D shows exemplary connectivity 875 between energy consumer 106 and battery 600 using discharge interface 454 integrated with battery 600 (i.e., discharge interface 454 is integrated with energy store 104, as depicted in FIG. 5B). In particular, discharge interface 454 and battery 600, in combination, represent transportable energy store 104 that is discharged to provide electrical energy to energy consumer 106 via an optional isolator 892 and power conductor 886. Sub-controller 304 may control and/or monitor optional isolator 892 via a communication path 890. Discharge interface 454 is shown with an isolator 840 that connects and disconnects discharge interface 454 to and from energy consumer 106, an optional transformer 842 that is used to change voltage of provided AC electricity to energy consumer 106, an DC to AC converter 846 that converts DC electricity from battery 600 into AC electricity, and a DSP 844 that monitors and controls isolator 840 and DC to AC converter 846. DSP 844 may also communicate with sub-controller 304 via a communication path 882 to receive control instructions and provide sub-controller 304 with status information.

Discharge interface 454 is permanently connected to battery 600. A detachable coupler 877 is shown as a socket 876 and a plug 878 in the example of FIG. 8D. Socket 876 is permanently attached to discharge interface 454 and plug 878 couples therewith to electrically connect battery 600, via discharge interface 454, a power connector 880, and optional isolator 892, to energy consumer 106. In one example, coupler 877 is a conventional contact connector. In another example, coupler 877 is an inductive coupler. Coupler 877 may also include one or more sensors that may be monitored by sub-controller 304, via a communication path 888, for purposes of safety. Coupler 877 may also include mechanical safety features, used in the art for safety of electrical coupling. Isolator 892 may be used to isolate plug 878 from energy consumer 106 for safety when connecting and disconnecting plug 878 from socket 876. Isolator 892 may also be monitored and/or controlled by sub-controller 304.

Sub-controller 304 may communicate with battery 600 via a communication path 884 to control power delivery and receive status information. Communication paths 882, 884, 888 and 890 may be wired and/or wireless.

In an embodiment, at least one of power conductors 812, 836, 862, and 886 includes a cable having at least two conductors twisted together to reduce parasitic inductance of the cable. In another embodiment, at least one of power conductors 812, 836, 862, and 886 includes a cable having at least two conductors formed in a laminated bus bar configuration to reduce parasitic inductance of the cable.

Figure 9A:
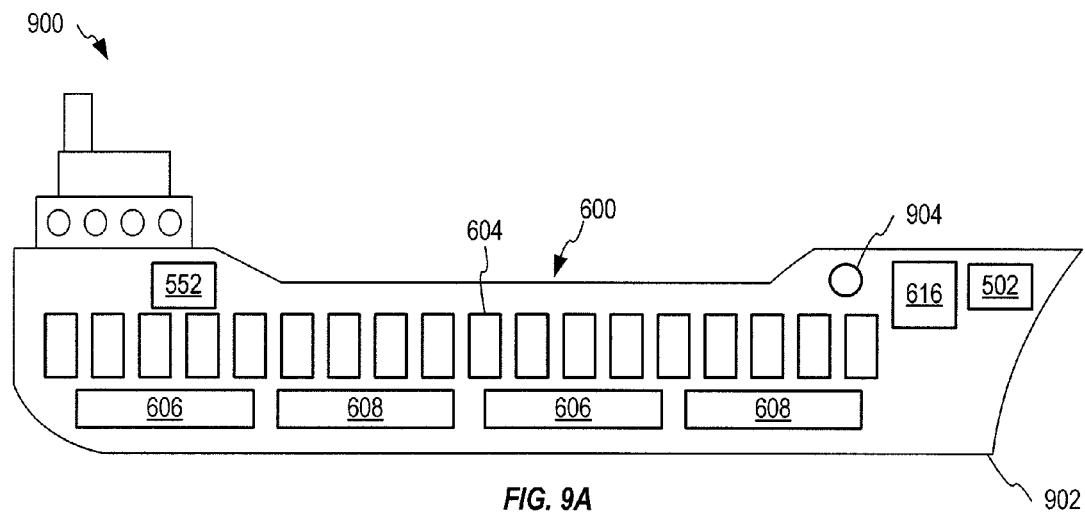
FIG. 9A is a schematic of an electrical energy transport ship that stores electrical energy for transport from the first location to the second location, in an embodiment.
Figure 9B:
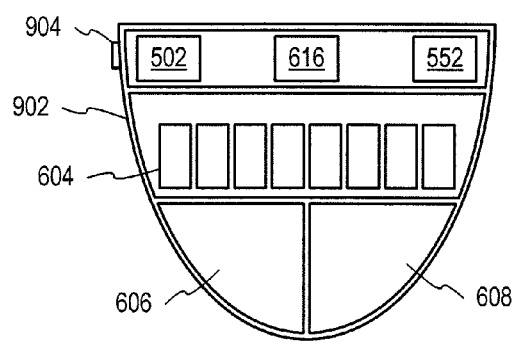
FIG. 9B shows a cross section through the energy transport ship of FIG. 9A, in an embodiment.

FIG. 9A is a schematic of an exemplary electrical energy transport watercraft or ship 900 that stores electrical energy for transport from first location 101 to second location 103. FIG. 9B shows a cross section 950 through energy transport ship 900 of FIG. 9A. FIGS. 9A and 9B are best viewed together with the following description.

Ship 900 has a conventional hull 902 that is for example custom fitted with battery 600, FIG. 6, and includes one or more anolyte tanks 606, one or more catholyte tanks 608, a plurality of stacks 604, an central controller 616, and at least one power coupling 904. Optionally, ship 900 may include at least one charge interface 502 for converting supplied energy into a form suitable for storage within battery 600 and at least one discharge interface 552 for converting energy from battery 600 into a form suitable for supply to customer 106. Power coupling 904 provides connectivity for charging and discharging electrical energy transport ship 900. Ship 900 may include conventional propulsion systems (not shown), or may include an electrical propulsion system (not shown) that utilizes power of battery 600. In certain embodiments, battery 600 is at least partially cooled using water from a body of water that the ship is floating on.

Coupling 904 may include a contact coupling and/or an induction coupling. Coupling 904 may include a safety interlock operable to prevent coupling or decoupling when battery 600 is active. Ship 900 may be configured with two coupling devices; one for charging and one for discharging. Each coupling device may include safety interlock features to prevent accidental coupling or decoupling when powered.

In an embodiment, transport ship 900 is automated (i.e., computer controlled) for traveling between energy source 102 and consumer 106, under control of EMC 302, thereby requiring minimal or no crew.

Figure 10A:
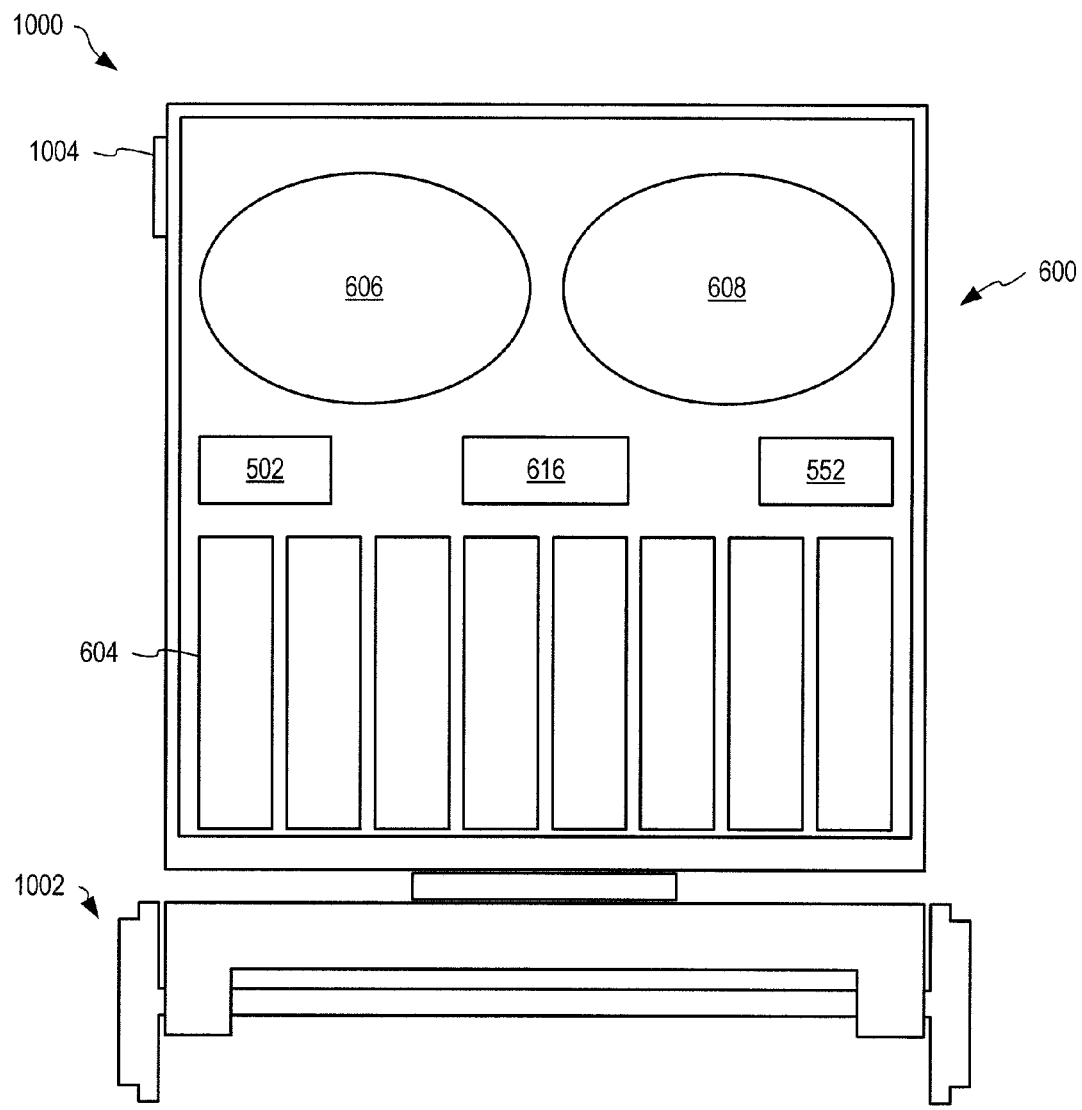
FIG. 10A is a schematic of an exemplary electrical energy transport rail car that stores electrical energy for transport from the first location to the second location, in an embodiment.
Figure 10B:
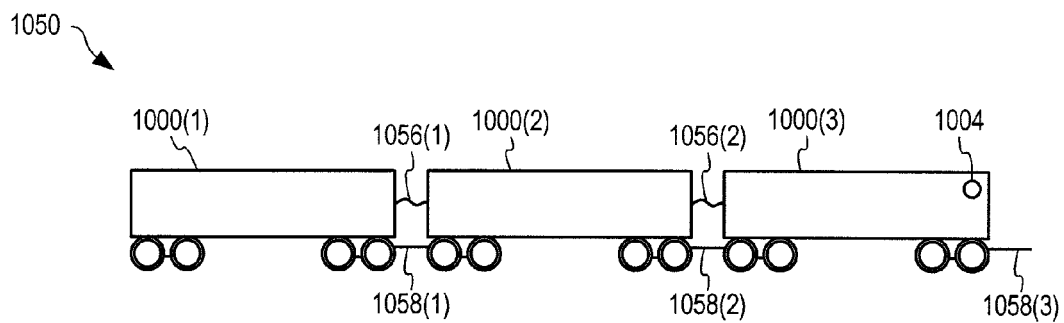
FIG. 10B shows three rail cars of FIG. 10A to form a portion of a train, in an embodiment.

FIG. 10A is a schematic of an exemplary electrical energy transport rail car 1000 that stores electrical energy for transport from first location 101 to second location 103. FIG. 10B shows three rail cars of FIG. 10A connected together to form a portion of a train 1050. FIGS. 10A and 10B are best viewed together with the following description. Rail car 1000 represents a conventional rail transportation platform 1002 that is custom fitted with battery 600 of FIG. 6, and includes one or more anolyte tanks 606, one or more catholyte tanks 608, a plurality of stacks 604, central controller 616, and at least one power coupling 1004. Optionally, rail car 1000 may include at least one charge interface 502 for converting supplied energy into a form suitable for storage within battery 600 and at least one discharge interface 552 for converting energy from battery 600 into a form suitable for supply to customer 106.

Power coupling 1004 provides connectivity for charging and discharging electrical energy transport rail car 1000. As shown in FIG. 10B, rail cars 1000 may be coupled together mechanically by conventional train linkage 1058 and electrically by electrical coupling 1056. Where the engine pulling the train utilizes electrical motors, at least part of the power to propel the train may be provided by one or more of rail cars 1000.

Coupling 1004 may include a contact coupling and/or an induction coupling. Coupling 1004 may include a safety interlock operable to prevent coupling or decoupling when battery 600 is active. Electrical energy transport rail car 1000 may be configured with two coupling devices; one for charging and one for discharging. Each coupling device may include safety interlock features to prevent accidental coupling or decoupling when powered.

Figure 11:
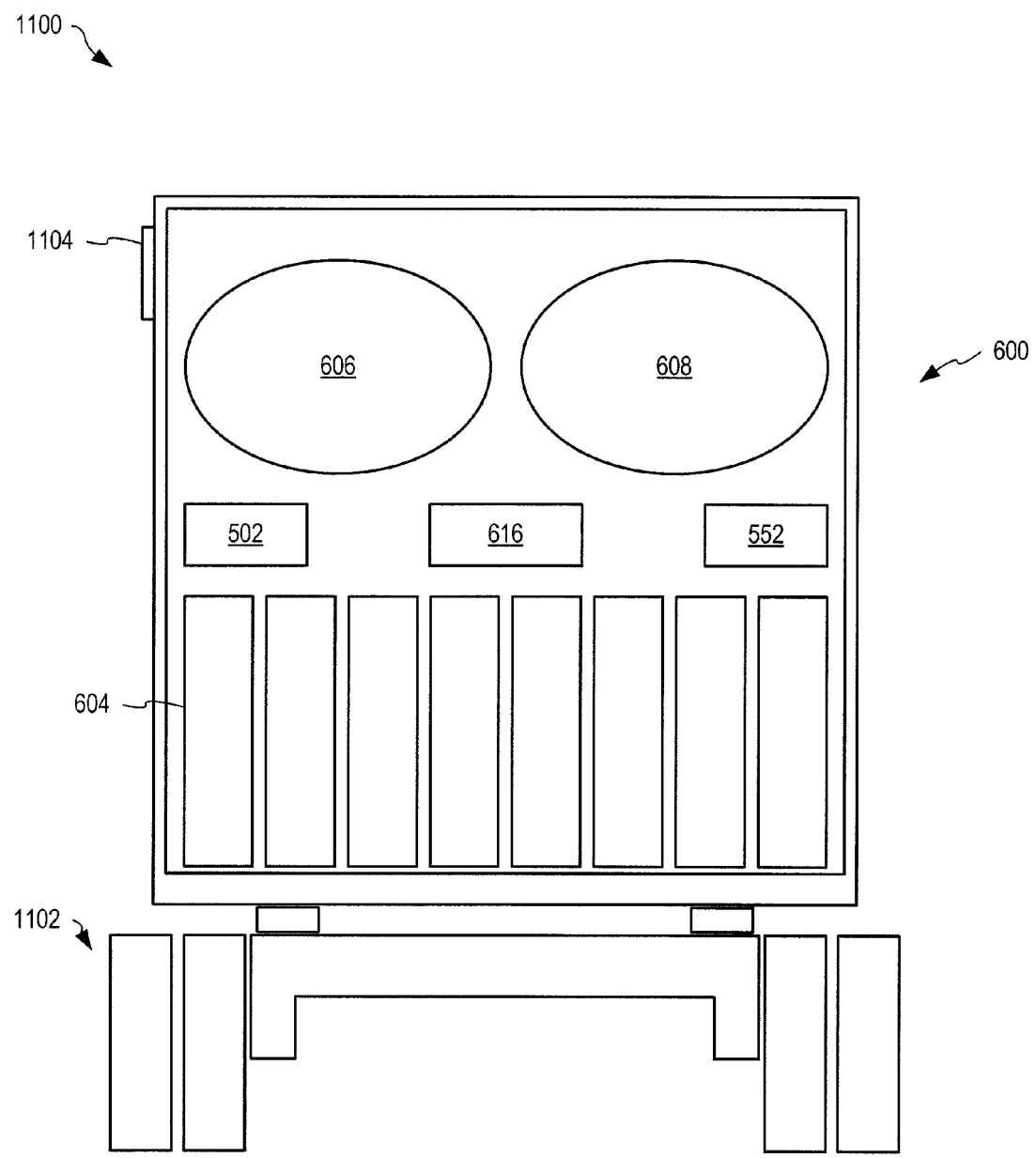
FIG. 11 is a schematic of an exemplary electrical energy transport trailer that stores electrical energy for transport from the first location to the second location.

FIG. 11 is a schematic of an exemplary electrical energy transport trailer 1100 that stores electrical energy for transport from first location 101 to second location 103. Trailer 1100 represents a conventional road transportation platform 1102 that is custom fitted with battery 600 of FIG. 6, and includes one or more anolyte tanks 606, one or more catholyte tanks 608, a plurality of stacks 604, central controller 616, and at least one power coupling 1104. Optionally, trailer 1100 may include at least one charge interface 502 for converting supplied energy into a form suitable for storage within battery 600 and at least one discharge interface 552 for converting energy from battery 600 into a form suitable for supply to customer 106. Power coupling 1104 provides connectivity for charging and discharging electrical energy transport trailer 1100. Optionally, trailers 1100 may be coupled together mechanically for convenient haulage.

Coupling 1104 may include a contact coupling and/or an induction coupling. Coupling 1104 may include a safety interlock operable to prevent coupling or decoupling when battery 600 is active. Electrical energy transport trailer 1100 may be configured with two coupling devices; one for charging and one for discharging. Each coupling device may include safety interlock features to prevent accidental coupling or decoupling when powered.

Figure 12:
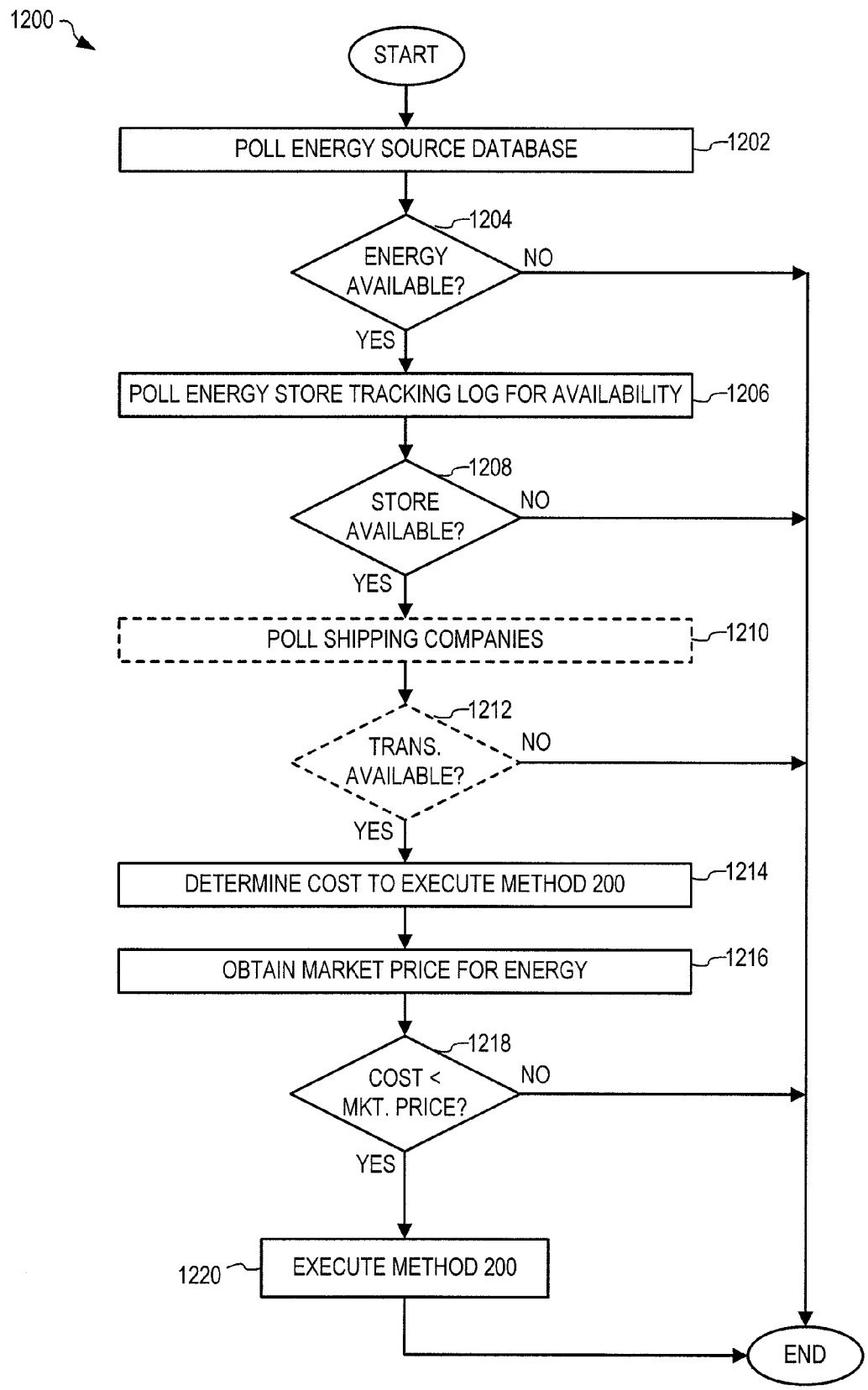
FIG. 12 is a flowchart illustrating one method of determining economics of implementing the method of FIG. 2, in an embodiment.

A return on investment achieved by executing method 200 of FIG. 2 varies, for example, based upon factors including the cost to obtain energy from an energy source 102, the costs to transport energy stores 104 between first location 101 and second location 103, and the market price of energy at second location 103. Additionally, execution of method 200 may be affected by insufficient availability of energy, energy stores, and/or shipping. Accordingly, method 1200 of FIG. 12 may be used to determine the economics of implementing method 200. Method 1200 is executed, for example, by EMC 302 (FIG. 3).

Method 1200 begins with step 1202 of polling an energy source database 316 for availability of energy sources and their pricing. An example step 1202 is EMC 302 polling energy source database 316 for availability and pricing of energy sources 102. In decision step 1204, the polling results obtained in step 1202 are evaluated to determine whether energy is available to supply energy stores. If energy is available, method 1200 proceeds to step 1206. Otherwise, method 1200 ends. An example of step 1204 is EMC 302 evaluating energy source availability information to determine whether one or more energy sources 102 are available to supply energy stores 104.

In step 1206, an energy store tracking log is polled to determine energy store availability. The information obtained from step 1206 is evaluated in decision step 1208. If an energy store is available, method 1200 proceeds to optional step 1210 or to step 1214 if optional step 1210 is not implemented. If an energy store is not available, method 1200 ends. An example of steps 1206 and 1208 is EMC 302 polling energy store tracking log 318 and evaluating the information obtained therefrom to determine whether an energy store is available.

Steps 1210 and 1212 are optional. In step 1210, shipping companies are polled for availability and pricing, and in decision step 1212, the results of step 1210 are evaluated to determine if transportation is available. If transportation is available, method 1200 proceeds to step 1214. Otherwise, method 1200 ends. It should be noted that steps 1210 and 1212 would not be executed if the energy stores are self shipping, such as in the example of FIGS. 9A and 9B where energy stores are integrated within a ship. An example of steps 1210 and 1212 is EMC 302 polling shipping companies for availability and pricing via an Internet connection and EMC 302 evaluating the information to determine whether transportation is available.

In step 1214, the cost to execute method 1200 is determined. Such cost may include, for example, the cost to obtain energy, the cost to ship energy stores, labor costs, and governmental fees (e.g., import fees and taxes). An example of step 1214 is EMC 302 calculating the cost to execute method 200. In step 1216, the market price for energy, or the prevailing cost of energy at the consumers' location, is determined. An example of step 1216 is EMC 302 obtaining the market price of energy at second location 103 via the Internet. In decision step 1218, it is determined whether the cost from step 1214 is less than the market price from step 1216. If so, method 1200 proceeds to step 1220 where method 200 is executed. Otherwise, method 1200 ends.

Figure 13:
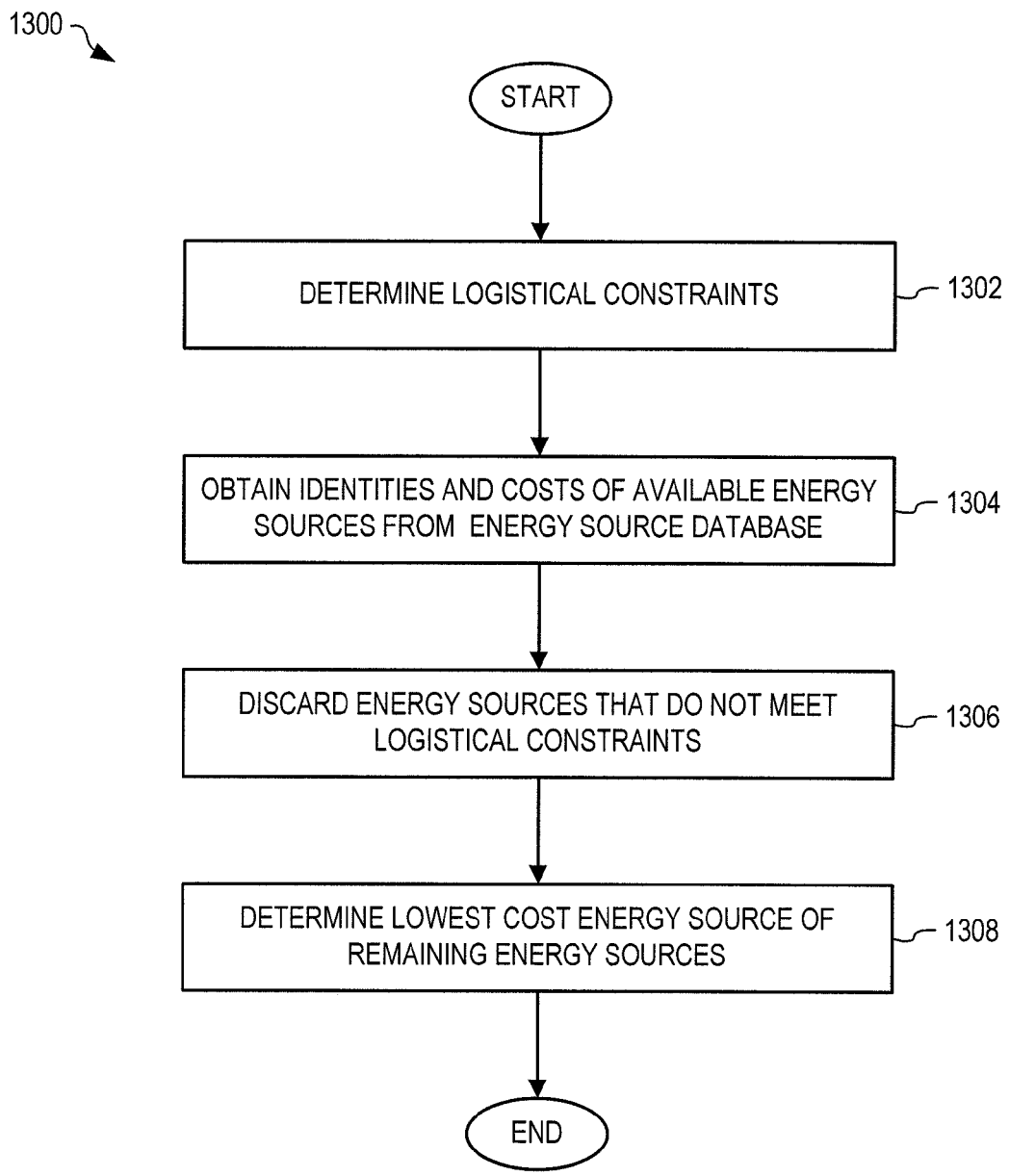
FIG. 13 is a flowchart illustrating one method of determining an optimum energy source for executing the method of FIG. 2, in an embodiment.

In certain embodiments of system 100, a plurality of energy sources 102 may be available. For example, both wind energy source 102(1) and photovoltaic energy source 102(2) may be available. Method 1300 of FIG. 13 may be executed to determine an optimum energy source 102 for use in certain embodiments of system 100. Method 1300 is executed, for example, by EMC 302 (FIG. 3).

Method 1300 begins with step 1302 of determining logistical constraints which may limit which energy sources may be used. An example of a logistical constraint is that an energy source 102 must be within a certain distance of first location 101 where energy sources 104 are supplied. Another example of a logistical constraint is that an energy source 102 must be in the form of an alternating current electric power source. Step 1302 is executed, for example, by EMC 302 obtaining logistical constraints from a configuration database.

In step 1304, an energy source database is polled to determine availability and pricing of energy sources. Step 1304 is executed, for example, by EMC 302 polling energy source database 316. In step 1306, all available energy sources from step 1304 that do not meet the logistical constraints of step 1302 are discarded. An example of step 1306 is EMC 302 discarding available energy sources from energy source database 316 that do not meet geographic constraints. In step 1308, the lowest cost energy source of the remaining energy sources is identified. Such lowest cost energy source may be considered the optimum energy source. Step 1308 is executed, for example, by EMC 302 determining the lowest cost energy source of those remaining after execution of step 1306.

In certain embodiments of system 100, it may be desirable to store energy in energy stores 104 only under limited circumstances. For example, it might be desirable to store in energy stores 104 solely during the night, when electricity is often cheaper than during the day, or when the price of energy obtained from an energy source 102 is below a threshold amount. As another example, it may be desirable to suspend storage of energy in energy stores 104 during periods of heavy demand on an energy source 102 in order to prevent overloading the energy source.

Figure 14:
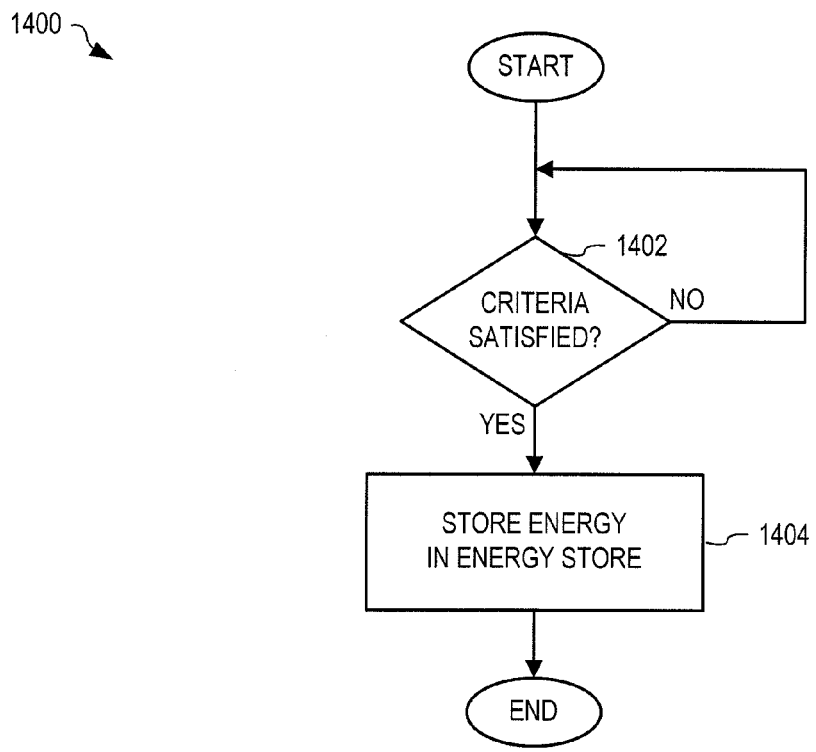
FIG. 14 is a flowchart illustrating one method of storing energy in an energy store, in an embodiment.

FIG. 14 shows one method 1400 of storing energy in an energy store. Method 1400 is an embodiment of step 206 (FIG. 2) and limits storage of energy to certain circumstances. Method 1400 is executed, for example, by EMC 302 (FIG. 3). Method 1400 begins with decision step 1402 where it is determined whether a criteria is satisfied. If so, method 1400 proceeds to step 1404 where energy is stored in an energy store. If the criteria is not satisfied in decision step 1402, decision step 1402 is re-executed.

Examples of the criteria of decision step 1402 include whether the price of energy is below a predetermined threshold, whether it is night, or whether a demand for energy is below a maximum threshold. Method 1400 is executed, by example, by EMC 302 determining whether a criteria is satisfied and EMC 302 controlling charge interface 402 or 502 accordingly.

Figure 15:
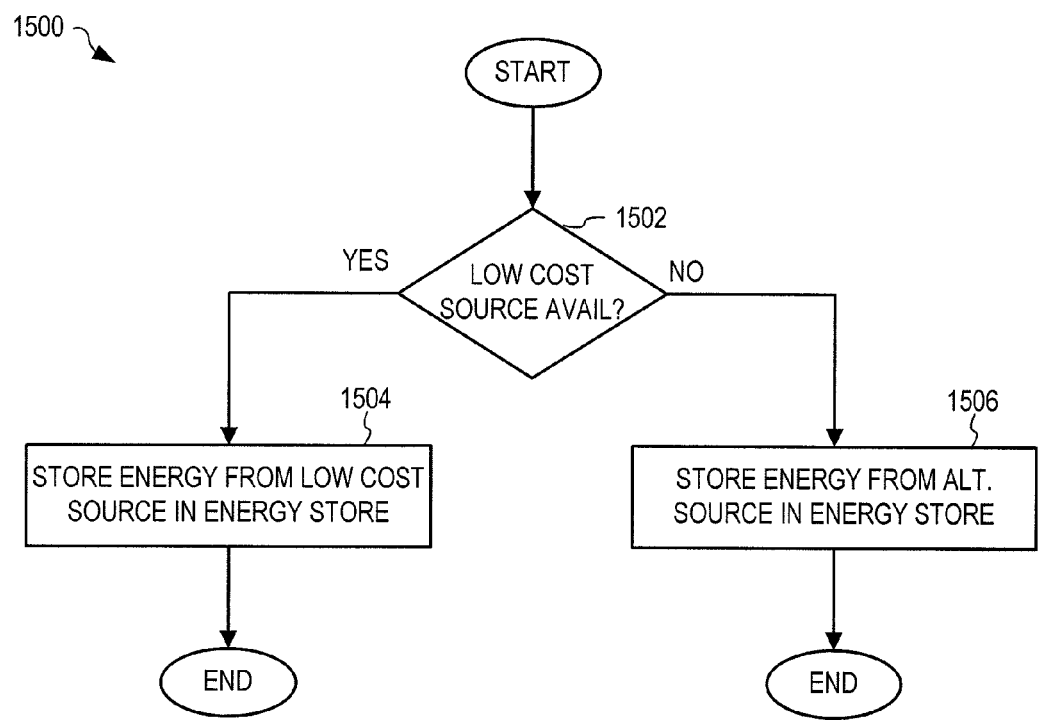
FIG. 15 is a flowchart illustrating one method of storing energy in an energy store, in an embodiment.

As discussed above, in certain embodiments of system 100, a number of energy sources 102 may be available. In some embodiments of system 100, one low cost energy source 102 is preferred, and one or more alternate energy sources are also available. Method 1500 of FIG. 15, which is a method of storing energy in an energy store and an embodiment of step 206, may be used to control energy storage such that the low cost source is used when it is available. Method 1500 is executed, for example, by EMC 302 (FIG. 3).

Method 1500 begins with decision step 1502 where it is determined whether a low cost source is available. If yes, method 1500 proceeds to step 1504 where energy from the low cost energy source is stored in an energy store. Otherwise, method 1500 proceeds to step 1506 where energy from an alternate energy source is stored in the energy store. Method 1500 is executed, for example, by EMC 302 monitoring the availability of a low cost energy source from energy source database 316.

In certain embodiments of system 100, it may be feasible to ship energy stores 104 by two or more methods. For example, energy stores 104 may be shipped on land via road based transportation (e.g., via truck) or via rail. As another example, energy stores may be shipped from one continent to another by either ship or by air.

Figure 16:
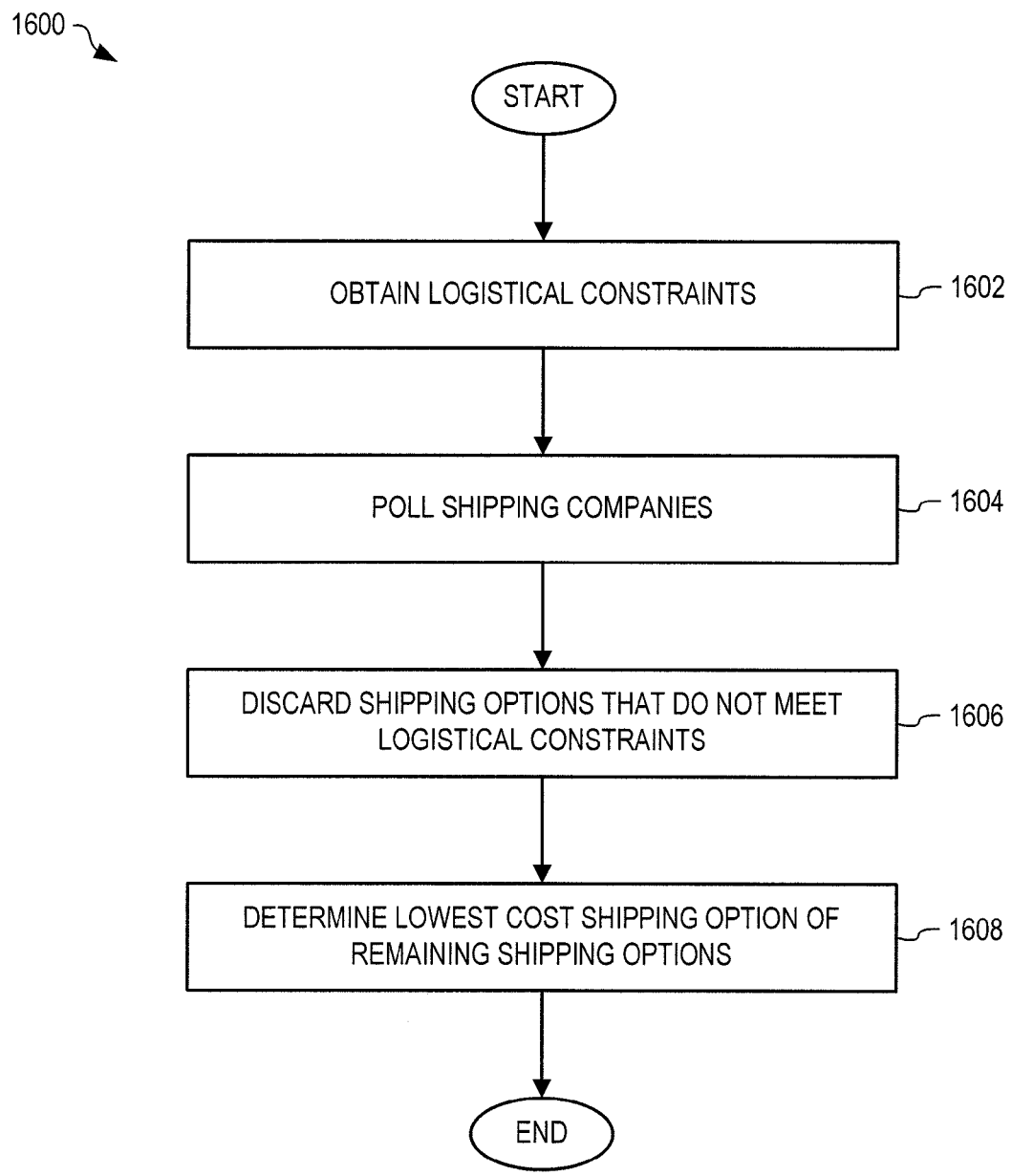
FIG. 16 is a flowchart illustrating one method of determining an optimum method of shipping energy stores for executing the method of FIG. 2, in an embodiment.

FIG. 16 shows one method 1600 of determining an optimum method of shipping energy stores 104. Method 1600 is executed, for example, by EMC 302 (FIG. 3). Method 1600 begins with step 1602 of obtaining logistical constraints. An example of a logistical constraint is transportation being limited to water and air transportation when energy source 102 is located on an ocean island. Step 1602 is executed, for example, by EMC 302 obtaining logistical constraints from a configuration database.

In step 1604, shipping companies are polled to determine shipping availability and pricing. Step 1604 is executed, for example, by EMC 302 polling rail shipping companies via the Internet. In step 1606, all available shipping options from step 1604 that do not meet the logistical constraints of step 1602 are discarded. An example of step 1606 is EMC 302 discarding available shipping options that do not meet logistical constraints. In step 1608, the lowest cost shipping option of the remaining shipping options is identified. Such lowest cost shipping option may be considered the optimum shipping method. Step 1608 is executed, for example, by EMC 302 determining the lowest cost shipping option of those remaining after execution of step 1606.

In certain embodiments of system 100, customers 106 have a choice of obtaining energy from two or more sources. That is, customers 106 have an alternative to energy stores 104. In such embodiments, the market price of energy at the customers' location (e.g., second location 103) may vary, and the return on investment achieved by executing method 200 will vary as a function of such market price.

Figure 17:
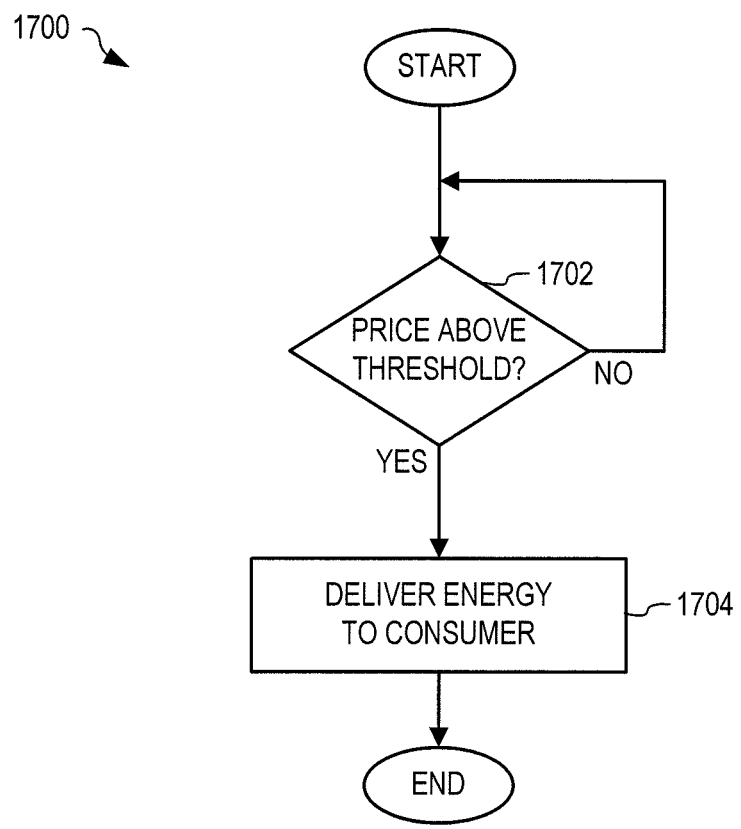
FIG. 17 is a flowchart illustrating one method of delivering energy from an energy store to consumers, in an embodiment.

FIG. 17 shows one method 1700 of delivering energy from an energy store to consumers. Method 1700 is an embodiment of step 216 (FIG. 2). Method 1700 may be used to advantageously limit delivery of energy to consumers to periods where the market price of energy is sufficiently high to achieve a desired return on investment by executing method 200. Method 1700 is executed, for example, by EMC 302 (FIG. 3).

Method 1700 begins with decision step 1702 where it is determined whether the market price for energy at the consumer's location is above a threshold amount. The threshold amount, for example, represents a minimum price at which it is economical to execute method 200. An example of step 1702 is EMC 302 determining the market price at second location 103 by communicating 314 with sub-controller 304 (FIG. 3). If the market price is not above the threshold amount, decision step 1702 is repeated. Otherwise, energy is delivered to consumers in step 1704, such as by EMC 302 instructing sub-controller 304 to cause energy to be delivered from an energy store 104 to consumers 106.

Figure 18:
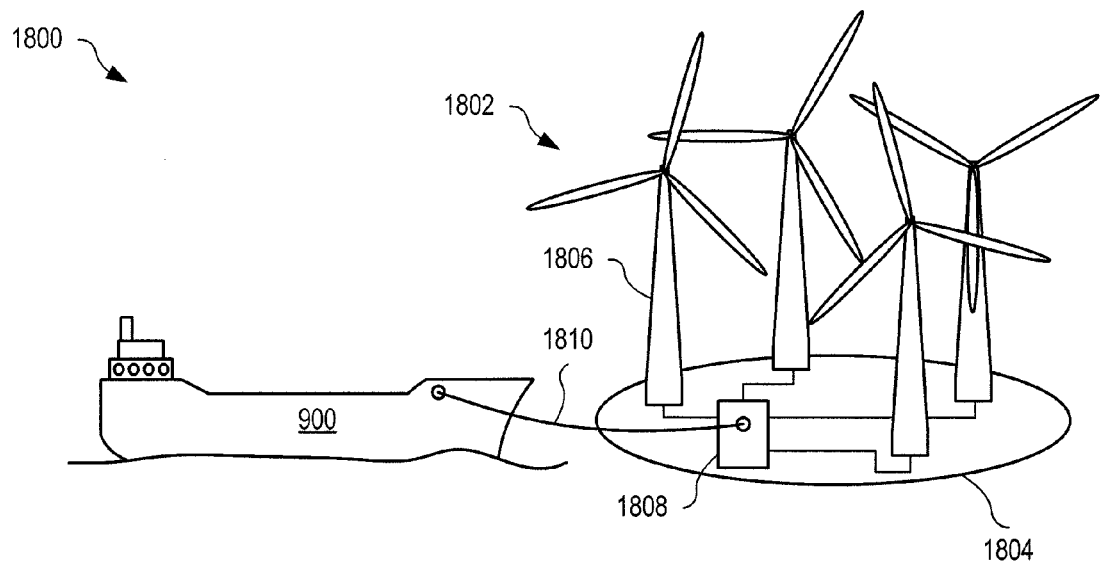
FIG. 18 shows one exemplary scenario where the electrical energy transport ship of FIG. 9 receives electrical energy from a wind platform located at sea.

FIG. 18 shows one exemplary scenario 1800 where electrical energy transport ship 900 of FIG. 9 receives electrical energy from a wind platform 1802 located at sea. In one embodiment, wind platform 1802 is a floating platform 1804 that is tethered in a favorable location at sea. A plurality of wind turbines 1806 are located on platform 1804 and convert wind energy into electrical power that is delivered to power connector 1808. Ship 900 connects to power connector 1808 via a power line 1810, to receive electrical power from wind turbines 1806 via power connector 1808. Power connector 1808 may contain additional components to condition power from wind turbines 1806 such that the power is suitable for charging ship 900 when connected. Power connector 1808 may also allow connection of more than one ship 900 and (a) may simultaneously charge more than one ship 900, and/or (b) may automatically switch from a first ship 900 to a second ship 900 when first ship 900 becomes fully charged.

In one example of operation, EMC 302 controls arrival of ships 900 at wind platform 1802 such that at least one ship 900 is always being charged from wind turbines 1806, thereby maximizing energy harvesting. Since wind platform 1802 is floating, wind platform 1802 may be relocated to take advantage of winds as they migrate. In another example, wind platform 1802 may be relocated to be closer to consumer 106, thereby reducing transport time and cost.

Figure 19:
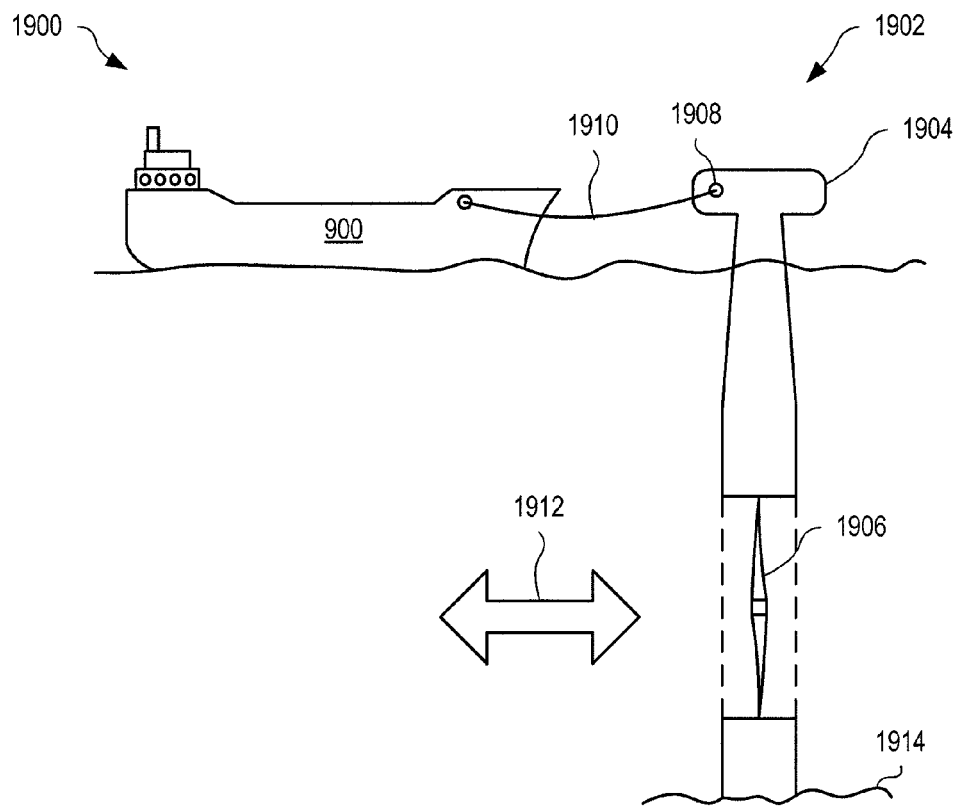
FIG. 19 shows one exemplary scenario where the electrical energy transport ship of FIG. 9 receives electrical energy from an underwater stream energy harvesting turbine.

FIG. 19 shows one exemplary scenario 1900 where electrical energy transport ship 900 of FIG. 9 receives electrical energy from an underwater stream energy harvesting turbine 1902. Turbine 1902 represents a tidal stream energy harvesting turbine and may also represent a stream energy harvesting turbine. A pillar 1904 is embedded in the sea or stream bed 1914 such that rotor 1906 is turned by flow of current as indicated by arrow 1912. Rotor 1906 generates current as it turns and delivers electrical power to connector 1908. Ship 900 connects to connector 1908 via a power line 1910 to receive electrical power from rotor 1906. Connector 1908 may allow more than one ship 900 to connect at any one time, and (a) connector 1908 may also allow connection of more than one ship 900 and (a) may simultaneously charge more than one ship 900, and/or (b) may automatically switch from a first ship 900 to a second ship 900 when first ship 900 becomes fully charged.

In one example of operation, EMC 302 controls arrival of ships 900 at turbine 1902 such that at least one ship 900 is always being charged from turbine 1902, thereby maximizing energy harvesting.

Figure 20:
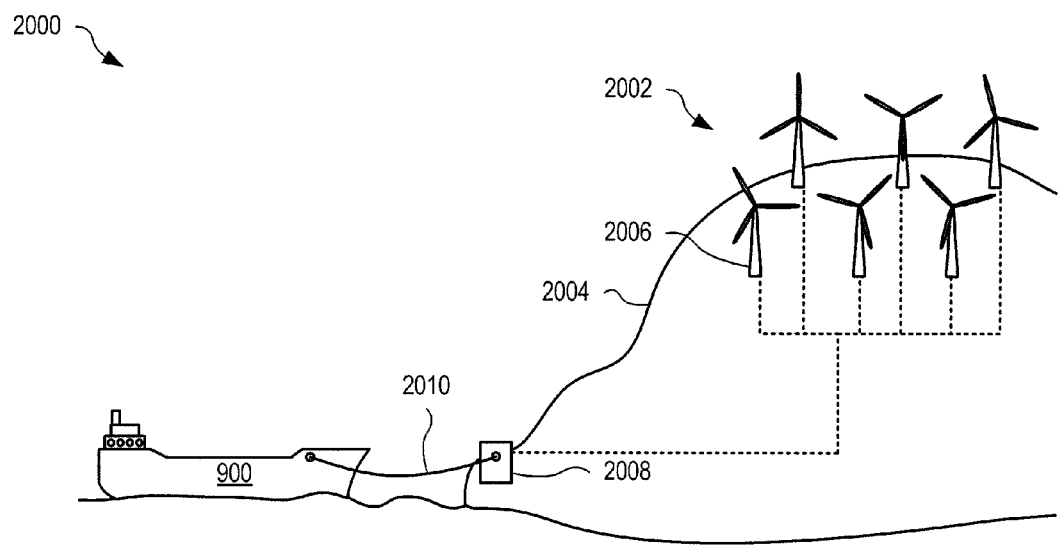
FIG. 20 shows one exemplary scenario where the electrical energy transport ship of FIG. 9 receives electrical energy from an onshore wind farm.

FIG. 20 shows one exemplary scenario 2000 where electrical energy transport ship 900 of FIG. 9 receives electrical energy from an onshore wind farm 2002. Wind farm 2002 is optionally connected to a power grid (not shown) such that wind farm 2002 may provide power to the power grid and/or power to power connector 2008. Wind farm 2002 has a plurality of wind turbines 2006 that may be strategically located on a hill 2004, for example, to take advantage of prevailing winds. Electrical power generated by wind turbines 2006 is delivered to power connector 2008 (and optionally to the power grid). Ship 900 connects to power connector 2008 via a power line 2010 to receive electrical power from wind farm 2002. Power connector 2008 may allow more than one ship 900 to connect at any one time, and (a) may simultaneously charge more than one ship 900, and/or (b) may automatically switch from a first ship 900 to a second ship 900 when first ship 900 becomes fully charged.

In one example of operation, EMC 302 controls arrival of ships 900 at wind farm 2002 such that at least one ship 900 is always being charged from wind farm 2002, thereby maximizing energy harvesting.

Figure 21:
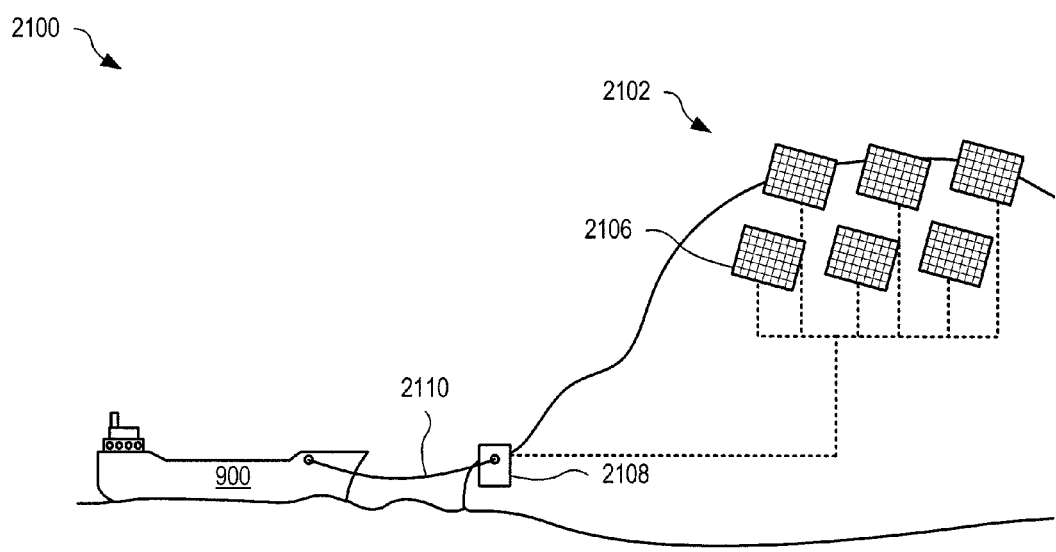
FIG. 21 shows one exemplary scenario where the electrical energy transport ship of FIG. 9 receives electrical energy from an onshore solar array.

FIG. 21 shows one exemplary scenario 2100 where electrical energy transport ship 900 of FIG. 9 receives electrical energy from an onshore solar array 2102. Solar array 2102 is optionally connected to a power grid (not shown) such that solar array 2102 may provide power to the power grid and/or power to a power connector 2108. Solar array 2102 has a plurality of solar panels 2106 that may be strategically located to collect solar energy from the sun. Electrical power collected by solar panels 2106 is delivered to power connector 2108 (and optionally to the power grid). Ship 900 connects to power connector 2108 via a power line 2110 to receive electrical power from solar array 2102. Power connector 2108 may allow more than one ship 900 to connect at any one time, and (a) may simultaneously charge more than one ship 900, and/or (b) may automatically switch from a first ship 900 to a second ship 900 when first ship 900 becomes fully charged.

In one example of operation, EMC 302 controls arrival of ships 900 at solar array 2102 such that at least one ship 900 is always being charged from solar array 2102 during daylight hours, thereby maximizing energy harvesting. In an alternate embodiment, solar array 2102 may be located on a floating platform that is located at sea. The platform may be positioned to receive maximum solar energy in a location that has favorable conditions. Ship 900, FIG. 9, may connect to the floating solar array to receive energy therefrom.

Figure 22:
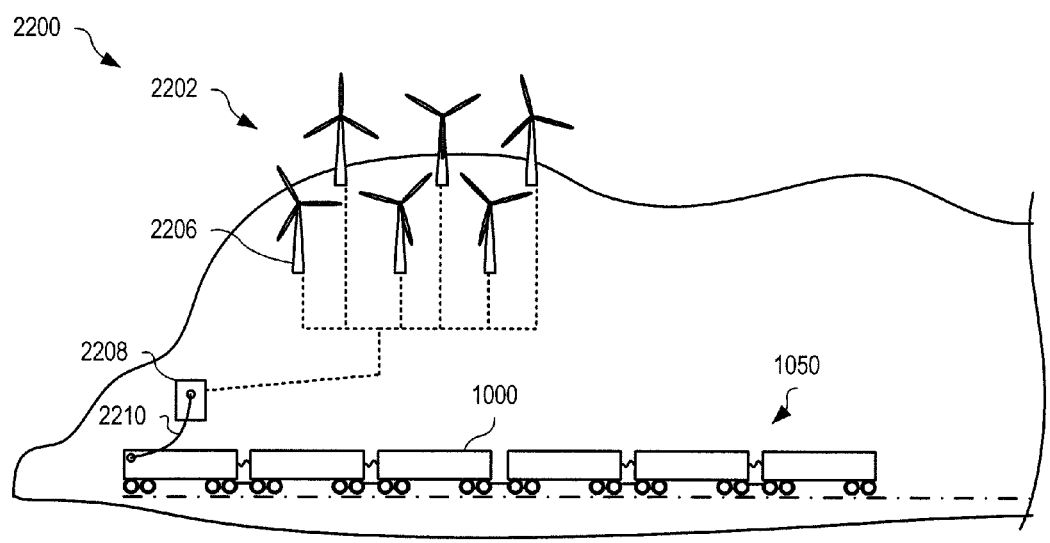
FIG. 22 shows one exemplary scenario where the portion of the train of FIG. 10B receives electrical energy from an onshore wind farm.

FIG. 22 shows one exemplary scenario 2200 where the portion of train 1050 of FIG. 10B receives electrical energy from an onshore wind farm 2202. Wind farm 2202 is similar to wind farm 2002 of FIG. 20, having a plurality of wind turbines 2206 that provide electrical power to a power connector 2208. Optionally, wind farm 2202 may also provide power to a power grid. Electrical energy transport rail cars 1000 of train 1050 are interconnected and collectively connect to power connector 2208 via a power line 2210 to receive electrical power from wind farm 2202. Power connector 2208 may allow more than one train 1050 to connect at any one time, and (a) may simultaneously charge more than one train 1050, and/or (b) may automatically switch from a first train 1050 to a second train 1050 when first train 1050 becomes fully charged.

In one example of operation, EMC 302 controls arrival of trains 1050 at wind farm 2202 such that at least one train 1050 is being charged from wind farm 2202, thereby maximizing energy harvesting.

Figure 23:
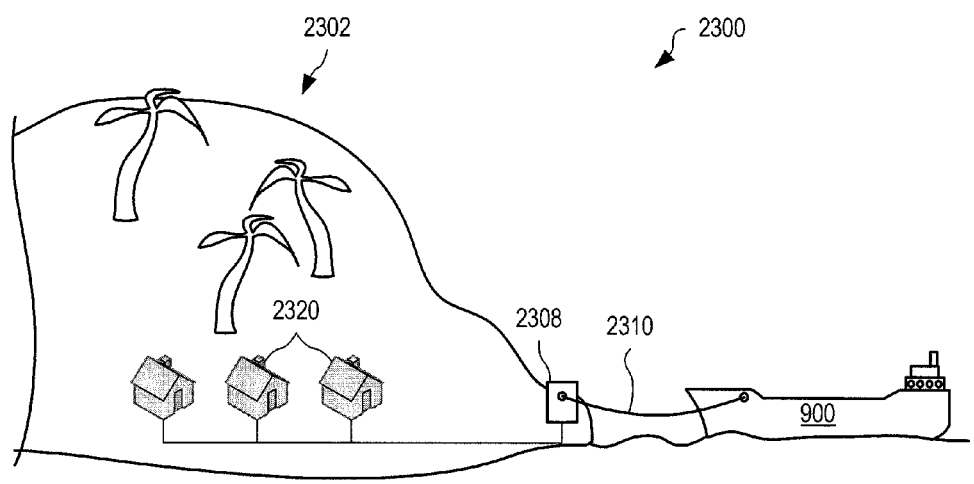
FIG. 23 shows one exemplary scenario where the electrical energy transport ship of FIG. 9 discharges electrical energy to consumers on an island.

FIG. 23 shows one exemplary scenario 2300 where electrical energy transport ship 900 of FIG. 9 discharges electrical energy to consumers 2320 on an island 2302. Ship 900 connects to a power connector 2308 via a power line 2310 and provides power to consumers 2320. In one embodiment, ship 900 includes discharge interface 552 that converts power from battery 600 into a form suitable for use by consumers 2320. In an alternate embodiment, power connector 2308 includes one or more discharge interfaces 454 that convert power from ship 900 into a form suitable for use by consumers 2320.

Power connector 2308 may allow more than one ship 900 to connect and provide power at any one time. Power connector 2308 may simultaneously discharge power from multiple ships 900, and/or may automatically switch from receiving power from a first ship 900 to a second ship 900 when first ship 900 becomes fully discharged.

Figure 24:
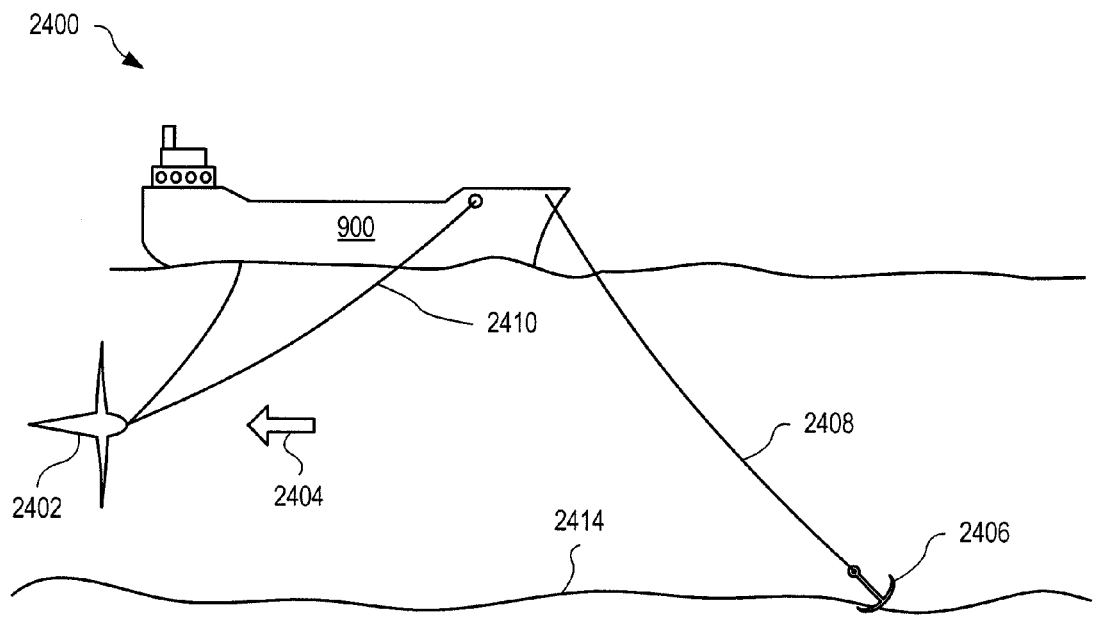
FIG. 24 shows one exemplary scenario where the electrical energy transport ship of FIG. 9 further includes a turbine to harvest electrical energy from an underwater stream.

FIG. 24 shows one exemplary scenario 2400 where electrical energy transport ship 900 of FIG. 9 further includes a turbine 2402 to harvest electrical energy from an underwater stream 2404. For example, stream 2404 may represent an ocean current (e.g., Gulf stream), a tidal current in an estuary, and a river current. Turbine 2402 is lowered from ship 900 into stream 2404 such that turbine 2402 generates electrical power that is used to charge battery 600 of ship 900 via power conductor 2410. As shown in FIG. 24, ship 900 may drop anchor 2406 to remain stationary over stream 2404 to maximize efficiency of harvesting energy from stream 2404. That is, the anchor chain 2408 imparts a force on ship 900 to counteract the drag of turbine 2402 and thereby keeps ship 900 stationary relative to bed 2414. In an alternate embodiment, ship 900 utilizes turbine 2402 while in motion against stream 2404 such that energy is harvested during transport of ship 900.

Figure 25:
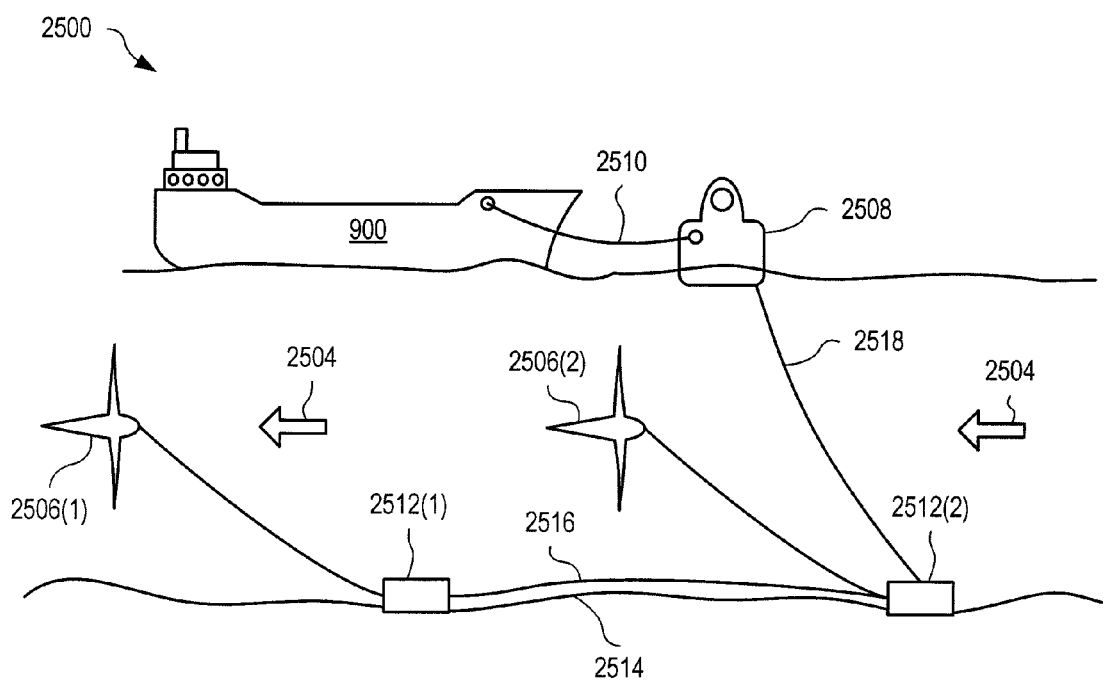
FIG. 25 shows one exemplary scenario where the electrical energy transport ship of FIG. 9 receives electrical energy from a plurality of underwater turbines.

FIG. 25 shows one exemplary scenario 2500 where electrical energy transport ship 900 of FIG. 9 receives electrical energy from a plurality of tethered underwater turbines 2506 that generate electrical energy from kinetic energy of an underwater stream 2504. Turbine 2506(1) is shown tethered to an anchor 2512(1) that also operates to receive power from turbine 2506(1). Turbine 2506(2) is shown tethered to an anchor 2512(2) that also operates to receive power from turbine 2506(2) and power from turbine 2505(1) via anchor 2512(1) and power line 2516. Received power is transferred from anchor 2512(2), via a power line 2518, to a power connector 2508. Power connector 2508 is shown as a buoy, but may be structured as a floating platform and or a pillar embedded into stream bed 2514. Ship 900 connects to power connector 2508 via a power line 2510 to receive electrical power from turbines 2506. Power connector 2508 may allow more than one ship 900 to connect at any one time, and (a) may simultaneously charge more than one ship 900, and/or (b) may automatically switch from a first ship 900 to a second ship 900 when first ship 900 becomes fully charged.

In one example of operation, EMC 302 controls arrival of ships 900 at power connector 2508 such that at least one ship 900 is always being charged from turbines 2506, thereby maximizing energy harvesting. Further, if underwater stream 2504 migrates, turbines 2506, anchors 2512, power lines 2516 and 2518, and buoy 2508 may be relocated as the stream migrates, or may be relocated to an alternate stream.

Figure 26:
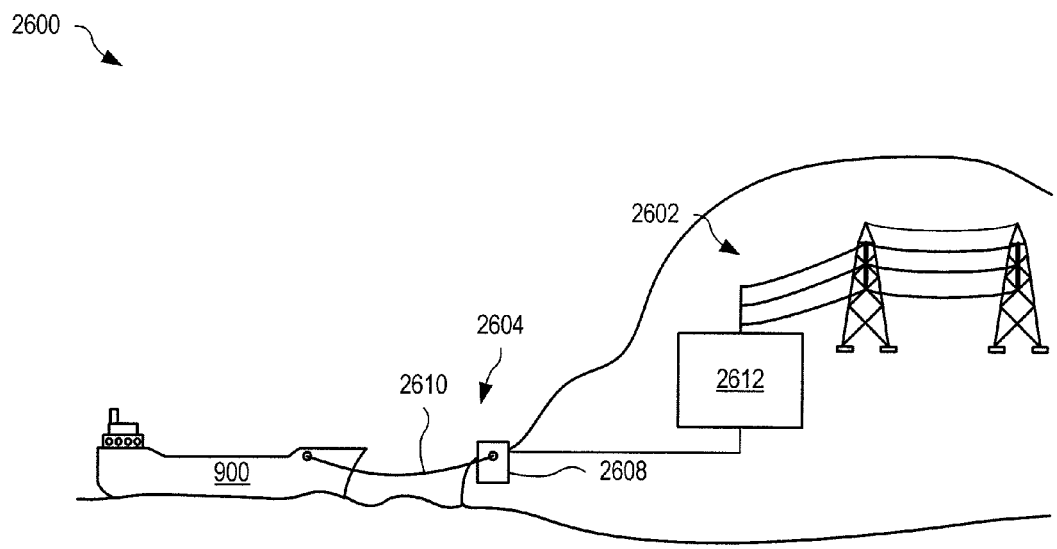
FIG. 26 shows one exemplary scenario where the electrical energy transport ship of FIG. 9 receives electrical energy from a power grid during off-peak periods.

FIG. 26 shows one exemplary scenario 2600 where electrical energy transport ship 900 of FIG. 9 receives electrical energy from a power grid 2602 during off-peak periods while at a port 2604. For example, ship 900 may charge during periods of low loading of power grid 2602, such as typically occurs between the hours of 11 pm and 5 am.

A power connector 2608 received power from power grid 2602, optionally via a sub-station 2612 that converts the power into a suitable form for charging ship 900. Ship 900 connects to power connector 2608 via power line 2610 to receive power. Power connector 2608 may allow more than one ship 900 to connect at any one time, and (a) may simultaneously charge more than one ship 900, and/or (b) may automatically switch from a first ship 900 to a second ship 900 when first ship 900 becomes fully charged.

In one example of operation, EMC 302 controls arrival of ships 900 at port 2604 such that at least one ship 900 is always being charged from power grid 2602 during off-peak hours. Ship 900 may charge during peak hours of power grid 2602 where cost of received power remains economically viable.

Figure 27:
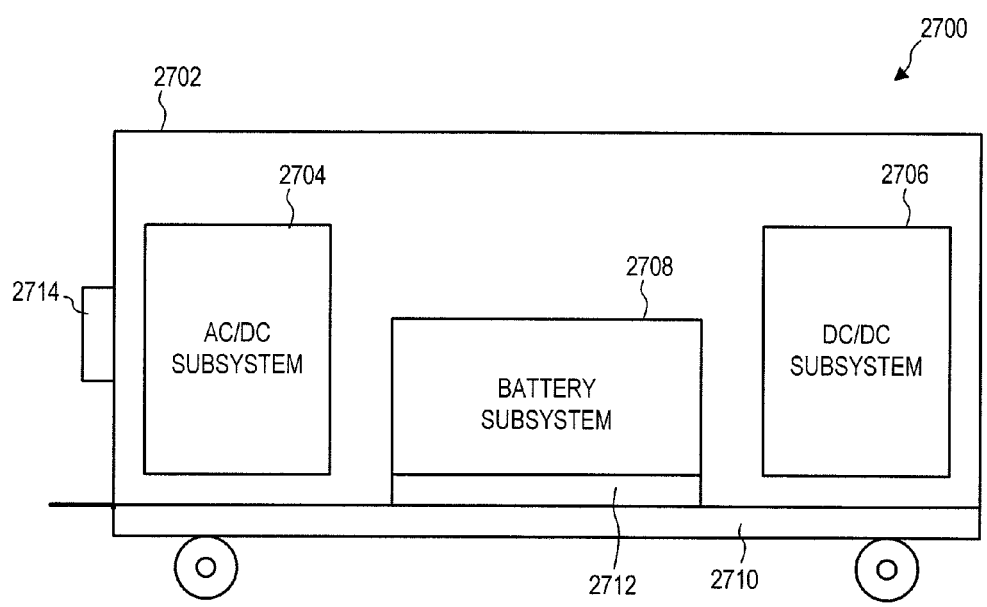
FIG. 27 shows a side cross-sectional view of one mobile energy storage system, in an embodiment.

FIG. 27 is a side cross-sectional view of one mobile energy storage system 2700 that, for example, stores electrical energy for transport from first location 101 to second location 103. System 2700 could alternately be used as a mobile energy storage system that is transported to a location where energy storage is desired, such as at the site of an electric power source (e.g., a renewable electric power source, such as a wind farm), or to a location where electric power is to be provided to a load.

System 2700 includes a chassis 2702 configured and arranged to facilitate movement of system 2700. Chassis 2702, for example, is a trailer chassis, such as shown in FIG. 27, allowing system 2700 to be towed by a truck or another vehicle to a desired location. As another example, chassis 2702 may be part of truck chassis, allowing system 2700 to be driven to a desired location, or chassis 2702 may a shipping container, enabling system 2700 to be transported by truck or by ship. As yet another example, chassis 2700 could be configured for installation in a rail car or a ship.

Figure 28:
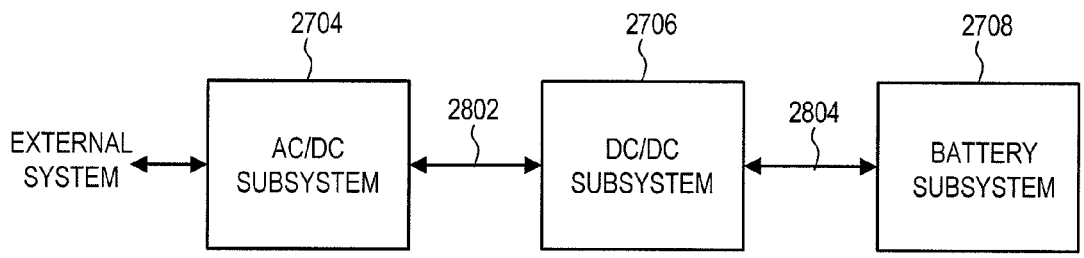
FIG. 28 shows a block diagram of the relationship between certain subsystems of the energy storage system of FIG. 27.

System 2700 includes an alternating current to direct current ("AC/DC") subsystem 2704, a direct current to direct current ("DC/DC") subsystem 2706, and a battery subsystem 2708. As shown in FIG. 28, which is a block diagram showing the relationship between subsystems 2704, 2706, and 2708, AC/DC subsystem 2704 provides an interface between system 2700 and an alternating current ("AC") external system. The external system, for example, is an AC electric power source (e.g., an electric power grid), which provides energy in the form of electric power for storage by system 2700 and/or an AC load powered by energy stored in system 2700. AC/DC subsystem 2704 is operable to convert AC electric power from the external system into direct current ("DC") electric power and provide the DC electric power to a DC bus 2802 for storage in battery subsystem 2708 via DC/DC subsystem 2706. Additionally, AC/DC subsystem 2704 is operable to convert DC electric power from DC bus 2802, such as received from battery subsystem 2708 via DC/DC subsystem 2706, into AC electric power for distribution to the external system. AC/DC subsystem 2704 is, for example, enclosed in a moisture resistant cabinet, such as a cabinet that meets NEMA 4 specifications. The cabinet may also include an electrically conductive surface to reduce undesired electromagnetic emissions from AC/DC subsystem 2704.

DC/DC subsystem 2706 provides an interface between DC bus 2802 and battery subsystem 2708. In particular, DC/DC subsystem 2706 controls charging and discharging of battery subsystem 2708. A DC bus 2804 connects DC/DC subsystem 2706 to battery subsystem 2708. DC/DC subsystem 2706 is, for example, enclosed in a moisture resistant cabinet, such as a cabinet that meets NEMA 4 specifications. The cabinet may also include an electrically conductive surface to reduce undesired electromagnetic emissions from DC/DC subsystem 2706. Battery subsystem 2708 includes at least one battery for storage of energy received in the form of electric power from the external system. In some embodiments, battery subsystem 2708 includes a number of flowing electrolyte batteries.

Figure 29:
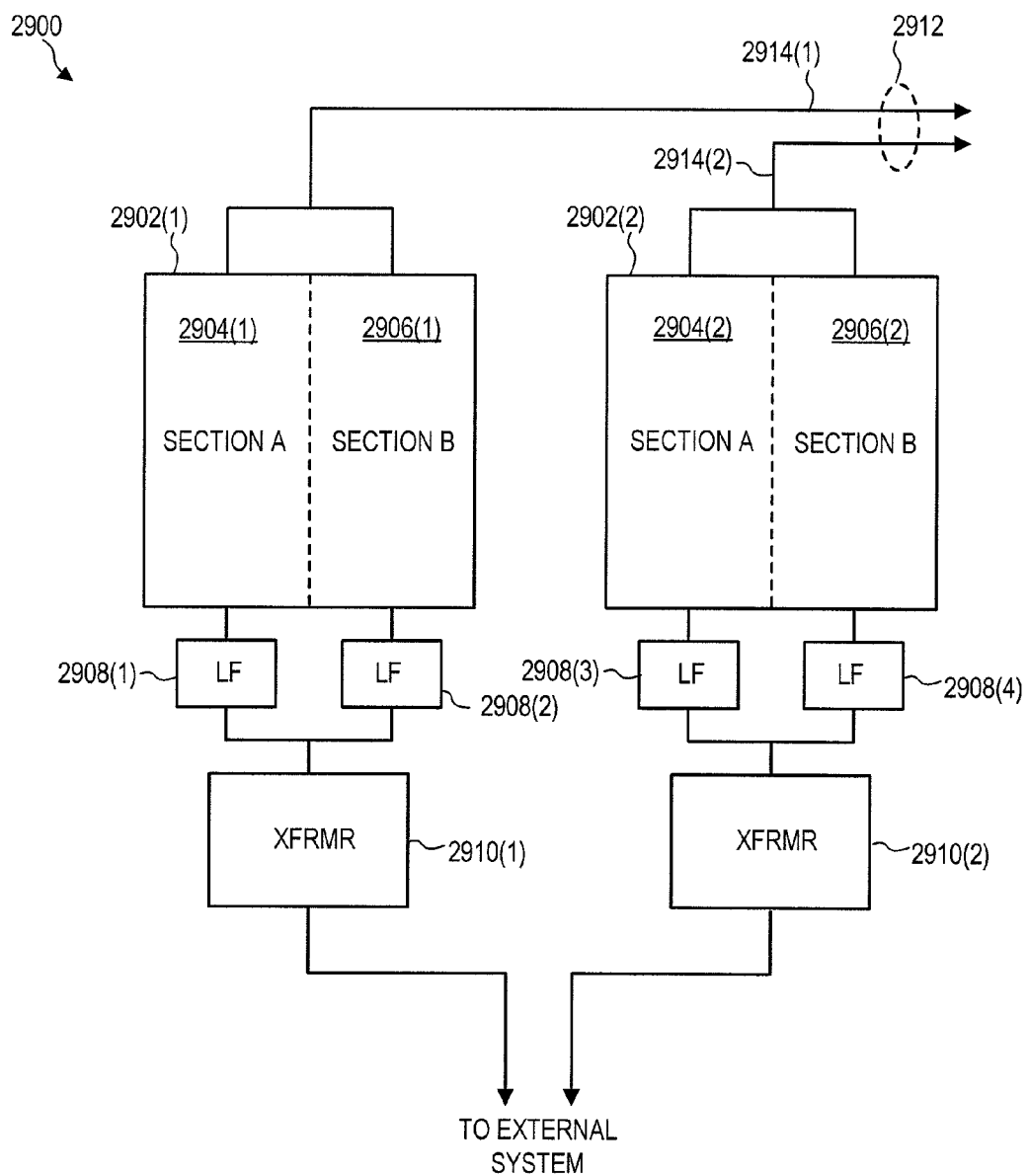
FIG. 29 shows a block diagram of one alternating current to direct current subsystem, in an embodiment.

FIG. 29 shows a block diagram of one AC/DC subsystem 2900, which is an embodiment of AC/DC subsystem 2704 (FIGS. 27 and 28). AC/DC subsystem 2900 is, for example, configured and arranged to support three phase operation at 480 volts, and subsystem 2900 includes a number of inverter/rectifiers 2902. Each inverter/rectifier 2902, for example, is associated with a respective battery of battery subsystem 2708. Although subsystem 2900 is shown as including two inverter/rectifiers 2902, the number of inverter/rectifiers could be varied.

Each inverter/rectifier 2902 includes, for example, two sections 2904, 2906, which operate in parallel. In the event of failure of one of sections 2904, 2906, the other section can handle the entire load of it respective inverter/rectifier, thereby providing redundancy in each inverter/rectifier 2902. Each section 2904, 2906 may include a single system that functions as both an inverter and a rectifier, or each section 2904, 2906 may alternately include separate inverters and rectifiers. Each section 2904, 2906 interfaces with a respective line filter 2908, and each line filter 2908 of a given inverter/rectifier 2902 interfaces with a respective line transformer 2910. Line transformers 2910 interface with the external system (e.g., an AC source and/or AC load). Inverter/rectifiers 2902 also interface with a DC bus 2912, which is an embodiment of DC bus 2802 (FIG. 28). DC bus 2912 includes a circuit 2914 associated with each inverter/rectifier 2902.

Figure 30:
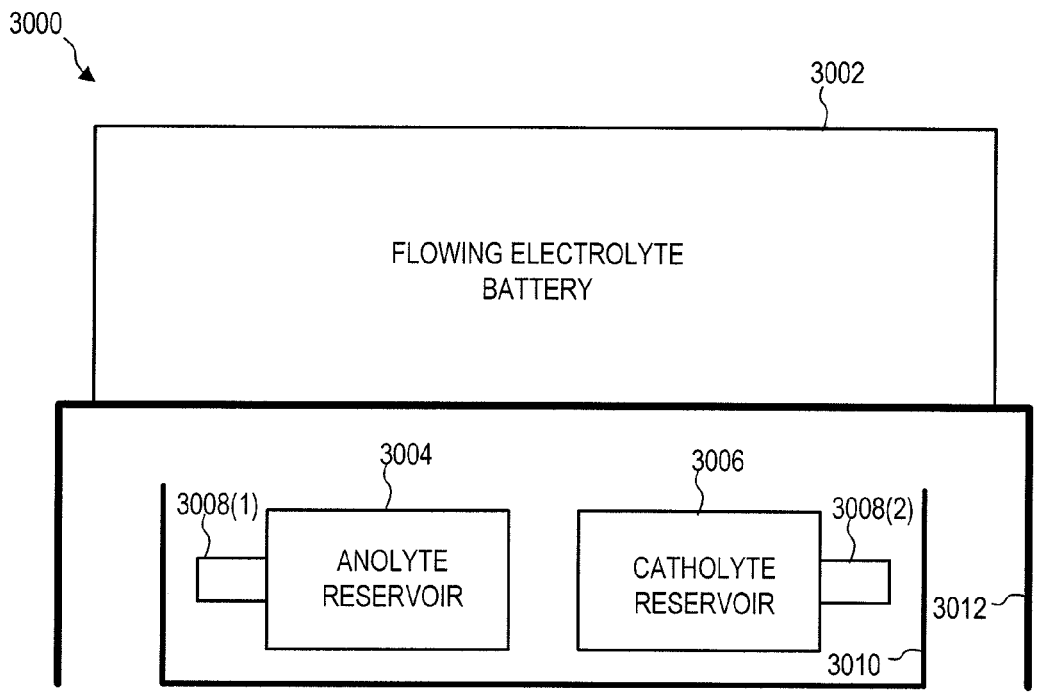
FIG. 30 shows a block diagram of one battery subsystem, in an embodiment.

FIG. 30 shows a block diagram of one battery subsystem 3000, which is an embodiment of battery subsystem 2708 (FIGS. 27, 28). Battery subsystem 3000 includes at least one flowing electrolyte battery 3002, which includes a number of interconnected stacks, where each stack includes a number of interconnected cells. For example, subsystem 3000 may include four batteries 3002, where each battery has 56 stacks, and each stack has 54 cells. Battery 3002 includes pumps and distribution equipment (not shown) to distribute anolyte and catholyte through battery 3002. In some embodiments, the stacks are configured and arranged to promote equal flow of anolyte and catholyte through the stacks, such as by arranging banks of stacks on their sides in rows, and providing at least one pump per row.

Anolyte reservoir 3004 and catholyte reservoir 3006 are in fluid communication with battery 3002. In some embodiments, anolyte reservoir 3004 and catholyte reservoir 3006 are located below battery 3002. For example, battery 3002 may be disposed on a support such as a table 3012, and anolyte reservoir 3004 and catholyte reservoir 3006 may be disposed under the table. In such embodiments, each of anolyte reservoir 3004 and catholyte reservoir 3006 may include a respective priming pump 3008 to initially provide anolyte or catholyte to pumps of battery 3002. A containment structure 3010 is optionally included to contain leaks from anolyte reservoir 3004 and catholyte reservoir 3006, or in some embodiments, leaks from battery 3002. In some embodiments, battery 3000 is configured and arranged to be chemically neutralized upon demand, such as disclosed in U.S. Patent Application Publication No. 2006/0251957 to Darcy et al. Pairs of stacks are, for example, electrically connected in series for charging/discharging under the control of DC/DC subsystem 2706.

In some embodiments, pumps included in flowing electrolyte battery 3002 may be driven by motor drives to promote efficiency and/or to control the pumps. Such motor drives are disposed for example, in AC/DC subsystem 2704 and/or in DC/DC subsystem 2706. Priming pumps 3008 may also be driven by motor drives.

Figure 31:
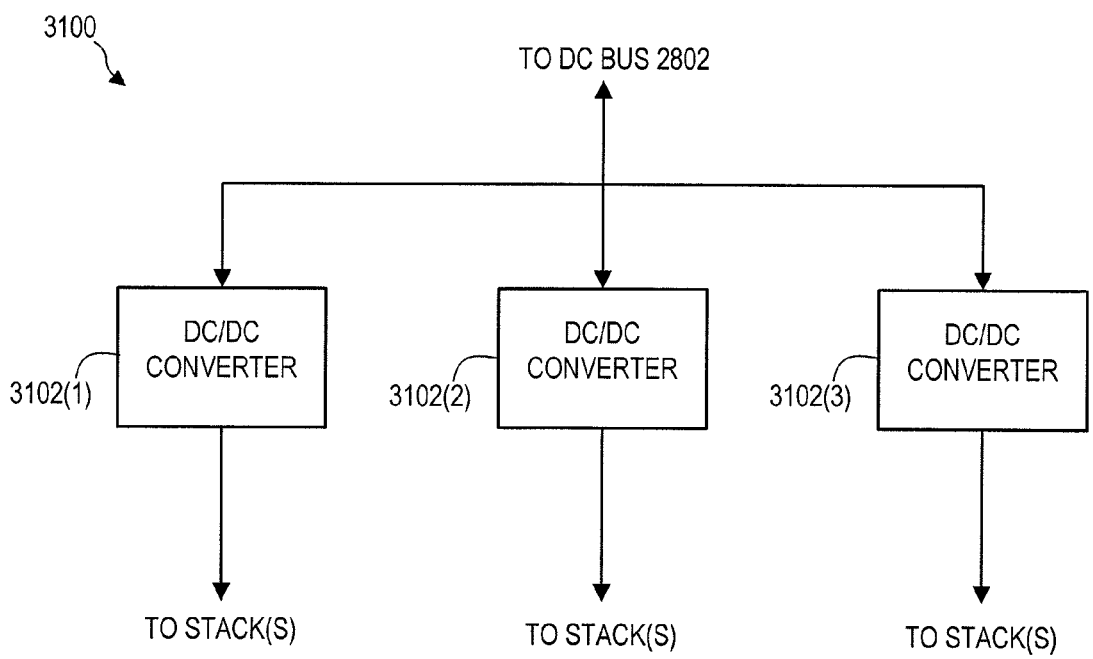
FIG. 31 shows a block diagram of one direct current to direct current subsystem, in an embodiment.

FIG. 31 shows a block diagram of one DC/DC subsystem 3100, which is an embodiment of DC/DC subsystem 2706 (FIGS. 27, 28). DC/DC subsystem 3100 includes a plurality of DC/DC converters 3102, each of which interfaces DC bus 2802 with a stack or group of battery stacks in battery subsystem 2708. For example, each DC/DC converter 3102 may interface with a pair of battery stacks electrically connected in series. In some embodiments, DC/DC converters 3102 are configured and arranged to individually control charging and discharging of their associated battery stacks, such as disclosed in U.S. Patent Application Publication No. 2005/0084745 to Colello et al.

In some embodiments of system 2700, at least some electrical conduits connecting components and/or subsystems are sealed (e.g., filled with a sealant material) to help exclude moisture from the conduits. For example, conduits that interface with AC/DC subsystem 2704 and DC/DC subsystem 2706 may be sealed to prevent entry of moisture into these subsystems. Additionally, DC bus 2802, DC bus 2804, and/or other electrical conductors may be enclosed in an electrically conductive conduit (e.g., a metallic wiring trough) to reduce undesired electromagnetic emissions from the conductors.

In some embodiments of system 2700, sides of chassis 2700 are formed of a flexible, light weight material (e.g., plastic, rubber, or canvas) to help minimize weight of system 2700. In embodiments of system 2700 where chassis 2702 is a vehicle chassis (e.g., a trailer or truck chassis), a floor 2710 of the chassis is typically flexible. In such cases, battery subsystem 2708, which is typically rigid, is optionally mechanically coupled to floor 2710 via a pin-slide joint system 2712 to prevent damage to battery subsystem 2708 from movement of floor 2710. An example of pin-slide joint system 2712 is discussed below with respect to FIG. 33.

System 2700 may also include one or more cooling systems. For example, system 2700 may include a chiller which chills a liquid (e.g., water) used to cool components of system 2700. In some embodiments, chilled liquid is circulated from the chiller to heat exchangers (e.g., fan coil units) disposed in AC/DC subsystem 2704 and in DC/DC subsystem 2706, thereby helping to cool these subsystems. The chilled liquid may also be circulated through heat exchangers in battery electrolyte storage tanks to cool battery electrolyte. The chiller may be a redundant chiller (e.g., include redundant compressors) to enhance reliability of system 2700.

System 2700 also includes a control subsystem 2714 which controls one or more aspects of system 2700's operation. For example, control system 2714 may control inverter/rectifiers in AC/DC subsystem 2704, DC/DC converters in DC/DC subsystem 2706, and/or batteries in battery subsystem 2708. Control subsystem 2714 may communicate with these subsystems using a communication system such as CAN-bus communication system (not shown). In some embodiments, control subsystem 2714 includes one or more emergency stop controls, such as an emergency stop button that when activated, disconnects system 2700 for the external system as well causes chemical neutralization of batteries in battery subsystem 2708. Control subsystem 2714 may also include an interface for communicating with an external system, such as to allow for remote control and/or monitoring of system 2700.

As noted above, system 2700 may receive electric power from the external system via AC/DC subsystem 2704. However, some embodiments of system 2700 also include a DC interface (not shown) to receive DC power from an external DC subsystem, such as from external photovoltaic cells, for storage in battery subsystem 2708. This DC interface is electrically coupled to DC bus 2802, for example. Some embodiments of system 2700 are also configured and arranged to allow for energy required for transporting system 2700 to be at least partially provided by energy stored in battery subsystem 2708. For example, in an embodiment where chassis 2702 is a trailer chassis towed by a cab, system 2700 could optionally be configured and arranged to transfer energy from battery subsystem 2708 to a battery of the cab, where the battery of the cab stores energy for moving the cab (e.g., for operating one or more electric motors that move the cab).

Figure 32:
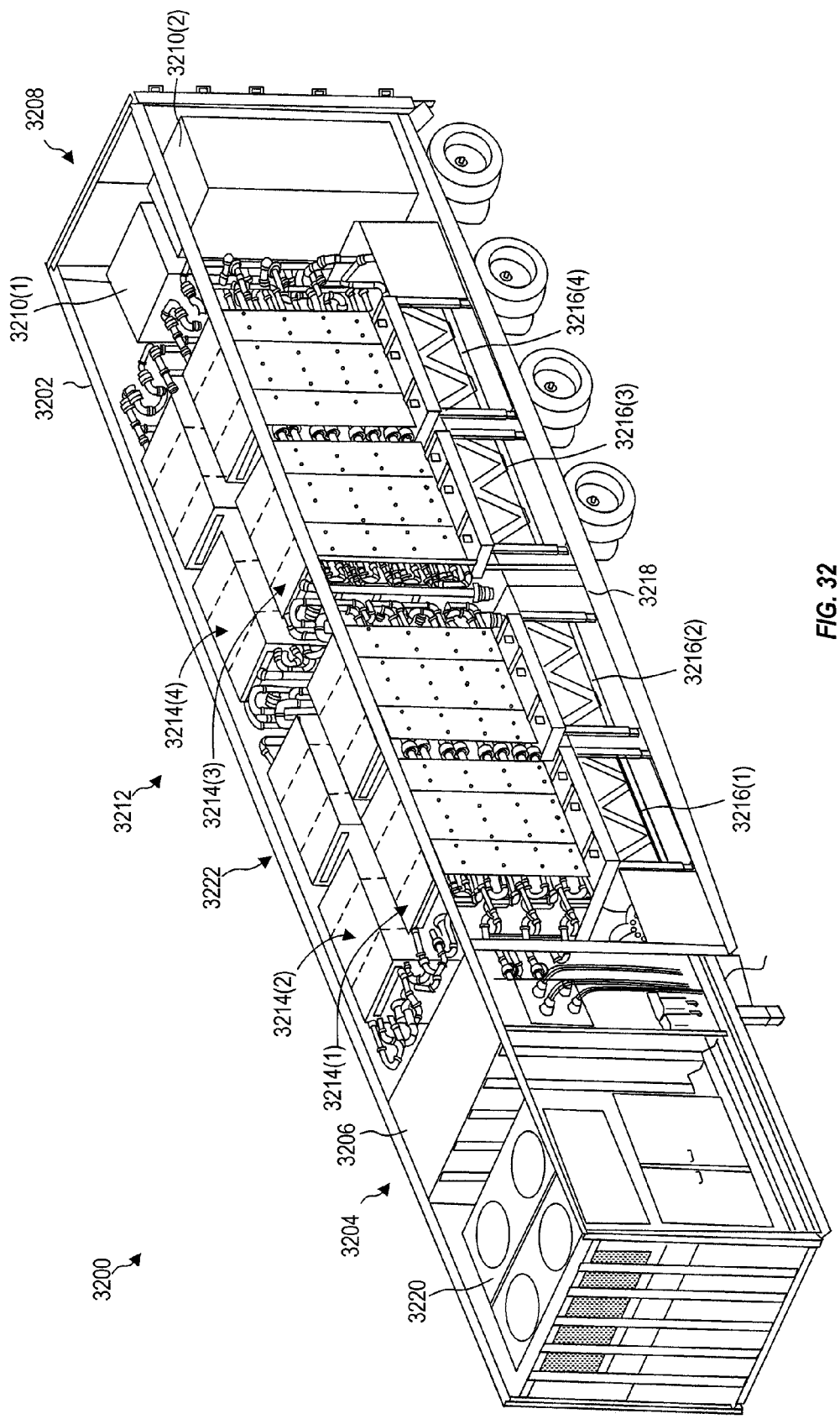
FIG. 32 shows a side perspective view of one embodiment of the mobile energy storage system of FIG. 27.

FIG. 32 is a side perspective view of a mobile energy storage system 3200, which is an embodiment of system 2700. Although system 3200 is based on a trailer chassis 3202, one of ordinary skill after reading and comprehending the following description would understand that the following embodiments are adaptable to other modes of transportation, including but not limited to truck, rail, ship, airplane, and space craft.

System 3200 includes an AC/DC subsystem 3204 housed in a cabinet 3206 that meets NEMA 4 specifications. DC/DC subsystem 3208 is disposed in the back of chassis 3202, and DC/DC subsystem 3208 includes two cabinets 3210 that meet NEMA 4 specifications, each cabinet including a number of DC/DC converters. Battery subsystem 3212 is disposed in approximately the middle of chassis 3202. Battery subsystem 3212 includes four sets 3214 of flowing electrolyte batteries, where the flowing electrolyte batteries are disposed on tables 3216. Tables 3216 are mechanically coupled to a floor 3218 of chassis 3202 via pin-slide joint systems. System 3200 further includes a chiller 3220 disposed at the front of chassis 3202. Chiller 3220 is connected via piping to heat exchangers disposed in cabinets 3206 and 3210 and electrolyte storage tanks of battery subsystem 3212 for cooling AC/DC subsystem 3204, DC/DC subsystem 3208, and battery subsystem 3212, respectively.

Figure 33:
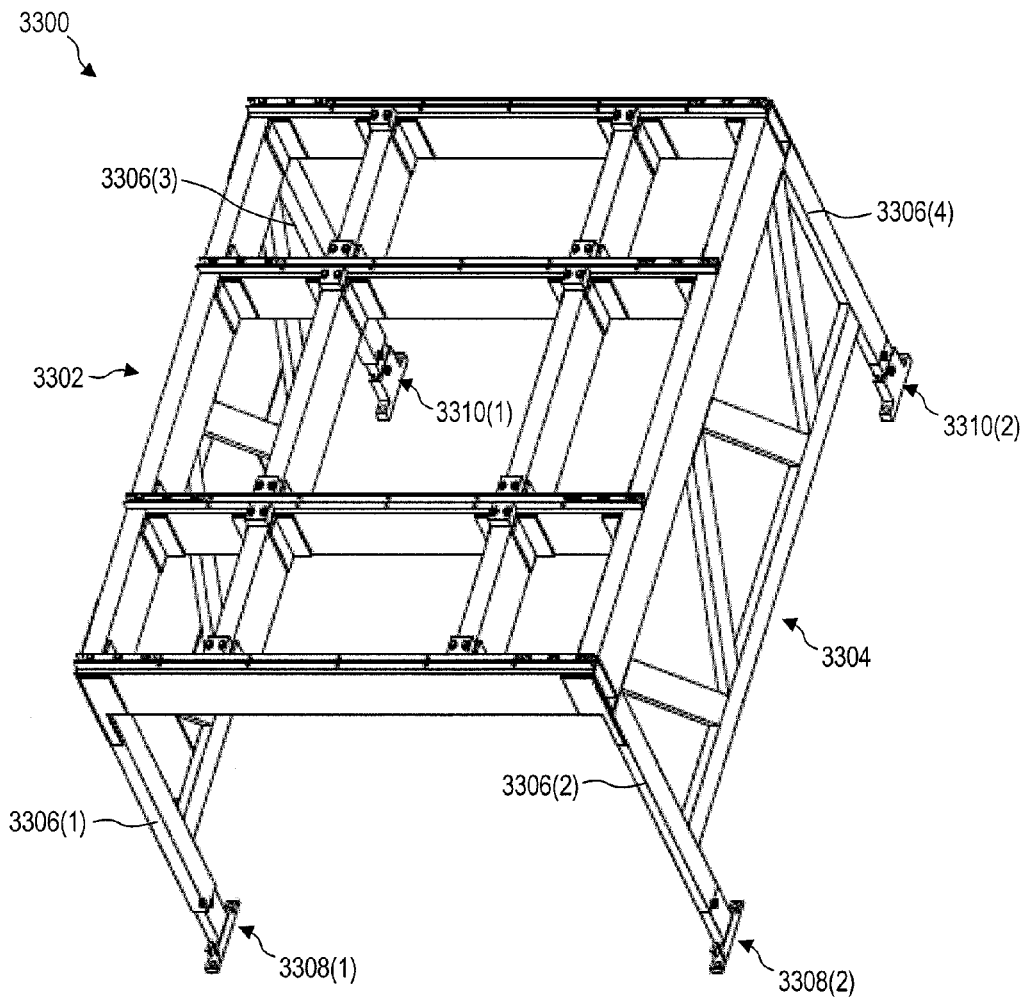
FIG. 33 shows a top perspective view of one table which may be used in the mobile energy storage system of FIG. 27, according to an embodiment.
Figure 34:
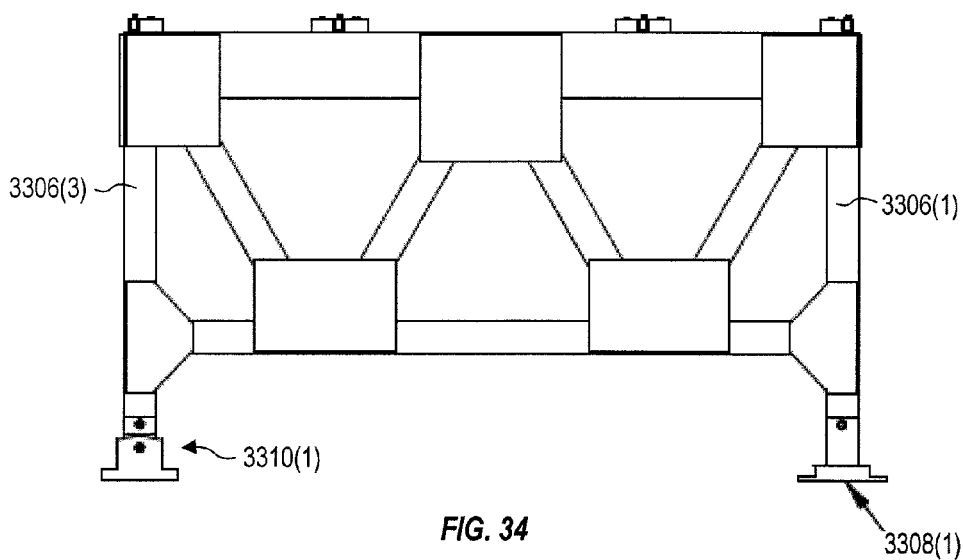

FIG. 33 shows a top perspective view of one table 3300, which is an embodiment of table 3216 (FIG. 32). FIG. 34 shows a plan view of side 3302 of table 3300, and FIG. 35 shows a plan view of side 3304 of table 3300. Table 3300 includes a number (e.g., four) legs 3306 for support. Two of legs 3306 are, for example, coupled to floor 3218 of chassis 3202 by table sliding supports 3308, while the remaining legs 3306 are coupled to floor 3218 by pivot feet 3310. As discussed below, sliding supports 3308 and pivot feet 3310 advantageously enable mechanical coupling of legs 3306 to a supporting surface (e.g., floor 3218) while allowing for limited movement of legs 3306 with respect to the supporting surface, thereby accommodating movement of the supporting surface. If legs 3306 were instead fixedly coupled to a supporting surface (e.g., floor 3218), movement of the surface might damage table 3300 and/or floor 3218.

FIG. 36 shows a top perspective view of sliding support 3600, which is an embodiment of sliding support 3308 (FIG. 33). Sliding support 3600 includes a base 3602, which is typically fastened (e.g., bolted) to a supporting surface (e.g., floor 3218). A track 3606 is affixed to base 3602, and a slide 3604 is mechanically coupled to track 3606 but is operable to slide within track 3606. Sliding support 3600 further includes a pivot pin 3608 for coupling slide 3604 to a respective leg 3306. Accordingly, a leg 3306 coupled to slide 3604 can both pivot and slide with respective to base 3602. FIGS. 37-39 show additional views of sliding support 3600. In particular, FIG. 37 is a front plan view, FIG. 38 is a side plan view, and FIG. 39 is a top plan view of sliding support 3600.

Figure 40:
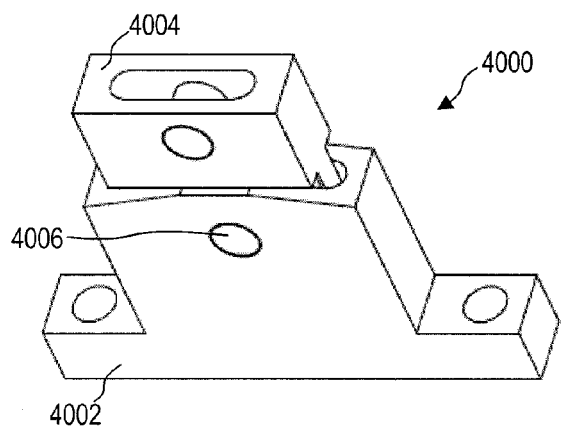
FIG. 40 shows a top perspective of a pivot foot, in an embodiment.
Figure 43:
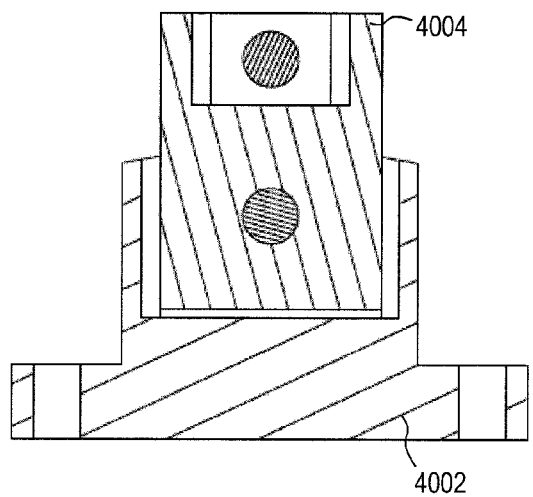
FIGS. 42 and 43 are cross sectional views of the pivot foot of FIG. 40.
Figure 41:
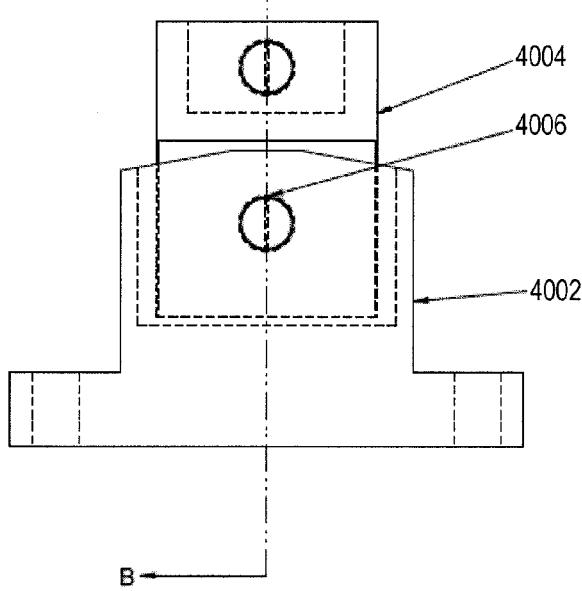
FIG. 41 is a front plan view of the pivot foot of FIG. 40.
Figure 42:
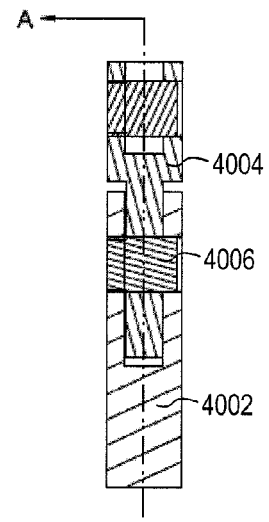
Figure 44:
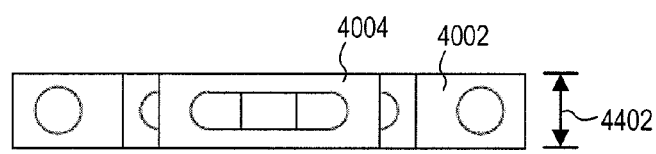
FIG. 44 is a top plan view of the pivot foot of FIG. 40.

FIG. 40 is a top perspective view of one pivot foot 4000, which is an embodiment of pivot foot 3310 (FIG. 33). Pivot foot 3310 includes a base 4002, which is typically fastened (e.g., bolted) to a supporting surface (e.g., floor 3218). An inner member 4004 is pivotally coupled to base 4002 via a pivot pin 4006 such that inner member 4004 can pivot with respect to base 4002. Inner member 4004 is mechanically coupled to a respective leg 3306 such that the leg can pivot with respect to base 4002. FIGS. 41-44 show additional views of pivot foot 4000. In particular, FIG. 41 is a front plan view of pivot foot 4000, and FIG. 42 is a cross sectional view of pivot foot 4000 taken along line B-B of FIG. 41. FIG. 43 is a cross sectional view of pivot foot 4000 taken along line A-A of FIG. 42, and FIG. 44 is a top plan view of pivot foot 4000. A thickness 4402 (see FIG. 44) of pivot foot 4000 is, for example, varied according to the location of a leg 3306 that pivot 4000 is coupled to. For example, thickness 4402 may be greater for instances of pivot foot 4000 coupled to legs 3306 adjacent to system 3200's periphery than for instances of pivot foot 4000 coupled to legs located in the interior of system 3200.

Legs 3306 of table 3300 (FIG. 33) may be adapted for mechanically coupling table 3300 to one or more supporting surfaces in addition to or in place of a floor below table 3300. For example, legs 3306 could be adapted to support table 3300 from a top portion 3222 of chassis 3202 (FIG. 32), such that table 3300 hangs from top portion 3222. As another example, legs 3306 could be adapted to extend sideways from table 3300 so that table 3300 is mechanically coupled to a vertical section of a boat hull. In such alternate embodiments, sliding supports 3308 and/or pivot feet 3310 may mechanically couple legs 3306 to their one or more supporting surfaces to advantageously allow for limited movement of legs 3306 with respect to the one or more surfaces.

Figure 45:
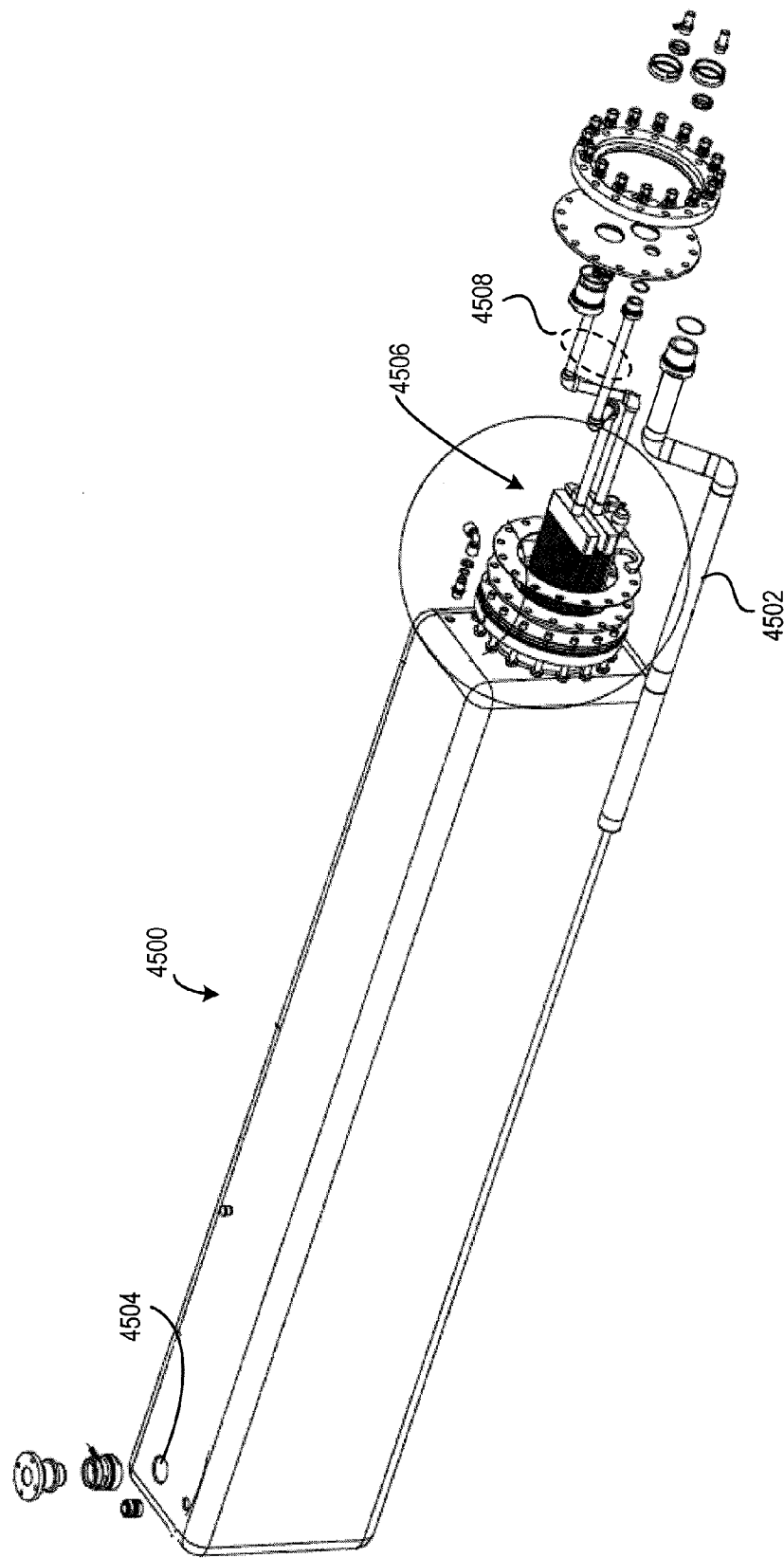
FIG. 45 is an exploded side perspective view of one tank for storage of an electrolyte, in an embodiment.

FIG. 45 is an exploded side perspective view of one tank 4500 for storage of an electrolyte (e.g., anolyte or catholyte) for use with a flowing electrolyte battery. An embodiment of tank 4500 could serve, for example, as anolyte reservoir 3004 or catholyte reservoir 3006 (FIG. 30). Tank 4500 includes a manifold suction line 4502 for delivering electrolyte to a flowing electrolyte battery, and a return opening 4504 for the return of electrolyte from the battery to tank 4500. The shape and size of tank 4500 can be varied as its application requires, such as to fit under an embodiment of table 3300 (FIG. 33).

Figure 46:
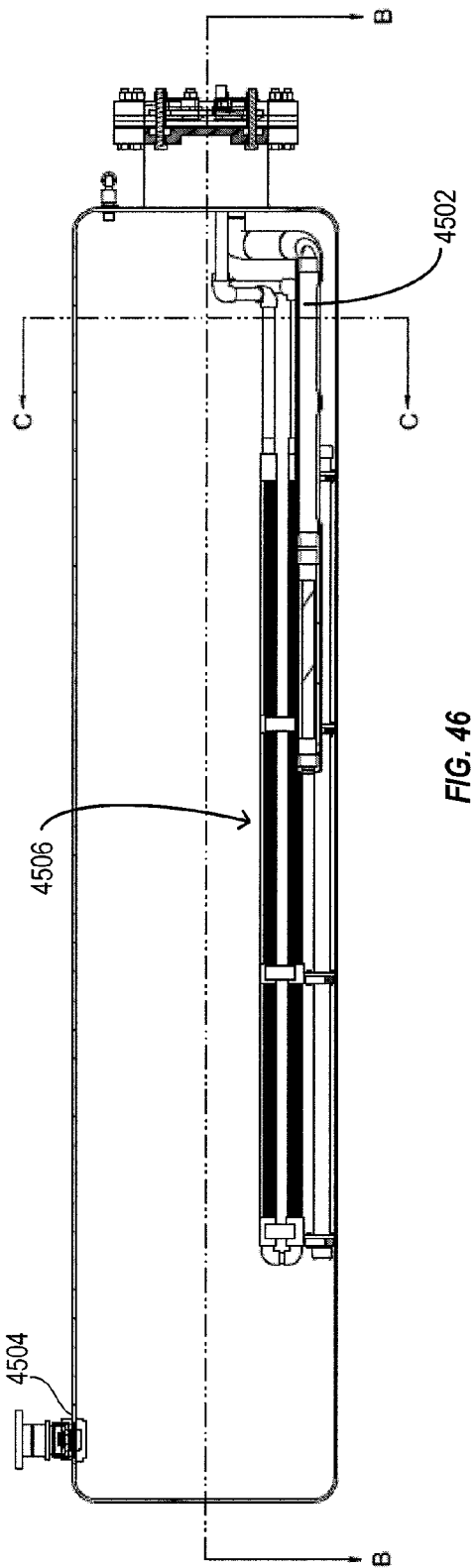
FIGS. 46-48 respectively show a side cross sectional view, a top cross sectional view, and an end cross sectional view of the tank of FIG. 45.
Figure 47:
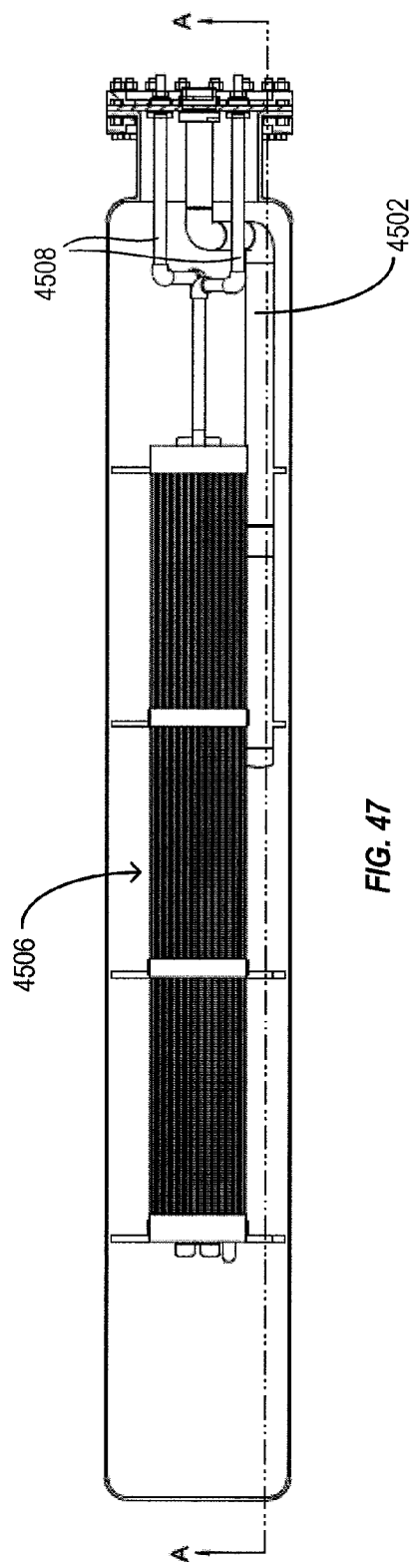
Figure 48:
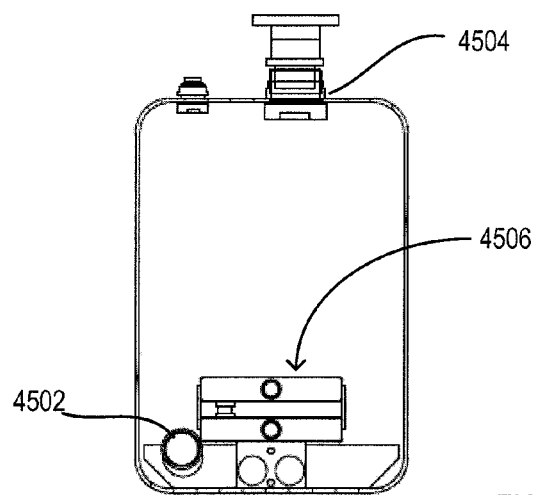
Figure 49:
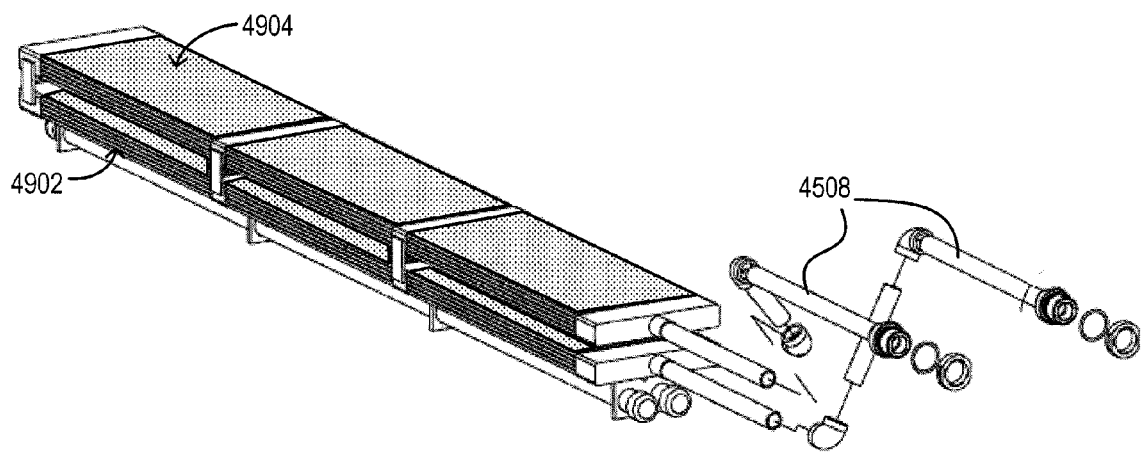
FIGS. 49-51 respectively show a top perspective view, a side plan view, and a top plan view of a heat sink assembly of the tank of FIG. 45.
Figure 50:
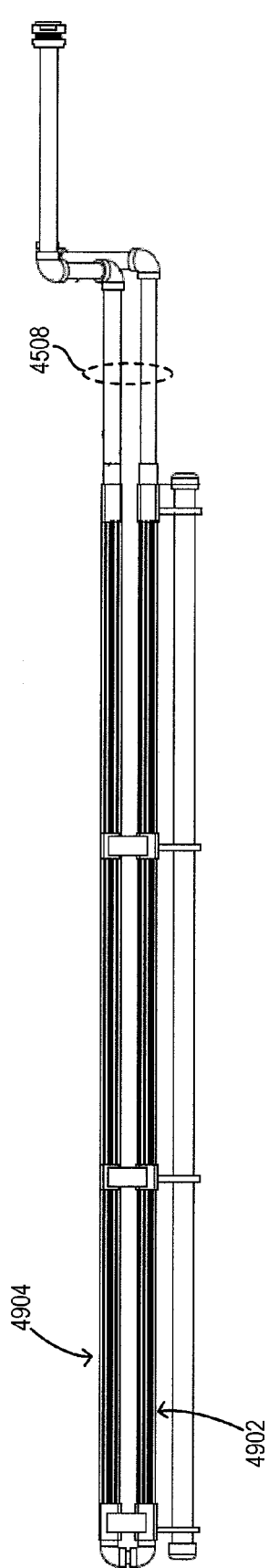
Figure 51:
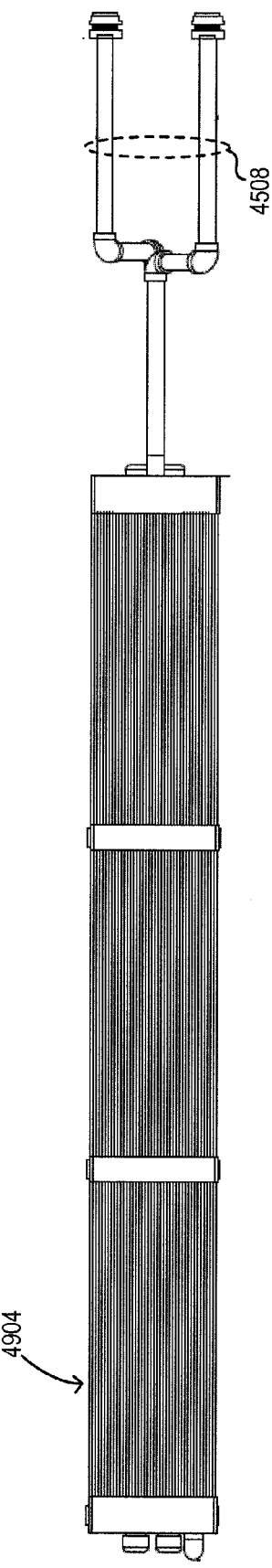

Tank 4500 also includes a heat exchanger assembly 4506 for cooling the electrolyte stored in tank 4500. Coolant, such as chilled water (e.g., from chiller 3220, FIG. 32) is circulated through heat sink assembly 4506 via lines 4508. FIGS. 46-48 are additional views of tank 4500. In particular, FIG. 46 is a side cross-sectional view, FIG. 47 is a top cross sectional view, and FIG. 48 is an end cross-sectional view of tank 4500. FIGS. 49-51 show additional views of heat sink assembly 4506. In particular, FIG. 49 is a top perspective view, FIG. 50 is a side plan view, and FIG. 51 is a top plan view of heat sink assembly 4506. Although heat sink assembly 4506 is shown as including two stacked sections 4902, 4904 (see FIGS. 49, 50) advantageously providing a large cooling surface area in a compact footprint, the number of sections could be varied.

Figure 52:
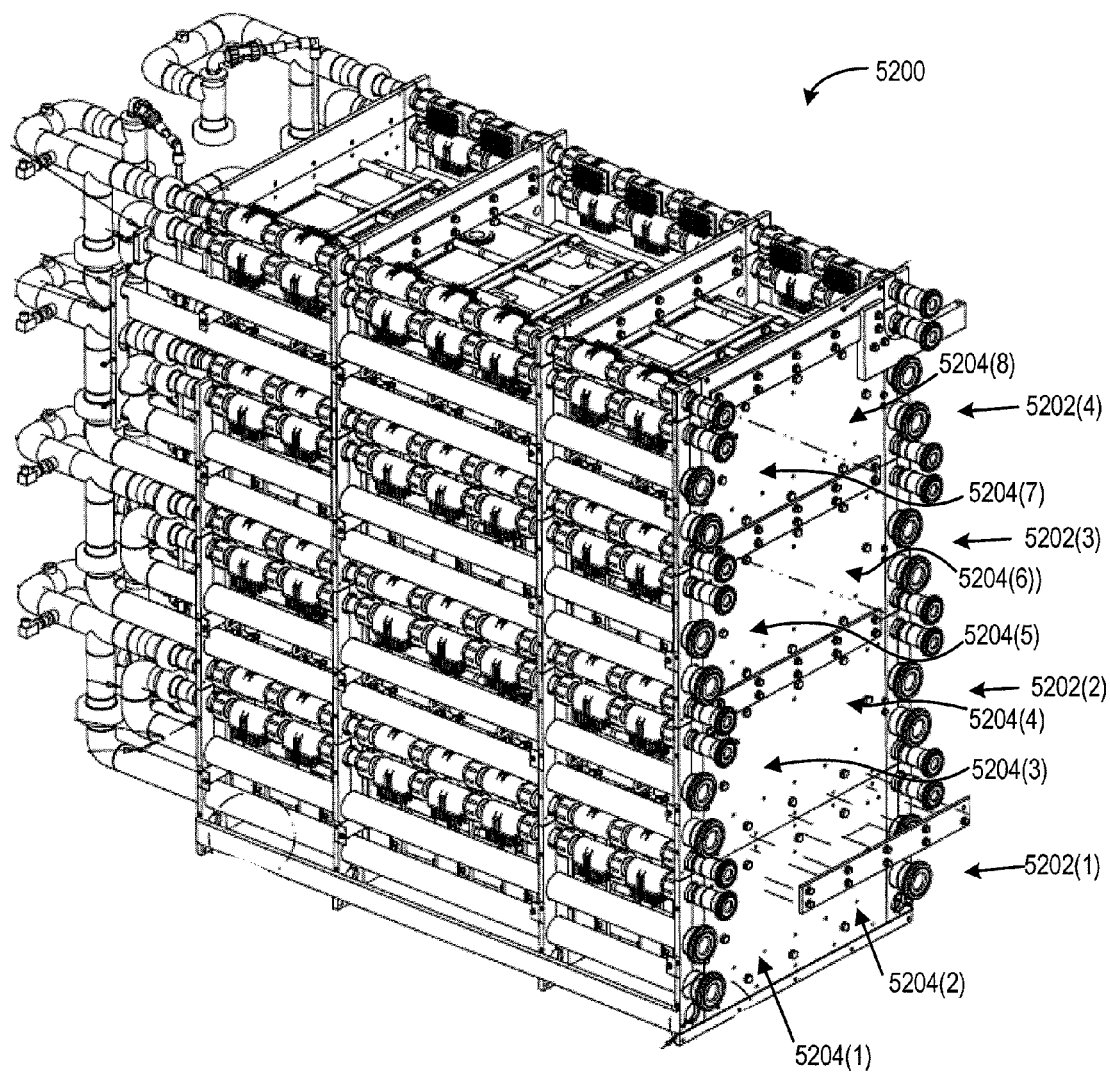
FIGS. 52 and 53 show side perspective views of a set of flowing electrolyte batteries, in an embodiment.
Figure 53:
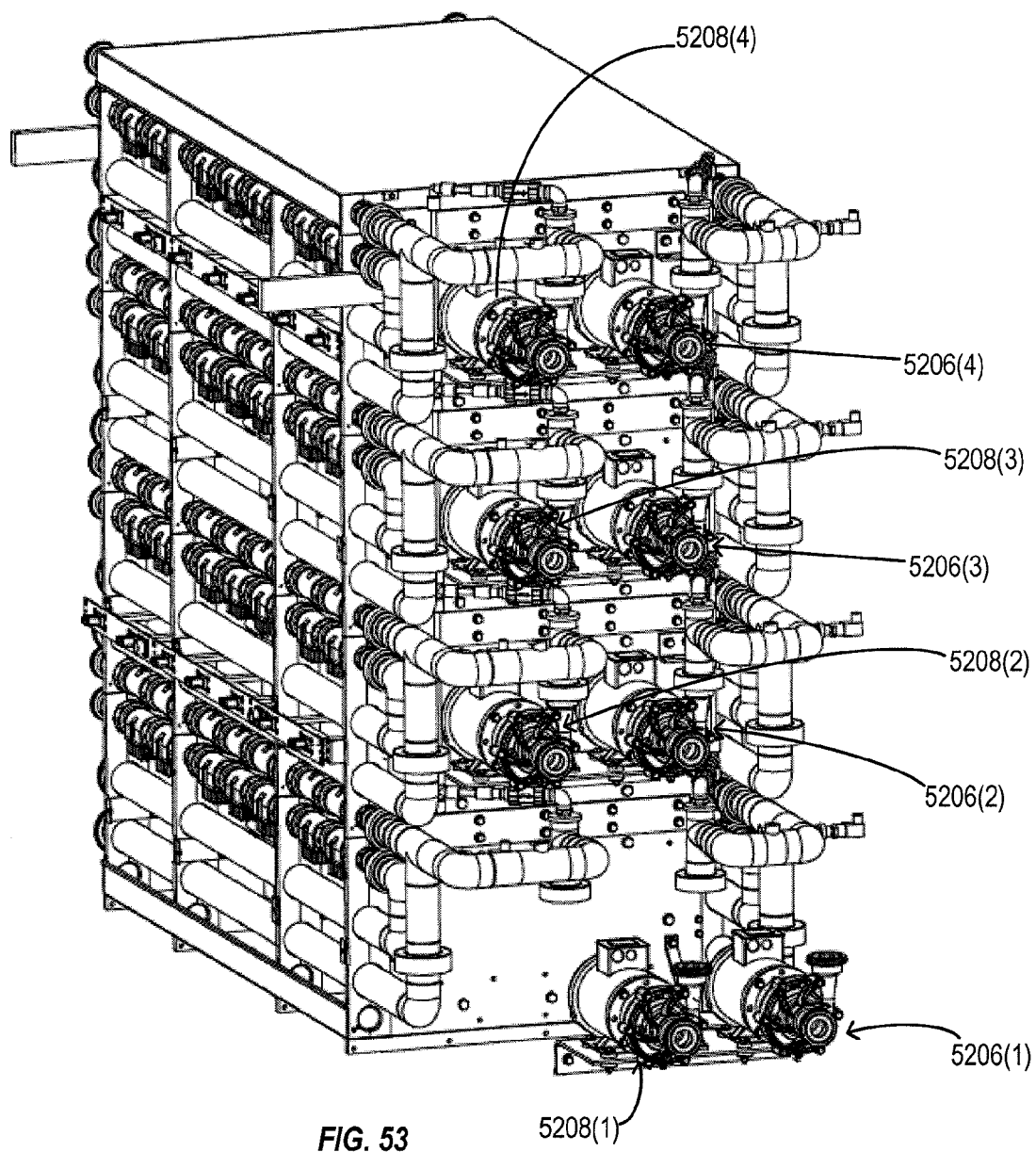
Figure 54:
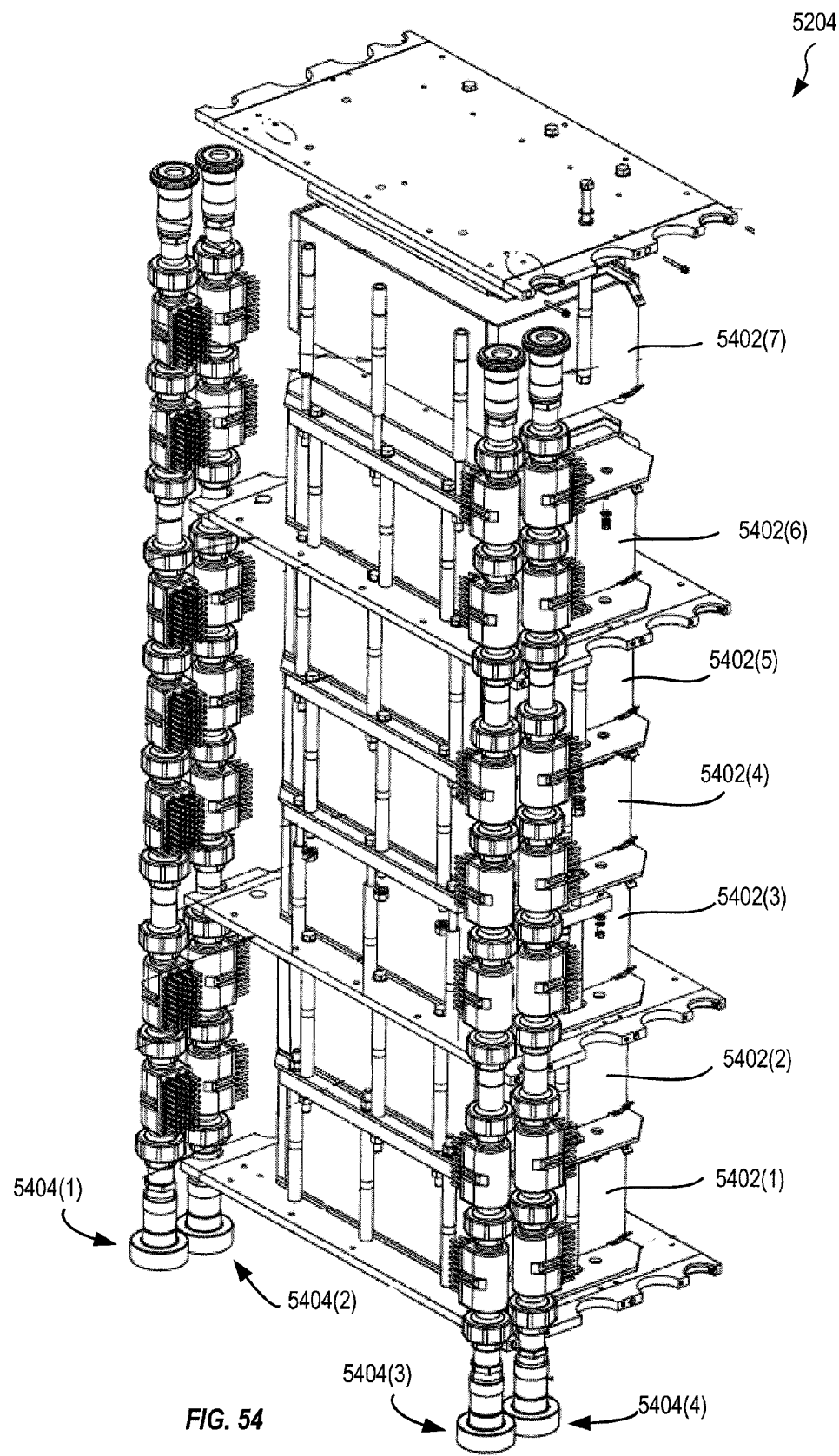
FIG. 54 show an exploded side perspective view of a tower of stacks of flowing electrolyte batteries from the set of flowing electrolyte batteries of FIGS. 52-53, in an embodiment.

FIG. 52 shows a side perspective view of one set 5200 of flowing electrolyte batteries, which is an embodiment of set of flowing electrolyte batteries 3214 of FIG. 32. Set 5200 includes, for example, four rows 5202 of towers 5204, where each tower includes seven stacks of flowing electrolyte batteries. FIG. 53 shows an alternate side perspective view of set 5200, where electrolyte pumps 5206, 5208 are visible. FIG. 54 is an exploded side perspective view of one tower 5204, which includes seven stack assemblies 5402, for example. Pipe assemblies 5404 provide electrolyte to and from stack assemblies 5402.

Figure 55:
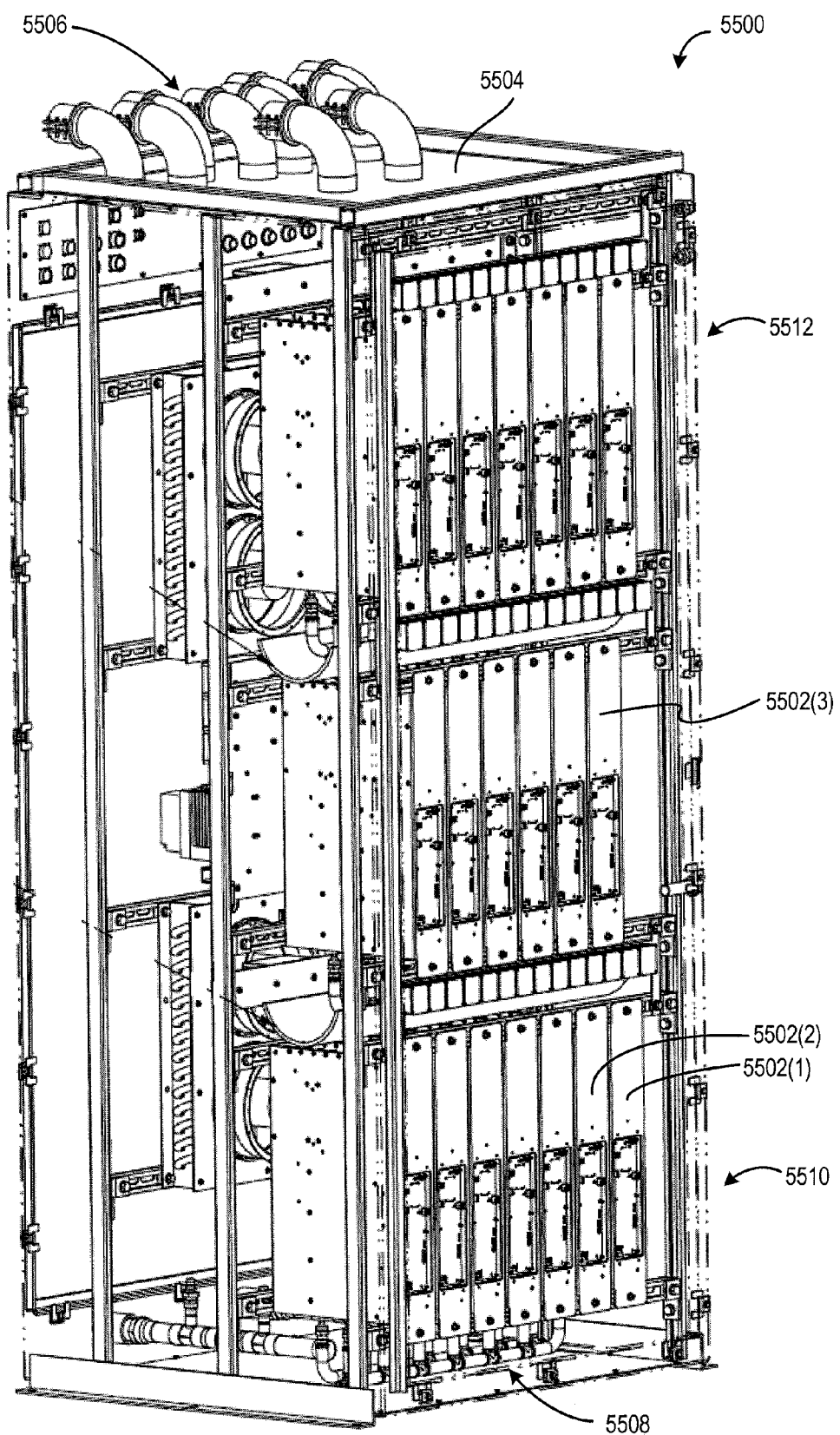
FIG. 55 shows a cutaway side perspective view of one DC/DC converter system, in an embodiment.
Figure 56:
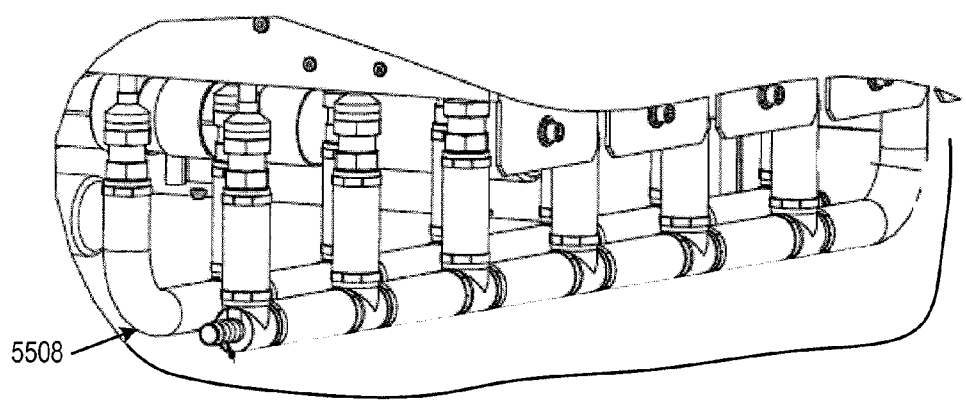
FIG. 56 shows a side perspective view of piping entering a row of DC/DC converters of the system of FIG. 55.

FIG. 55 is a cutaway side perspective view of one DC/DC converter system 5500 which controls flow of electric power to and from batteries. One or more instances of DC/DC converter system 5500 are, for example, included in DC/DC subsystem in 3208 of system 3200 (FIG. 32) to control charging and discharging of battery subsystem 3212. System 5500 includes, for example, twenty 3-stage DC/DC converters 5502, only some of which are labeled to maintain illustrative clarity, housed in a cabinet 5504 that meets NEMA 4 specifications. Electric power cables enter cabinet 5504, for example, via conduits 5506 which are sealed to prevent entry of moisture into cabinet 5504. DC/DC converters 5502 are optionally at least partially cooled via coolant (e.g., chilled water) circulated through DC/DC converters 5502 via piping 5508. FIG. 56 shows a side perspective view of piping 5508 entering a first row 5510 of DC/DC converters 5502.

Figure 57:
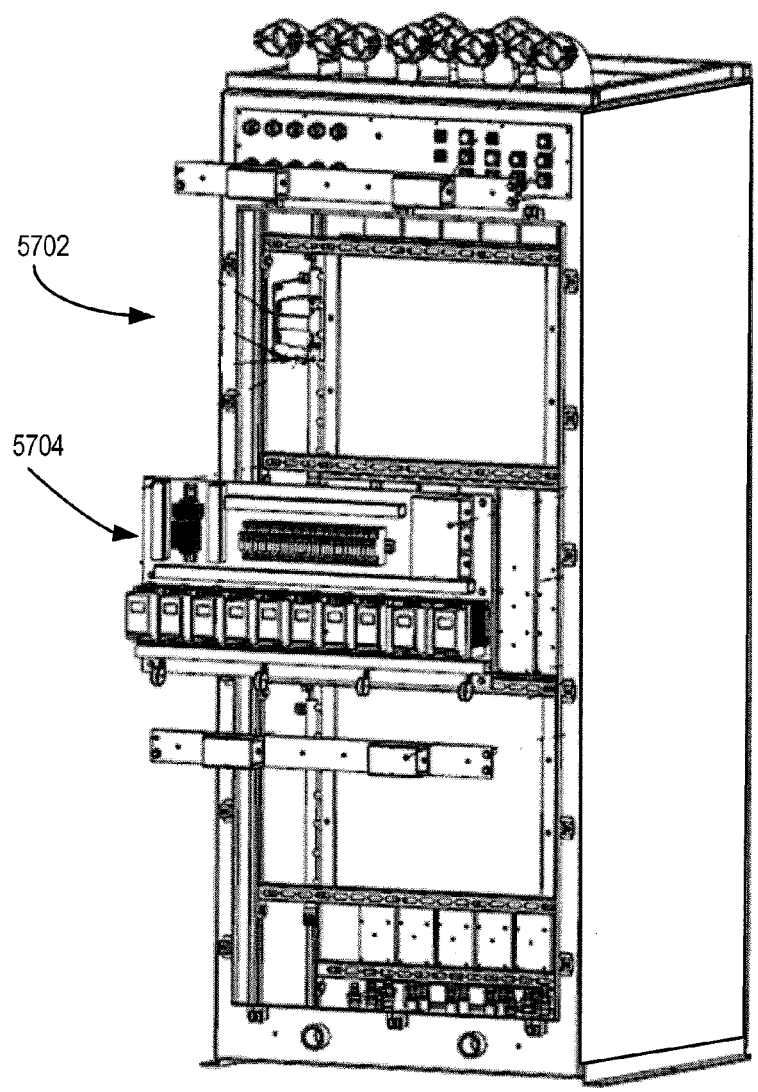
FIGS. 57-59 respectively show another side perspective view, a top cutaway view, and a side cross section view of the system of FIG. 55.
Figure 58:
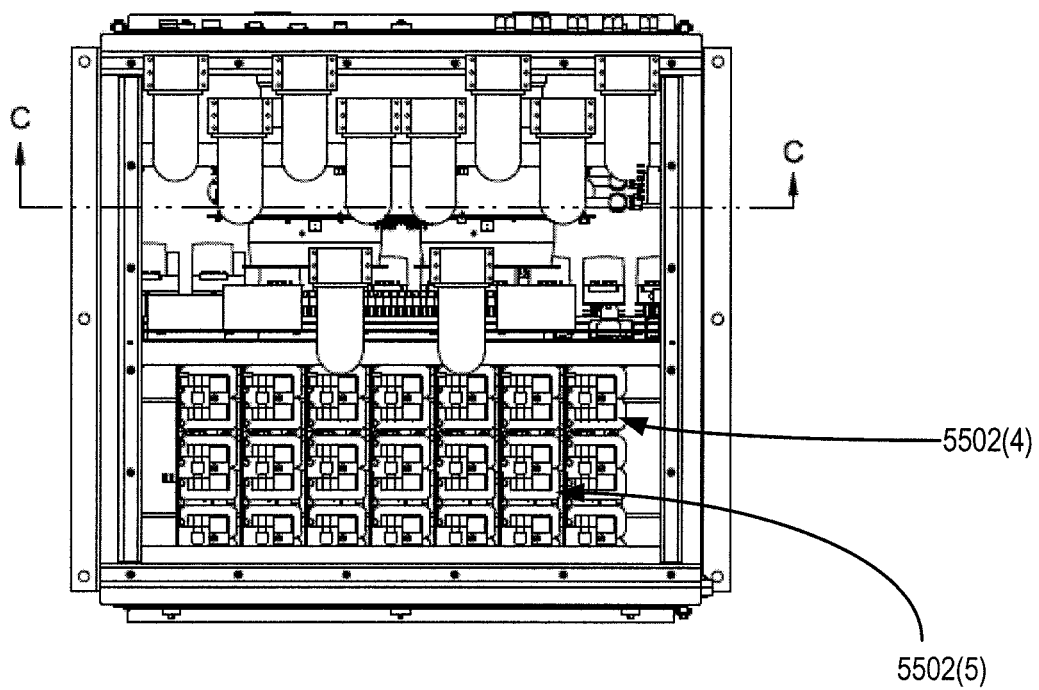
Figure 59:
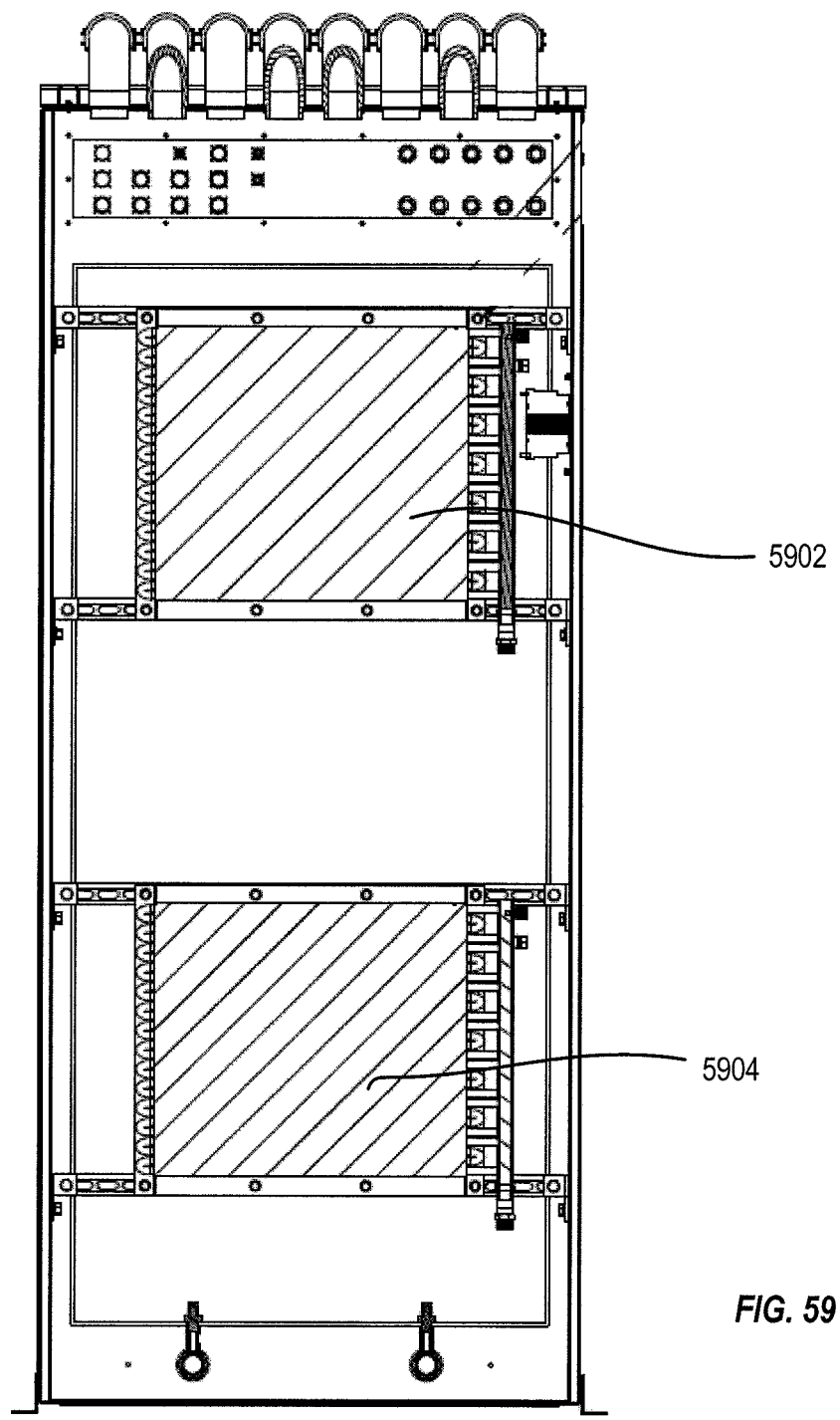

FIG. 57 is another side perspective view of system 5500, showing back side 5702. Visible in FIG. 57 is a motor drive assembly 5704, which powers and controls motors driving pumps of batteries (e.g., of battery subsystem 3212, FIG. 32) coupled to system 5500. FIG. 58 is a top cutaway view of system 5500 and FIG. 59 is a side cross sectional view of system 5500 taken along line C-C of FIG. 58. A top row 5512 of DC/DC converters 5502 are visible in FIG. 58, and FIG. 59 shows heat exchangers 5902, 5904 which are included in cabinet 5504 for further cooling system 5500. Coolant (e.g., chilled water) is circulated through heat exchangers 5902, 5904, which optionally includes fans (not shown in FIG. 59) to force air across fins of heat exchangers 5902, 5904.

Figure 60:
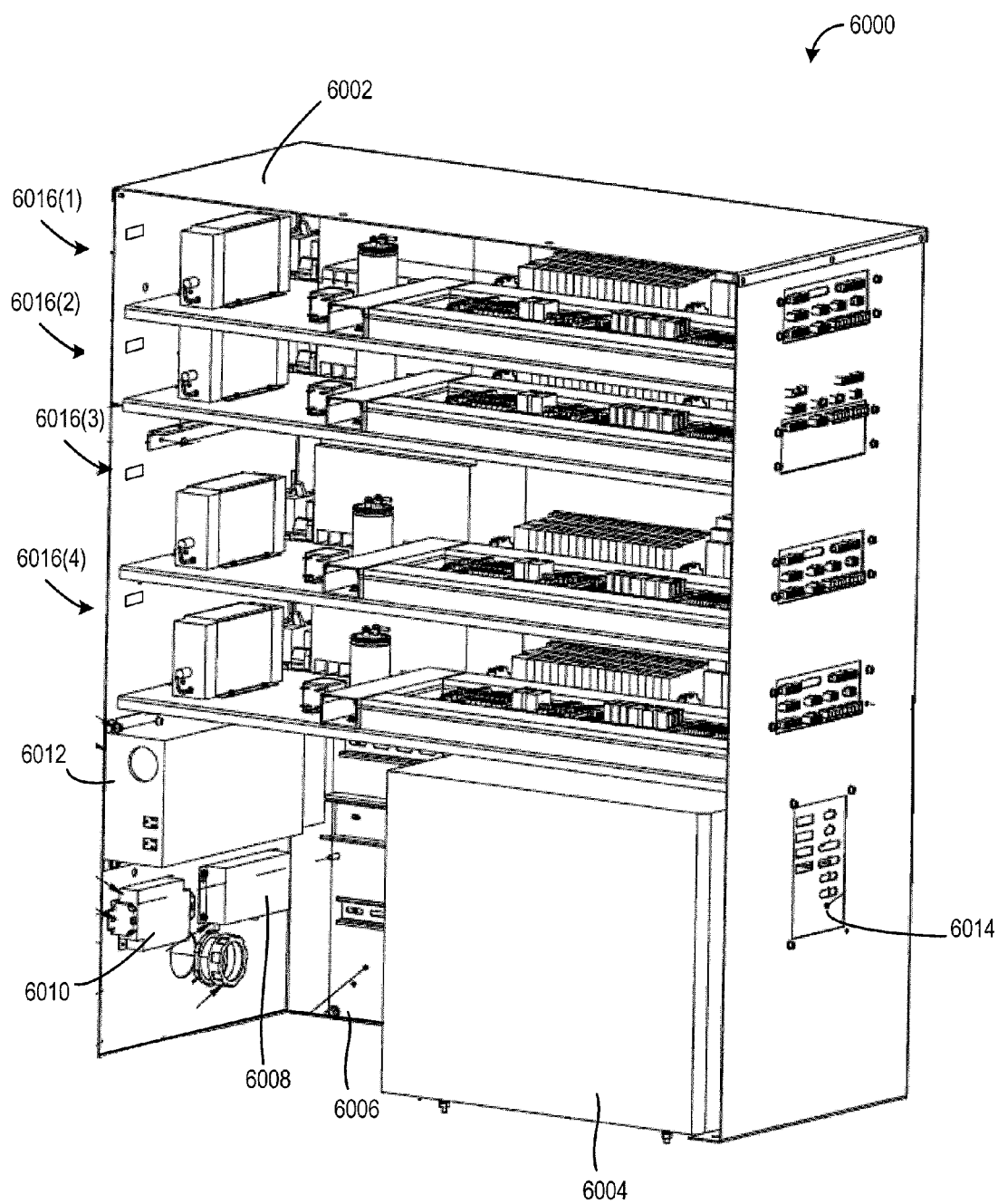
FIG. 60 is a side perspective view of one control subsystem for a mobile energy storage system, in an embodiment.

FIG. 60 is a side perspective view of one control subsystem 6000 for controlling a mobile energy storage system, such as system 3200 of FIG. 32. Control subsystem 6000 includes a cabinet 6002 for housing its components including a system computer 6004, a DC/DC subsystem controller 6006, a wireless modem 6008 (e.g., a CDMA cellular modem) for communicating with an external system, an Ethernet switch 6010, an inverter 6012, and an AC power connector 6014. System 6000 also includes fours rows 6016 of flowing electrolyte battery controls, where each row 6016 controls a particular set of flowing electrolyte batteries, such as a set 3214 of system 3200 (FIG. 32).

Figure 61:
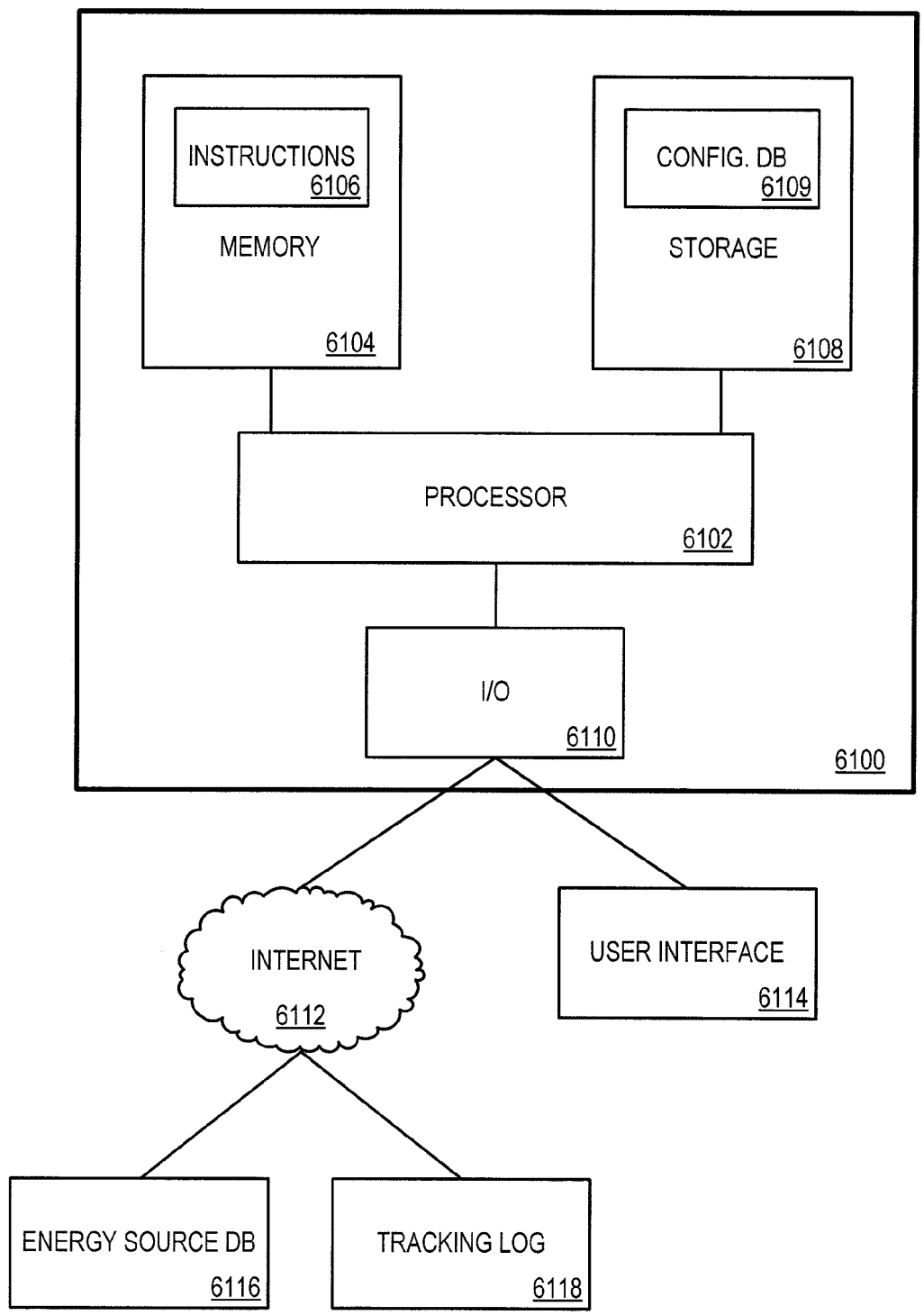
FIG. 61 schematically illustrates one energy movement controller, in an embodiment.

FIG. 61 schematically illustrates one energy movement controller (EMC) 6100, which is one embodiment of EMC 302, FIG. 3. EMC 6100 includes a processor 6102, which is, for example, a general purpose microprocessor, a custom designed microprocessor, or a number of processors, such as in a distributed computing environment. Processor 6102 is communicatively coupled to memory 6104, and processor 6102 executes instruction 6106 in the form of software from memory 6104 to control EMC 6100, such as to implement method 200 (FIG. 2). Instructions 6106 are loaded into memory, for example, from data storage 6108. Data storage 6108 is, for example, a hard drive or a distributed data storage network. In one example, data storage 6108 includes a configuration database 6109 for storing information such as logistical constraints associated with EMC 6100's application. Processor 6102 is also communicatively coupled to input/output ("I/O") subsystem 6110, which provides an interface to one or more external systems. Examples of such external systems include, but are not limited to, the Internet 6112, a sub controller (e.g., sub controller 304, FIG. 3), an energy store (e.g., energy store 104), and/or a user interface device 6114, such as a mouse, a keyboard, a trackball, a monitor, and/or an optical scanner. I/O subsystem 6110 is, for example, a network interface device (wired and/or wireless) and/or a universal serial bus interface.

In one example, EMC 6100 accesses energy source database 6116 and energy store tracking log 6118 via Internet 6112, where energy source database 6116 and energy store tracking log 6118 are embodiments of energy source database 316 and energy store tracking log 318, respectively. EMC 6100 could alternately be adapted to internally host energy source database 6116 and energy store tracking log 6118, such as in data storage 6108.

Changes may be made in the above methods and systems without departing from the scope hereof. It should thus be noted that the matter contained in the above description or shown in the accompanying drawings should be interpreted as illustrative and not in a limiting sense. The following claims are intended to cover generic and specific features described herein, as well as all statements of the scope of the present method and system, which, as a matter of language, might be said to fall there between.

We claim:

1. A mobile energy storage system, comprising:
   a chassis selected from the group consisting of a truck chassis and a trailer chassis;
   a table, including:
     a supporting structure,
     a first leg having opposing first and second ends, the first end of the first leg fastened to the supporting structure,
     a second leg having opposing first and second ends, the first end of the second leg fastened to the supporting structure,
   a sliding support, including:
     a first base fastened to the chassis,
     a track affixed to the first base, and
     a slide arranged to slide within the track, the slide pivotally connected to the second end of the first leg, and
   a pivot foot, including:
     a second base fastened to the chassis, and
     an inner member pivotally connected to the second base and pivotally connected to the second end of the second leg; and
   a battery subsystem including a flowing electrolyte battery disposed on the supporting structure of the table.

2. The mobile energy storage system of claim 1, further comprising:
   an AC/DC subsystem disposed on the chassis and for interfacing the mobile energy storage system with an external AC system; and
   a DC/DC subsystem disposed on the chassis and electrically coupled to the AC/DC subsystem via a first DC bus, the DC/DC subsystem coupled to the battery subsystem via a second DC bus, the DC/DC subsystem configured and arranged to control charging and discharging of the battery subsystem;
   the mobile energy storage system configured and arranged to receive energy in the form of electric power from the external AC system for storage in the battery subsystem; and
   the mobile energy storage system configured and arranged to provide energy stored in the battery subsystem to the external AC system in the form of electric power.

3. The mobile energy storage system of claim 2, at least portions of sides of the chassis being formed of a flexible material.

4. The mobile energy storage system of claim 2, the sliding support further including a first pivot pin coupling the slide to the second end of the first leg.

5. The mobile energy storage system of claim 4, the pivot foot further including a second pivot pin coupling the second base to the inner member.

6. The mobile energy storage system of claim 5, the first base and the second base each being fastened to a floor of the chassis.

7. The mobile energy storage system of claim 5, the first base and the second base each being fastened to a top portion of the chassis, such that the table hangs from the top portion of the chassis.

8. The mobile energy storage system of claim 5, the first base and the second base each being fastened to a vertical portion of the chassis, such that the table extends sideways from the vertical portion of the chassis.

* * * * *